US012685241B2

(12) United States Patent
Matsuzaki

(10) Patent No.: US 12,685,241 B2
(45) Date of Patent: Jul. 21, 2026

(54) AGRICULTURAL MACHINE, SENSING SYSTEM, SENSING METHOD, REMOTE OPERATION SYSTEM, AND CONTROL METHOD

(71) Applicant: Kubota Corporation, Osaka (JP)

(72) Inventor: Yushi Matsuzaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 107 days.

(21) Appl. No.: 18/749,213

(22) Filed: Jun. 20, 2024

(65) Prior Publication Data

US 2024/0341215 A1 Oct. 17, 2024

Related U.S. Application Data

(63) Continuation of application No. PCT/JP2022/043041, filed on Nov. 21, 2022.

(30) Foreign Application Priority Data

Dec. 28, 2021 (JP) ................................. 2021-213738
Dec. 28, 2021 (JP) ................................. 2021-213739

(51) Int. Cl.
*A01B 69/04* (2006.01)
*G01S 17/931* (2020.01)
(Continued)

(52) U.S. Cl.
CPC .......... *A01B 69/008* (2013.01); *G01S 17/931* (2020.01); *G01S 19/23* (2013.01); *H04N 7/183* (2013.01)

(58) Field of Classification Search
CPC ..... A01B 69/008; G01S 17/931; G01S 19/23; G01S 19/49; G01S 5/16; G01S 5/0036; H04N 7/183
(Continued)

(56) References Cited

U.S. PATENT DOCUMENTS

2005/0146608 A1* 7/2005 Yosida ................... H04N 23/63
348/207.1
2010/0134488 A1 6/2010 Kido et al.
(Continued)

FOREIGN PATENT DOCUMENTS

JP 2014071778 A 4/2014
JP 2015233270 A 12/2015
(Continued)

OTHER PUBLICATIONS

English Translation of KR101701909B1, obtained via EspaceNet Nov. 2025 (Year: 2025).*
(Continued)

*Primary Examiner* — Krishnan Ramesh
(74) *Attorney, Agent, or Firm* — Keating & Bennett, LLP

(57) ABSTRACT

An agricultural machine includes a vehicle body, a sensor to sense an environment around the vehicle body to output sensing data, and a communication device to transmit the sensing data output from the sensor to a remote device. The sensor changes a data amount of the sensing data output to the communication device, depending on a communication rate from the communication device to the remote device.

9 Claims, 27 Drawing Sheets

(51) Int. Cl.
  *G01S 19/23*        (2010.01)
  *H04N 7/18*        (2006.01)
(58) Field of Classification Search
  USPC ............................................................ 701/2
  See application file for complete search history.

(56)            References Cited

U.S. PATENT DOCUMENTS

| | | | | | |
|---|---|---|---|---|---|
| 2011/0193961 | A1* | 8/2011 | Peterson | ................ | H04N 7/183 |
| | | | | | 348/148 |
| 2015/0334297 | A1 | 11/2015 | Matsui et al. | | |
| 2016/0008984 | A1* | 1/2016 | Ju | .............................. | G06T 3/40 |
| | | | | | 901/1 |
| 2017/0248946 | A1 | 8/2017 | Ogura et al. | | |
| 2018/0268227 | A1 | 9/2018 | Nakada | | |
| 2019/0146060 | A1* | 5/2019 | Qiu | .......................... | G01S 7/484 |
| | | | | | 356/5.01 |
| 2019/0150357 | A1 | 5/2019 | Wu et al. | | |
| 2019/0261007 | A1* | 8/2019 | Emmanuel | .......... | H04N 19/166 |
| 2020/0394813 | A1* | 12/2020 | Theverapperuma | ......................... | |
| | | | | | G05D 1/0257 |
| 2020/0400788 | A1* | 12/2020 | Van Lierop | ........... | G01S 7/4817 |
| 2021/0035387 | A1* | 2/2021 | Kuehnle | .............. | G08G 1/0133 |
| 2021/0055420 | A1* | 2/2021 | Wohlfeld | ............... | H04N 23/13 |
| 2021/0109515 | A1 | 4/2021 | Urano et al. | | |
| 2021/0174527 | A1* | 6/2021 | Nishi | ..................... | G01B 11/00 |
| 2022/0128700 | A1* | 4/2022 | Saranin | ..................... | G06T 7/11 |
| 2022/0180131 | A1* | 6/2022 | Oblak | ................... | G06F 18/251 |
| 2022/0187471 | A1* | 6/2022 | Eshel | ....................... | G01S 17/89 |
| 2022/0342047 | A1* | 10/2022 | Moscovici | ........... | G01S 7/4817 |
| 2022/0368861 | A1* | 11/2022 | Watanabe | ...... | H04N 21/234363 |

| | | | | | |
|---|---|---|---|---|---|
| 2023/0034208 | A1 | 2/2023 | Kuroda et al. | | |
| 2023/0081452 | A1* | 3/2023 | Ellappan | .............. | G02B 27/017 |
| | | | | | 342/61 |
| 2023/0102096 | A1* | 3/2023 | Kim | ................... | G06K 7/10881 |
| | | | | | 348/222.1 |
| 2023/0121523 | A1* | 4/2023 | Delshadpour | ......... | H04L 1/0026 |
| | | | | | 714/776 |
| 2023/0161045 | A1* | 5/2023 | Chen | ..................... | G01S 7/4808 |
| | | | | | 702/152 |
| 2023/0164432 | A1* | 5/2023 | Morita | ................... | H04N 23/80 |
| | | | | | 348/144 |
| 2023/0323632 | A1 | 10/2023 | Saegusa et al. | | |

FOREIGN PATENT DOCUMENTS

| | | | | | |
|---|---|---|---|---|---|
| JP | 2018-027260 | A | 2/2018 | | |
| JP | 2018-152785 | A | 9/2018 | | |
| JP | 2018-180771 | A | 11/2018 | | |
| JP | 2019-175254 | A | 10/2019 | | |
| JP | 2021-029218 | A | 3/2021 | | |
| JP | 2021-064118 | A | 4/2021 | | |
| JP | 2021-073602 | A | 5/2021 | | |
| JP | 2022148921 | A | 10/2022 | | |
| KR | 101701909 | B1 * | 2/2017 | ............ | G06Q 50/10 |
| WO | 2016/017367 | A1 | 2/2016 | | |
| WO | 2021065371 | A1 | 4/2021 | | |

OTHER PUBLICATIONS

Official Communication issued in International Patent Application No. PCT/JP2022/043041, mailed on Jan. 10, 2023.

* cited by examiner

AGRICULTURAL MACHINE, SENSING SYSTEM, SENSING METHOD, REMOTE OPERATION SYSTEM, AND CONTROL METHOD

CROSS REFERENCE TO RELATED APPLICATIONS

This application claims the benefit of priority to Japanese Patent Application Nos. 2021-213738 and 2021-213739 filed on Dec. 28, 2021 and is a Continuation Application of PCT Application No. PCT/JP2022/043041 filed on Nov. 21, 2022. The entire contents of each application are hereby incorporated herein by reference.

BACKGROUND OF THE INVENTION

1. Field of the Invention

The present disclosure relates to agricultural machines, sensing systems, sensing methods, remote maneuver systems, and control methods.

2. Description of the Related Art

Research and development has been directed to the automation of agricultural machines to be used in agricultural fields. For example, work vehicles, such as tractors, combines, and rice transplanters, which automatically travel within fields by utilizing a positioning system, e.g., a GNSS (Global Navigation Satellite System), are coming into practical use. Research and development is also under way for work vehicles which automatically travel not only within fields, but also outside the fields. Technologies for remotely operating agricultural machines are also being developed.

Japanese Laid-Open Patent Publication No. 2021-073602 and Japanese Laid-Open Patent Publication No. 2021-029218 each disclose an example of system to cause an unmanned work vehicle to automatically travel between two fields separated from each other with a road being sandwiched therebetween. International Publication WO2016/017367 discloses an example of a device that remotely operates a work vehicle that travels autonomously.

SUMMARY OF THE INVENTION

Example embodiments of the present invention provide at least one of a technique for appropriately performing data transfer depending on a communication rate between a communication device and a remote device, and a technique for assisting in remote maneuvering of an agricultural machine.

An agricultural machine according to an example embodiment of the present disclosure includes a vehicle body, a sensor to sense an environment around the vehicle body to output sensing data, and a communication device to transmit the sensing data output from the sensor to a remote device. The sensor changes a data amount of the sensing data output to the communication device, depending on a communication rate from the communication device to the remote device.

A sensing system according to an example embodiment of the present disclosure includes a sensor to sense an environment around an agricultural machine to output sensing data, and a communication device to transmit the sensing data output from the sensor to a remote device. The sensor changes a data amount of the sensing data output to the communication device, depending on a communication rate from the communication device to the remote device.

A sensing method according to an example embodiment of the present disclosure includes obtaining sensing data from a sensor to sense an environment around an agricultural machine to output the sensing data, transmitting the sensing data from a communication device to a remote device, and causing the sensor to change a data amount of the sensing data, depending on a communication rate from the communication device to the remote device.

A remote maneuver system for an agricultural machine according to an example embodiment includes a sensor to sense an environment around the agricultural machine to output sensing data, a communication device to transmit transmission data based on the sensing data output from the sensor, to a remote device to transmit a maneuver command to the agricultural machine, and a controller configured or programmed to cause at least one of the agricultural machine or the sensor to, when a communication rate from the communication device to the remote device decreases, perform a compensation operation to reduce an influence of a deterioration in a displayed image indicating a state of surroundings of the agricultural machine based on the transmission data received by the remote device on a remote maneuver.

General or specific aspects of the present disclosure may be implemented using a device, a system, a method, an integrated circuit, a computer program, a non-transitory computer-readable storage medium, or any combination thereof. The computer-readable storage medium may be inclusive of a volatile storage medium, or a non-volatile storage medium. The device may include a plurality of devices. In the case where the device includes two or more devices, the two or more devices may be disposed within a single apparatus, or divided over two or more separate apparatuses.

According to example embodiments of the present disclosure, data transfer depending on a communication rate between a communication device and a remote device can be appropriately performed. Alternatively, the influence of a reduction in a communication rate between a communication device in an agricultural machine and a remote device on remote maneuver can be reduced.

The above and other elements, features, steps, characteristics and advantages of the present invention will become more apparent from the following detailed description of the example embodiments with reference to the attached drawings.

BRIEF DESCRIPTION OF THE DRAWINGS

FIG. 3 is a block diagram showing an example configuration of the work vehicle and the implement.

DETAILED DESCRIPTION OF THE EXAMPLE EMBODIMENTS

Figure 1A:
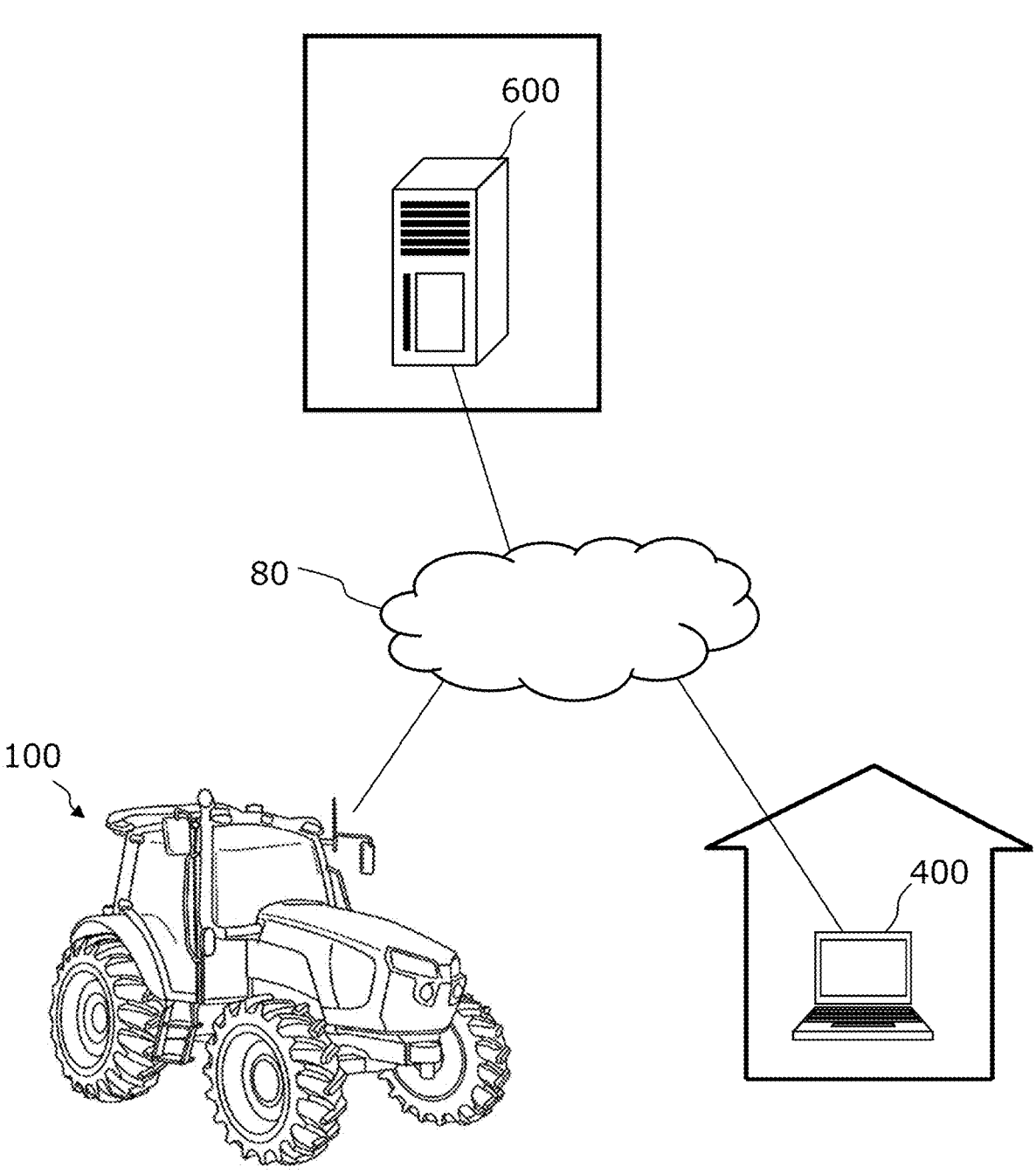
FIG. 1A is a diagram showing an example configuration of an agricultural management system.

In the present disclosure, an "agricultural machine" refers to a machine for agricultural applications. Examples of agricultural machines include tractors, harvesters, rice transplanters, vehicles for crop management, vegetable transplanters, mowers, seeders, spreaders, agricultural drones (i.e., unmanned aerial vehicles: UAV), and mobile robots for agriculture. Not only may a work vehicle (such as a tractor) function as an "agricultural machine" alone by itself, but also a combination of a work vehicle and an implement that is attached to, or towed by, the work vehicle may function as an "agricultural machine". For the ground surface within a field, the agricultural machine performs agricultural work such as tilling, seeding, preventive pest control, manure spreading, planting of crops, or harvesting. Such agricultural work or tasks may be referred to as "groundwork", or simply as "work" or "tasks". Travel of a vehicle-type agricultural machine performed while the agricultural machine also performs agricultural work may be referred to as "tasked travel".

"Self-driving" refers to controlling the movement of an agricultural machine by the action of a controller, rather than through manual operations of a driver. An agricultural machine that performs self-driving may be referred to as a "self-driving agricultural machine" or a "robotic agricultural machine". During self-driving, not only the movement of the agricultural machine, but also the operation of agricultural work (e.g., the operation of a work machine) may be controlled automatically. In the case where the agricultural machine is a vehicle-type machine, travel of the agricultural machine via self-driving will be referred to as "self-traveling". The controller may be configured or programmed to control at least one of steering that is required in the movement of the agricultural machine, adjustment of the moving speed, or beginning and ending a move. In the case of controlling a work vehicle having an implement attached thereto, the controller may be configured or programmed to control raising or lowering of the implement, beginning and ending of an operation of the implement, and so on. A move based on self-driving may include not only moving of an agricultural machine that goes along a predetermined path toward a destination, but also moving of an agricultural machine that follows a target of tracking. An agricultural machine that performs self-driving may also move partly based on the user's instructions. Moreover, an agricultural machine that performs self-driving may operate not only in a self-driving mode but also in a manual driving mode, where the agricultural machine moves through manual operations of the driver. When performed not manually but through the action of a controller, the steering of an agricultural machine will be referred to as "automatic steering". A portion of, or the entirety of, the controller may reside outside the agricultural machine. Control signals, commands, data, etc., may be communicated between the agricultural machine and a controller residing outside the agricultural machine. An agricultural machine that performs self-driving may move autonomously while sensing the surrounding environment, without any person being involved in the controlling of the movement of the agricultural machine. An agricultural machine that is capable of autonomous movement is able to travel in the field or outside the field (e.g., on roads) in an unmanned manner. During an autonomous move, operations of detecting and avoiding obstacles may be performed.

"Remote operation" or "remote maneuver" refers to operation of an agricultural machine using a remote operation device. Remote operation may be performed by an operator (e.g., a system manager or a user of an agricultural machine) who is located away from an agricultural machine. "Remotely operated traveling" means that an agricultural machine travels in response to a signal transmitted from a remote operation device. The remote operation device may be inclusive of devices having a signal transmission function such as personal computers (PCs), laptop computers, tablet computers, smartphones, or remote controls. The operator can give an agricultural machine a command to start, stop, accelerate, decelerate, change traveling direction, or the like by operating the remote operation device. The mode in which a controller controls travel of an agricultural machine in response to these commands is referred to as a "remote operation mode".

A "remote device" is a device that is located away from an agricultural machine and has a communication function. Remote devices may, for example, be a remote operation device that is used by an operator to remotely maneuver an agricultural machine. A remote device may include a display device (display) or may be connected to a display device. The display device can display an image (or video) obtained by visualizing a state of surroundings of an agricultural machine based on sensor data (also referred to as "sensing data") output from a sensor such as a camera or a LiDAR sensor included in the agricultural machine. The operator can recognize a state of surroundings of the agricultural machine and remotely maneuver the agricultural machine by operating the remote operation device if necessary while viewing the displayed image.

A "communication rate" refers to the amount of data transmitted per unit time in data communication. The communication rate is also referred to as a "communication amount per unit time". The communication rate from a communication device to a remote device means the data amount per unit time of data transmitted from the communication device to the remote device. The communication rate may, for example, be expressed in units of, for example, bits per second (bps), megabits per second (Mbps), or gigabits per second (Gbps).

A "work plan" is data defining a plan of one or more tasks of agricultural work to be performed by an agricultural machine. The work plan may include, for example, information representing the order of the tasks of agricultural work to be performed by an agricultural machine or the field where each of the tasks of agricultural work is to be performed. The work plan may include information representing the time and the date when each of the tasks of agricultural work is to be performed. In particular, the work plan including information representing the time and the date when each of the tasks of agricultural work is to be performed is referred to as a "work schedule" or simply as a "schedule". The work schedule may include information representing the time when each task of agricultural work is to be begun and/or ended on each of working days. The work plan or the work schedule may include information representing, for each task of agricultural work, the contents of the task, the implement to be used, and/or the types and amounts of agricultural supplies to be used. As used herein, "agricultural supplies" refers to goods used for agricultural work to be performed by an agricultural machine. The agricultural supplies may also be referred to simply as "supplies". The agricultural supplies may include goods consumed by agricultural work such as, for example, agricultural chemicals, fertilizers, seeds, or seedlings. The work plan may be created by a processor communicating with the agricultural machine to manage the agricultural machine or a processor mounted on the agricultural machine. The processor can be configured or programmed to create a work plan based on, for example, information input by the user (agricultural business executive, agricultural worker, etc.) operating a terminal device. In this specification, the processor communicating with the agricultural machine to manage the agricultural machine will be referred to as a "management device". The management device may manage agricultural work of a plurality agricultural machines. In this case, the management device may create a work plan including information on each task of agricultural work to be performed by each of the plurality of agricultural machines. The work plan may be downloaded to each of the agricultural machines and stored in a storage device in each of the agricultural machines. In order to perform the scheduled agricultural work in accordance with the work plan, each agricultural machine can automatically move to a field and perform the agricultural work.

An "environment map" is data representing, with a predetermined coordinate system, the position or the region of an object existing in the environment where the agricultural machine moves. The environment map may be referred to simply as a "map" or "map data". The coordinate system defining the environment map is, for example, a world coordinate system such as a geographic coordinate system fixed to the globe. Regarding the object existing in the environment, the environment map may include information other than the position (e.g., attribute information or other types of information). The "environment map" encompasses various type of maps such as a point cloud map and a lattice map. Data on a local map or a partial map that is generated or processed in a process of constructing the environment map is also referred to as a "map" or "map data".

An "agricultural road" is a road used mainly for agriculture. An "agricultural road" is not limited to a road paved with asphalt, and encompasses unpaved roads covered with soil, gravel or the like. An "agricultural road" encompasses roads (including private roads) on which only vehicle-type agricultural machines (e.g., work vehicles such as tractors, etc.) are allowed to travel and roads on which general vehicles (automobiles, trucks, buses, etc.) are also allowed to travel. The work vehicles may automatically travel on a general road in addition to an agricultural road. The "general road" is a road maintained for traffic of general vehicles.

Hereinafter, example embodiments of the present disclosure will be described. Note, however, that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of the claims. In the following description, elements having identical or similar functions are denoted by identical reference numerals.

The following example embodiments are only exemplary, and the techniques according to the present disclosure are not limited to the following example embodiments. For example, numerical values, shapes, materials, steps, orders of steps, layout of a display screen, etc., which are indicated in the following example embodiments are only exemplary, and various modifications are possible so long as it makes technological sense. Any one implementation may be combined with another so long as it makes technological sense to do so.

An example embodiment in which the techniques according to the present disclosure is applied to a work vehicle such as a tractor, which is an example of an agricultural machine, will be mainly described below. The techniques according to the present disclosure are applicable to not only tractors but also other agricultural machines that can perform remotely-operated traveling (e.g., rice transplanters, combines, harvesters, vehicles for crop management, vegetable transplanters, mowers, seeders, spreaders, agricultural drones, and mobile robots for agriculture). As an example, an example embodiment in which a work vehicle is provided with a travel control system for implementing a self-traveling function and a remote operation function will be described below. At least a portion of the functions of the travel control system may be implemented in other devices that communicate with the work vehicle (e.g., a remote device for remote maneuver, or a server).

FIG. 1A is a diagram providing an overview of an agriculture management system according to an illustrative example embodiment of the present disclosure. The agriculture management system shown in FIG. 1A includes a work vehicle 100, a remote device 400, and a management device 600. The remote device 400 includes a computer used by a user performing remote monitoring of the work vehicle 100. The management device 600 includes a computer managed by a business operator running the agriculture management system. The work vehicle 100, the remote device 400 and the management device 600 can communicate with each other via the network 80. FIG. 1A shows one work vehicle 100, but the agriculture management system may include a plurality of the work vehicles or any other agricultural machine. The agriculture management system according to the present example embodiment includes a remote maneuver system of the work vehicle 100. The remote maneuver system includes a sensor, communication device, and controller of the work vehicle 100, and the remote device 400. A portion of the entire remove maneuver system according to the present example embodiment that includes the sensor and communication device of the work vehicle 100 may be referred to as a "sensing system". Thus, the sensing system is a portion of the remote maneuver system.

In the present example embodiment, the work vehicle 100 is a tractor, for example. The work vehicle 100 can have an implement attached to its rear and/or its front. While performing agricultural work according to the particular type of implement, the work vehicle 100 is able to automatically travel inside a field. The work vehicle 100 may travel inside the field or outside the field with no implement being attached thereto.

In the present example embodiment, the work vehicle 100 has a self-driving function. In other words, the work vehicle 100 can travel by the action of a controller, rather than manually. The controller according to the present example embodiment is provided inside the work vehicle 100, and is configured or programmed to control both the speed and steering of the work vehicle 100. The work vehicle 100 can perform self-traveling outside the field (e.g., roads) as well as inside the field. The mode in which the controller causes the work vehicle 100 to perform self-traveling is referred to as a "self-traveling mode".

The work vehicle 100 further has a remotely-operated traveling function. The controller is configured or programmed to control a travel device of the work vehicle 100 in response to remote operation performed by the user using the remote device 400, to change the traveling speed and traveling direction of the work vehicle 100. The work vehicle 100 can perform remotely-operated traveling outside fields as well as inside fields. The mode in which the controller causes the work vehicle 100 to perform remotely-operated traveling is referred to as a "remote operation mode".

The work vehicle 100 includes a device usable for positioning or localization, such as a GNSS receiver or an LiDAR sensor. In the self-traveling mode, based on the position of the work vehicle 100 and information on a target path generated by the management device 600, the controller of the work vehicle 100 causes the work vehicle 100 to automatically travel. In addition to controlling the travel of the work vehicle 100, the controller also may be configured or programmed to control the operation of the implement. As a result, while automatically traveling inside the field, the work vehicle 100 is able to perform agricultural work by using the implement. In addition, the work vehicle 100 is able to automatically travel along the target path on a road outside the field (e.g., an agricultural road or a general road). In the case of performing self-traveling on a road outside the field, the work vehicle 100 travels while generating, along the target path, a local path along which the work vehicle 100 can avoid an obstacle, based on data output from a sensor such as a camera or a LiDAR sensor. Inside the field, the work vehicle 100 may travel while generating a local path in substantially the same manner as described above, or may perform an operation of traveling along the target path without generating a local path and halting when an obstacle is detected.

The management device 600 includes a computer to manage the agricultural work performed by the work vehicle 100. The management device 600 may be, for example, a server computer that performs centralized management on information regarding the field on the cloud and supports agriculture by use of the data on the cloud. The management device 600 can, for example, create a work plan for the work vehicle 100, and generate a target path for the work vehicle 100 in accordance with the work plan. Alternatively, the management device 600 may generate a target path for the work vehicle 100 in response to the user's operation using the remote device 400.

The remote device 400 includes a computer that is used by a user who is at a remote place from the work vehicle 100. The remote device 400 shown in FIG. 1A is a laptop computer, but the remote device 400 is not limited to this. The remote device 400 may be a stationary computer such as a desktop PC (personal computer), or a mobile terminal such as a smartphone or a tablet computer.

The remote device 400 may be used to perform remote monitoring of the work vehicle 100 or remote-operate the work vehicle 100. For example, the remote device 400 can display, on a display screen thereof, a video captured by one or more cameras included in the work vehicle 100. The user can watch the video to check the state of the surroundings of the work vehicle 100 and instruct the work vehicle 100 to stop, start, accelerate, decelerate, change traveling direction, and the like.

Figure 1B:
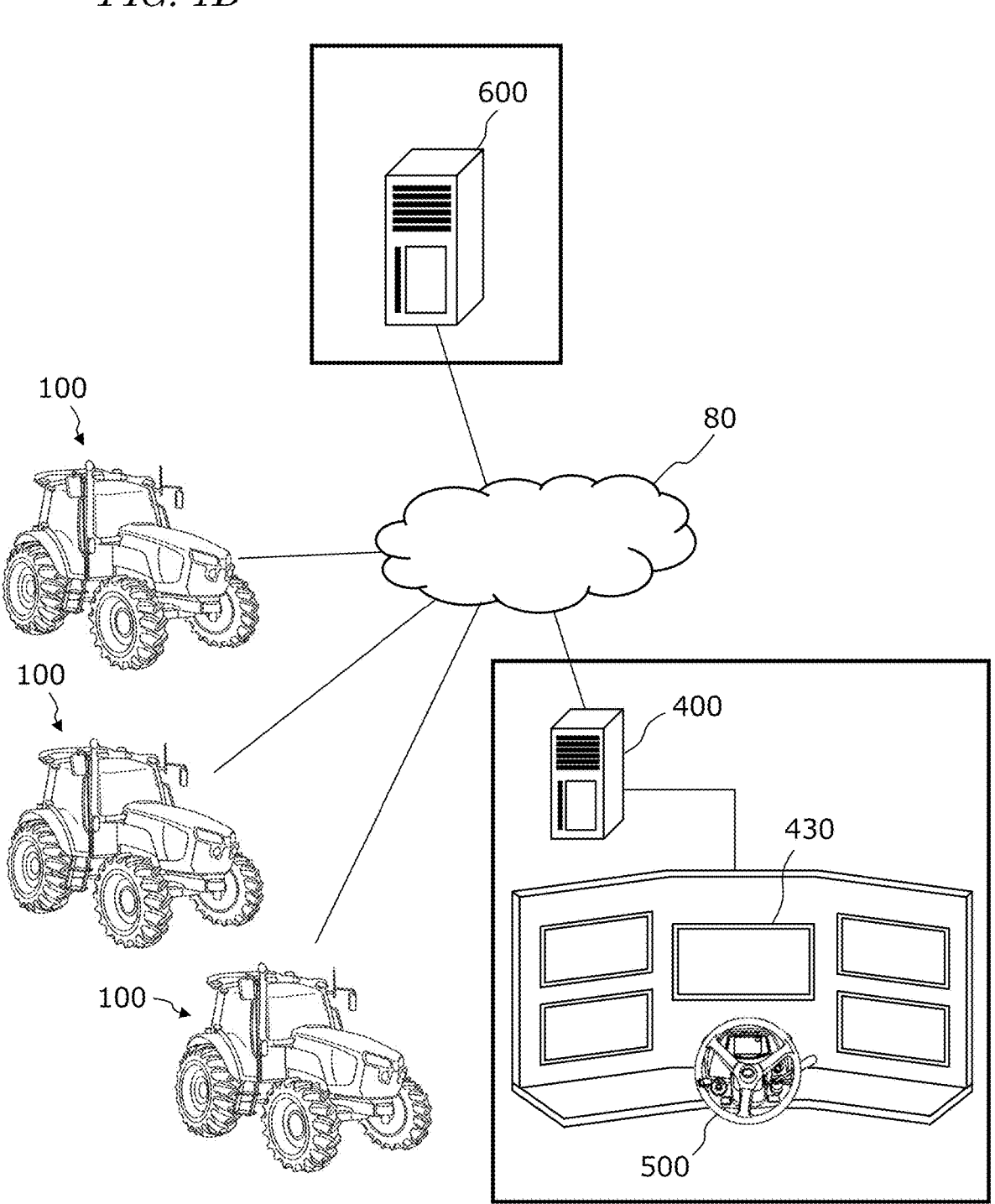
FIG. 1B is a diagram showing another example configuration of an agricultural management system.

FIG. 1B is a diagram showing another example of the agricultural management system. The agricultural management system shown in FIG. 1B includes a plurality of work vehicles 100. Although FIG. 1B illustrates three work vehicles 100, the number of work vehicles 100 is not particularly limited. The system may include agricultural machines (e.g., agricultural drones) different from the work vehicle 100. In the example of FIG. 1B, the remote device 400 is not a household terminal device, and includes a computer that is provided in a center for remotely monitoring agricultural machines. The remote device 400 may be connected to a remote control device 500 and at least one display 430 that are used by an operator in the remote monitoring center. Although FIG. 1B illustrates five displays 430, the number of displays 430 is not particularly limited. The remote control device 500 may include various apparatuses for remotely maneuvering the work vehicles 100 (e.g., a steering wheel, an accelerator pedal, left and right brake pedals, a clutch pedal, and various switches or levers). Although the remote control device 500 shown in FIG. 1B is a device that simulates an operation apparatus used in manual operation of the work vehicle 100, the remote control device 500 is not limited to such a device. For example, remote maneuver may be performed using a controller such as a joystick. Each display 430 can display, for example, an environment map of a region including a field on which the work vehicles 100 perform agricultural work, and images (e.g., moving images) captured by at least one camera mounted on the work vehicles 100. The operator can recognize a state of surroundings of the work vehicles 100 while viewing images displayed on the displays 430. The operator can remotely maneuver each agricultural machine, such as switching between the self-traveling mode and the remote operation mode, depending on a state of surroundings of each work vehicle 100.

Hereinafter, a configuration and an operation of the system according to the present example embodiment will be described in more detail.

Figure 2:
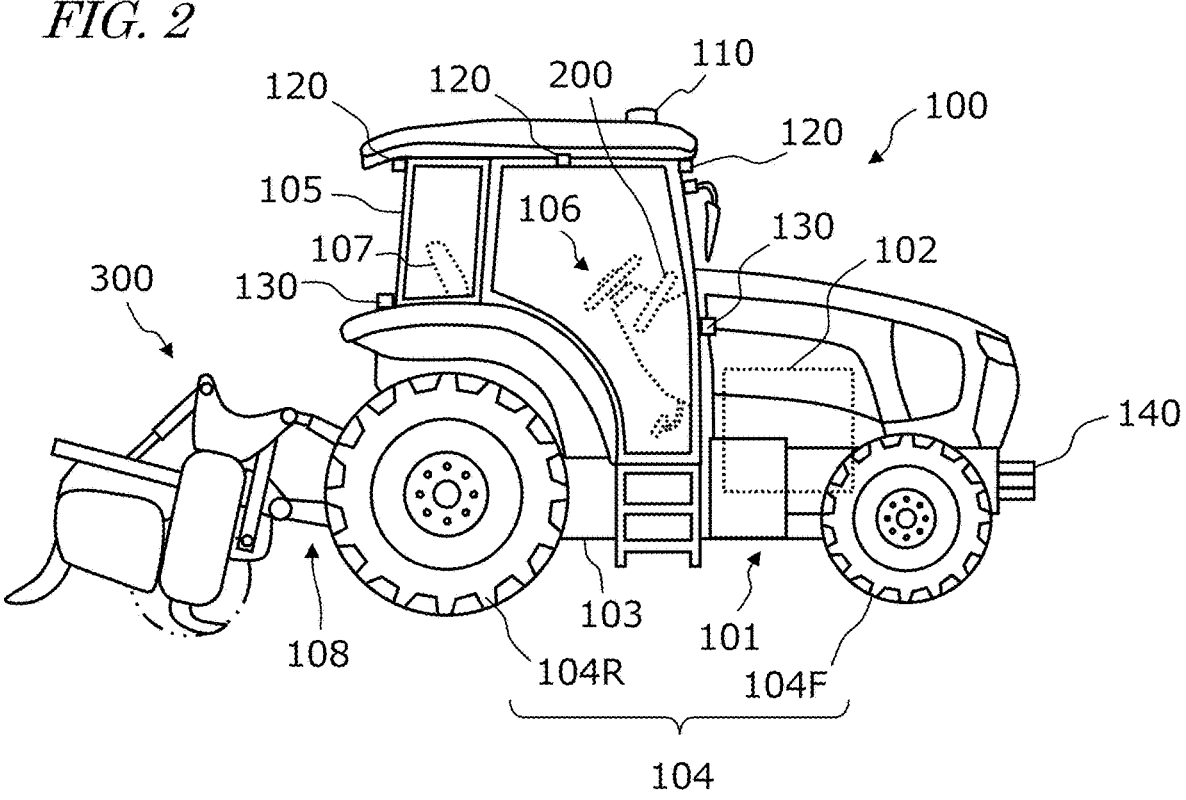
FIG. 2 is a side view schematically showing an example of work vehicle and an example of an implement that is linked to the work vehicle.

FIG. 2 is a side view schematically showing an example of the work vehicle 100 and an example of implement 300 linked to the work vehicle 100. The work vehicle 100 according to the present example embodiment can operate in both a manual driving mode and a self-driving mode. In the self-driving mode, the work vehicle 100 is able to perform unmanned travel. The work vehicle 100 can perform self-driving both inside and outside fields. In the self-driving mode, the controller can operate in a self-traveling mode in which the work vehicle 100 is caused to travel along a preset target path, and in a remote operation mode in which the work vehicle 100 is caused to travel in response to the user's operation using the remote device 400. The user may, for example, be the user of the work vehicle 100 or an operator in the remote monitoring center. Switching between the self-traveling mode and the remote operation mode may be carried out by the user performing a predetermined operation using the remote device 400. For example, when the user performs an operation of instructing to start remote operation using the remote device 400 in the self-traveling mode, the controller transitions to the remote operation mode. When the user performs an operation of instructing to start self-traveling using the remote device 400 in the remote operation mode, the controller transitions to the self-traveling mode.

As shown in FIG. 2, the work vehicle 100 includes a vehicle body 101, a prime mover (engine) 102, and a transmission 103. In the vehicle body 101, a travel device including tire-mounted wheels 104, and a cabin 105, are provided. The travel device includes four wheels 104, axles for rotating the four wheels, and braking devices (brakes) for slowing or stopping the respective axles. The wheels 104 include a pair of front wheels 104F and a pair of rear wheels 104R. Inside the cabin 105, a driver's seat 107, a steering device 106, an operational terminal 200, and switches for manipulation are provided. In the case where the work vehicle 100 performs tasked travel inside the field, the front wheels 104F and/or the rear wheels 104R may be replaced with a plurality of wheels (crawlers) to which a continuous track is attached, instead of tire-mounted wheels.

The work vehicle 100 can switch between a four-wheel drive (4 W) mode in which all of the front wheels 104F and the rear wheels 104R are a driven wheel, and a two-wheel drive (2 W) mode in which the front wheels 104F or the rear wheels 104R are a driven wheel. The work vehicle 100 can also switch between a state in which the left and right brakes are linked together and a state in which the linkage is removed. When the linkage of the left and right brakes is removed, the left and right wheels 104 can be slowed or stopped separately. As a result, turning with a small turning radius can be performed.

The work vehicle 100 includes a plurality of sensors sensing the surroundings of the work vehicle 100. In the example shown in FIG. 2, the sensors include a plurality of cameras 120, a LiDAR sensor 140, and a plurality of obstacle sensors 130. The sensor may include only a portion of the camera 120, the LiDAR sensor 140, and the obstacle sensor 130. The sensor senses an environment around the vehicle body to output sensing data.

The cameras 120 may be provided at the front/rear/right/left of the work vehicle 100, for example. The cameras 120 image the surrounding environment of the work vehicle 100 and generate image data. As used herein, image data generated by the camera 120 may be simply referred to as an "image". In addition, to generate image data by imaging may be referred to as "to obtain an image". The images obtained by the cameras 120 may be transmitted to the remote device 400, which is responsible for remote monitoring. The images may be used to monitor the work vehicle 100 during unmanned driving. The cameras 120 may also be used to generate images to allow the work vehicle 100, traveling on a road outside the field (an agricultural road or a general road), to recognize objects, obstacles, white lines, road signs, traffic signs or the like in the surroundings of the work vehicle 100.

The LiDAR sensor 140 in the example shown in FIG. 2 is disposed on a bottom portion of a front surface of the vehicle body 101. The LiDAR sensor 140 may be disposed at any other position. While the work vehicle 100 is traveling mainly outside the field, the LiDAR sensor 140 repeatedly outputs sensor data representing the distance and the direction between an object existing in the surrounding environment thereof and each of measurement points, or a two-dimensional or three-dimensional coordinate values of each of the measurement points. The sensor data output from the LiDAR sensor 140 is processed by the controller of the work vehicle 100. The controller can perform localization of the work vehicle 100 by matching the sensor data against the environment map. The controller can further detect an object such as an obstacle existing in the surroundings of the work vehicle 100 based on the sensor data, and generate, along a target path (also referred to as a "global path"), a local path along which the work vehicle 100 needs to actually proceed. The controller can utilize an algorithm such as, for example, SLAM (Simultaneous Localization and Mapping) to generate or edit an environment map. The work vehicle 100 may include a plurality of LiDAR sensors disposed at different positions with different orientations.

The plurality of obstacle sensors 130 shown in FIG. 2 are provided at the front and the rear of the cabin 105. The obstacle sensors 130 may be disposed at other positions. For example, one or more obstacle sensors 130 may be disposed at any position at the sides, the front or the rear of the vehicle body 101. The obstacle sensors 130 may include, for example, a laser scanner or an ultrasonic sonar. The obstacle sensors 130 may be used to detect obstacles in the surroundings of the work vehicle 100 during self-traveling to cause the work vehicle 100 to halt or detour around the obstacles. The LiDAR sensor 140 may be used as one of the obstacle sensors 130.

The work vehicle 100 further includes a GNSS unit 110. The GNSS unit 110 includes a GNSS receiver. The GNSS receiver may include an antenna to receive a signal(s) from a GNSS satellite(s) and a processor to calculate the position of the work vehicle 100 based on the signal(s) received by the antenna. The GNSS unit 110 receives satellite signals transmitted from the plurality of GNSS satellites, and performs positioning based on the satellite signals. Although the GNSS unit 110 according to the present example embodiment is disposed above the cabin 105, it may be disposed at any other position.

The GNSS unit 110 may include an inertial measurement unit (IMU). Signals from the IMU can be utilized to complement position data. The IMU can measure a tilt or a small motion of the work vehicle 100. The data obtained by the IMU can be used to complement the position data based on the satellite signals, so as to improve the performance of positioning.

The controller of the work vehicle 100 may utilize, for positioning, the sensing data acquired by the sensors such as the cameras 120 or the LIDAR sensor 140, in addition to the positioning results provided by the GNSS unit 110. In the case where objects serving as characteristic points exist in the environment that is traveled by the work vehicle 100, as in the case of an agricultural road, a forest road, a general road or an orchard, the position and the orientation of the work vehicle 100 can be estimated with a high accuracy based on data that is acquired by the cameras 120 or the LiDAR sensor 140 and on an environment map that is previously stored in the storage device. By correcting or complementing position data based on the satellite signals using the data acquired by the cameras 120 or the LiDAR sensor 140, it becomes possible to identify the position of the work vehicle 100 with a higher accuracy.

The prime mover 102 may be a diesel engine, for example. Instead of a diesel engine, an electric motor may be used. The transmission 103 can change the propulsion and the moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the steered wheels, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force to change the steering angle of the front wheels 104F. When automatic steering is performed, under the control of a controller disposed in the work vehicle 100, the steering angle may be automatically adjusted by the power of the hydraulic device or the electric motor.

A linkage device 108 is provided at the rear of the vehicle body 101. The linkage device 108 includes, e.g., a three-point linkage (also referred to as a "three-point link" or a "three-point hitch"), a PTO (Power Take Off) shaft, a universal joint, and a communication cable. The linkage device 108 allows the implement 300 to be attached to, or detached from, the work vehicle 100. The linkage device 108 is able to raise or lower the three-point link with a hydraulic device, for example, thus changing the position and/or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 101. In that case, the implement may be connected frontward of the work vehicle 100.

Although the implement 300 shown in FIG. 2 is a rotary tiller, the implement 300 is not limited to a rotary tiller. For example, any arbitrary implement such as a seeder, a spreader, a transplanter, a mower, a rake implement, a baler, a harvester, a sprayer, or a harrow, may be connected to the work vehicle 100 for use.

The work vehicle 100 shown in FIG. 2 can be driven by human driving; alternatively, it may only support unmanned driving. In that case, component elements which are only required for human driving, e.g., the cabin 105, the steering device 106, and the driver's seat 107 do not need to be provided in the work vehicle 100. An unmanned work vehicle 100 may travel via autonomous driving, or by remote operation by a user.

Figure 3:
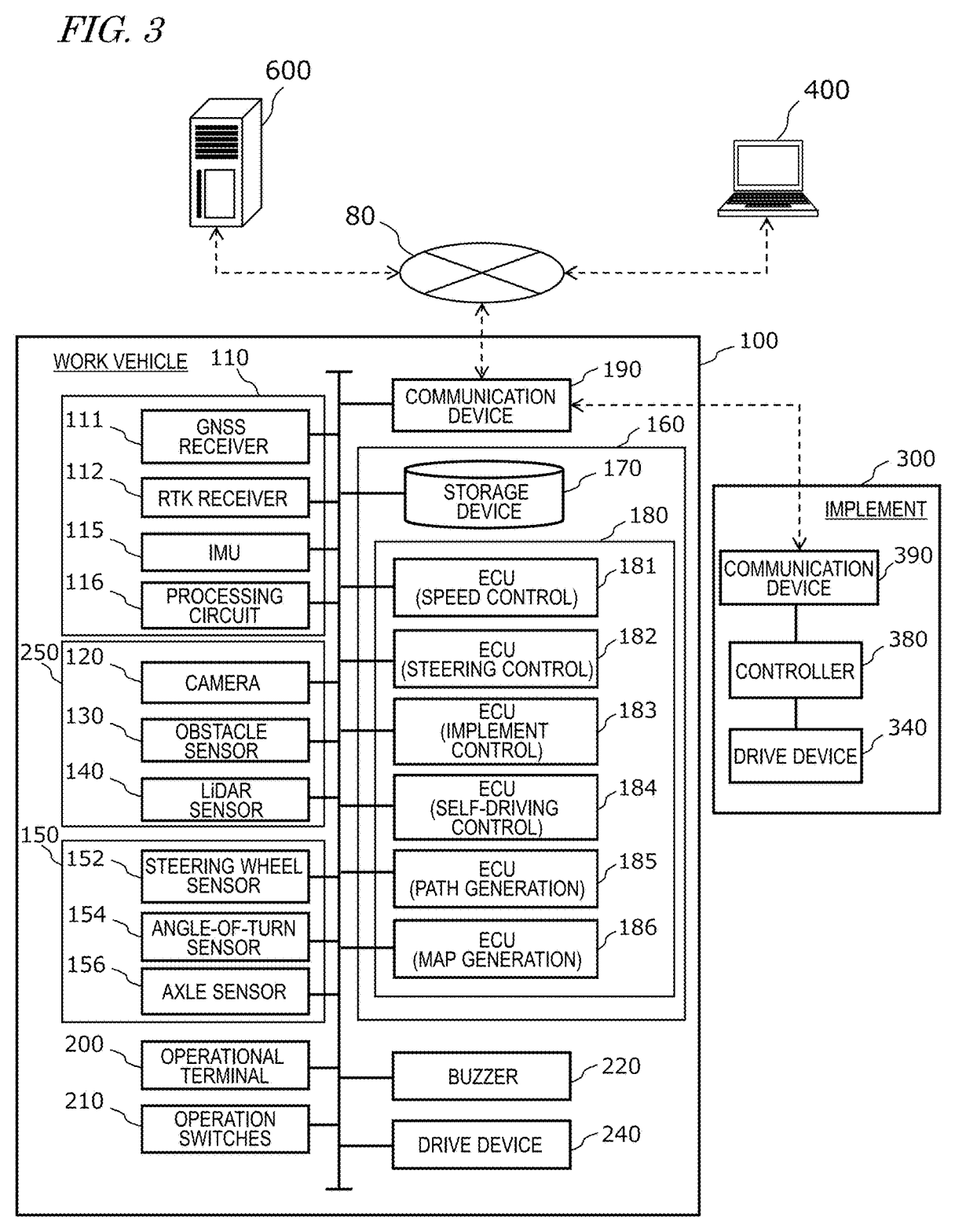

FIG. 3 is a block diagram showing an example configuration of the work vehicle 100 and the implement 300. The work vehicle 100 and the implement 300 can communicate with each other via a communication cable that is included in the linkage device 108. The work vehicle 100 is able to communicate with the remote device 400 and the management device 600 via the network 80.

In addition to the GNSS unit 110, the sensors 250 (the cameras 120, the obstacle sensors 130, and the LiDAR sensor 140), and the operational terminal 200, the work vehicle 100 in the example of FIG. 3 includes sensors 150 to detect the operating status of the work vehicle 100, a travel control system 160, a communication device 190, operation switches 210, a buzzer 220, and a drive device 240. These component elements are communicably connected with each other via a bus. The GNSS unit 110 includes a GNSS receiver 111, an RTK receiver 112, an inertial measurement unit (IMU) 115, and a processing circuit 116. The sensors 150 include a steering wheel sensor 152, an angle-of-turn sensor 154, and an axle sensor 156. The travel control system 160 includes a storage device 170 and a controller 180. The controller 180 includes a plurality of electronic control units (ECU) 181 to 186. The implement 300 includes a drive device 340, a controller 380, and a communication device 390. Note that FIG. 3 shows component elements which are relatively closely related to the operations of self-driving and remote steering by the work vehicle 100, while other components are omitted from illustration.

The GNSS receiver 111 in the GNSS unit 110 receives satellite signals transmitted from a plurality of GNSS satellites and generates GNSS data based on the satellite signals. The GNSS data is generated in a predetermined format such as, for example, the NMEA-0183 format. The GNSS data may include, for example, the identification number, the angle of elevation, the azimuth angle, and a value representing the reception strength of each of satellites from which the satellite signals are received.

Figure 4:
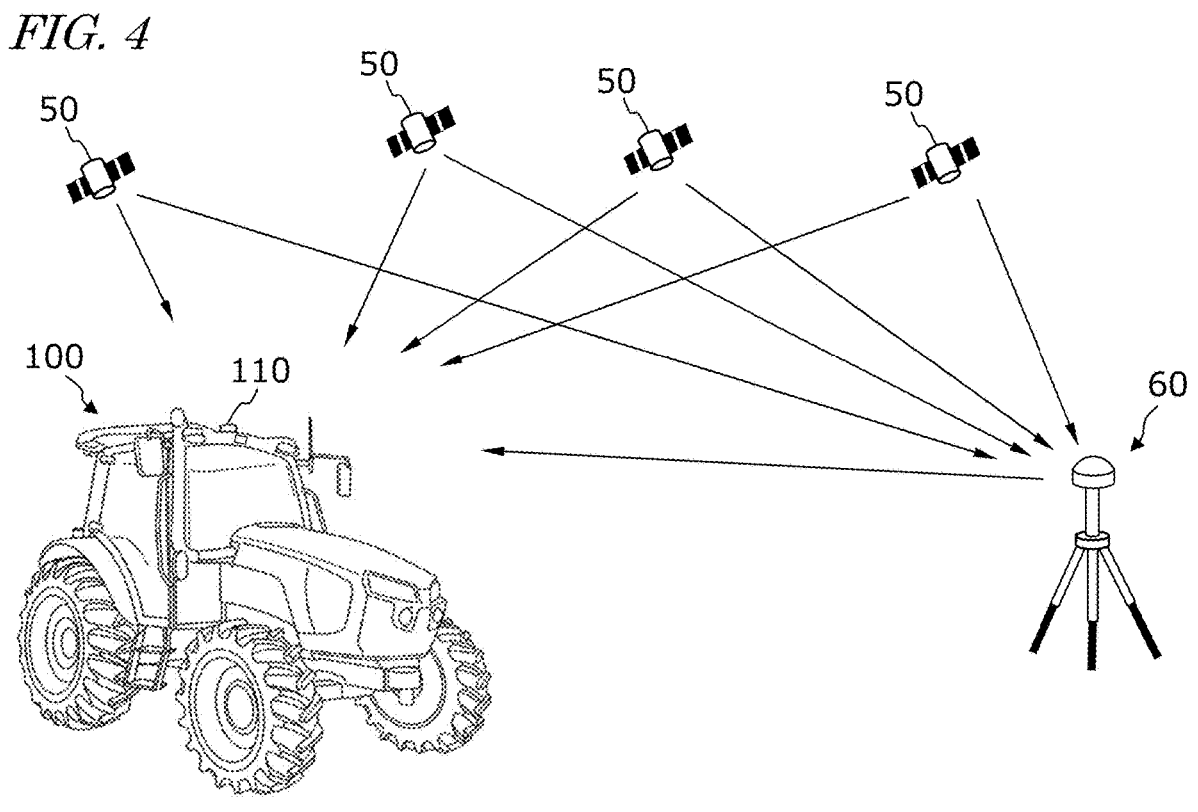
FIG. 4 is a conceptual diagram showing an example of the work vehicle performing positioning based on an RTK-GNSS.

The GNSS unit 110 shown in FIG. 3 performs positioning of the work vehicle 100 by utilizing an RTK (Real Time Kinematic)-GNSS. FIG. 4 is a conceptual diagram showing an example of the work vehicle 100 performing positioning based on the RTK-GNSS. In the positioning based on the RTK-GNSS, not only satellite signals transmitted from a plurality of GNSS satellites 50, but also a correction signal that is transmitted from a reference station 60 is used. The reference station 60 may be disposed near the field that is traveled and worked by the work vehicle 100 (e.g., at a position within about 10 km of the work vehicle 100). The reference station 60 generates a correction signal of, for example, an RTCM format based on the satellite signals received from the plurality of GNSS satellites 50, and transmits the correction signal to the GNSS unit 110. The RTK receiver 112, which includes an antenna and a modem, receives the correction signal transmitted from the reference station 60. Based on the correction signal, the processing circuit 116 of GNSS unit 110 corrects the results of the positioning performed by use of the GNSS receiver 111. Use of the RTK-GNSS enables positioning with an accuracy on the order of several centimeters of errors, for example. Positional information (including latitude, longitude, and altitude information) is obtained through the highly accurate positioning by the RTK-GNSS. The GNSS unit 110 calculates the position of the work vehicle 100 as frequently as, for example, one to ten times per second.

Note that the positioning method is not limited to being performed by use of an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System). In the case where positional information with the necessary accuracy can be obtained without the use of the correction signal transmitted from the reference station 60, positional information may be generated without using the correction signal. In that case, the GNSS unit 110 does not need to include the RTK receiver 112.

Even in the case where the RTK-GNSS is used, at a site where the correction signal from the reference station 60 cannot be acquired (e.g., on a road far from the field), the position of the work vehicle 100 is estimated by another method with no use of the signal from the RTK receiver 112. For example, the position of the work vehicle 100 may be estimated by matching the data output from the LiDAR sensor 140 and/or the cameras 120 against a highly accurate environment map.

The GNSS unit 110 in the present example embodiment further includes the IMU 115. The IMU 115 may include a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the work vehicle 100. Based not only on the satellite signals and the correction signal but also on a signal that is output from the IMU 115, the processing circuit 116 can estimate the position and orientation of the work vehicle 100 with a higher accuracy. The signal that is output from the IMU 115 may be used for the correction or complementation of the position that is calculated based on the satellite signals and the correction signal. The IMU 115 outputs a signal more frequently than the GNSS receiver 111. Utilizing this signal that is output highly frequently, the processing circuit 116 allows the position and orientation of the work vehicle 100 to be measured more frequently (e.g., about 10 Hz or above). Instead of the IMU 115, a 3-axis accelerometer and a 3-axis gyroscope may be separately provided. The IMU 115 may be provided as a separate device from the GNSS unit 110.

The cameras 120 are imagers that image the surrounding environment of the work vehicle 100. Each of the cameras 120 includes an image sensor such as a CCD (Charge Coupled Device) or a CMOS (Complementary Metal Oxide Semiconductor), for example. In addition, each camera 120 may include an optical system including one or more lenses and a signal processing circuit. During travel of the work vehicle 100, the cameras 120 image the surrounding environment of the work vehicle 100, and generate image data (e.g., moving image data). The cameras 120 are able to capture moving images at a frame rate of 3 frames/second (fps: frames per second) or greater, for example. The images generated by the cameras 120 may be used when a remote supervisor checks the surrounding environment of the work vehicle 100 with the remote device 400, for example. The images generated by the cameras 120 may also be used for the purpose of positioning and/or detection of obstacles. As shown in FIG. 2, the plurality of cameras 120 may be provided at different positions on the work vehicle 100, or a single camera 120 may be provided. A visible camera(s) to generate visible light images and an infrared camera(s) to generate infrared images may be separately provided. Both of a visible camera(s) and an infrared camera(s) may be provided as cameras for generating images for monitoring purposes. The infrared camera(s) may also be used for detection of obstacles at nighttime.

The obstacle sensors 130 detect objects around the work vehicle 100. Each of the obstacle sensors 130 may include a laser scanner or an ultrasonic sonar, for example. When an object exists at a position within a predetermined distance from the obstacle sensor 130, the obstacle sensor 130 outputs a signal indicating the presence of the obstacle. The plurality of obstacle sensors 130 may be provided at different positions on the work vehicle 100. For example, a plurality of laser scanners and a plurality of ultrasonic sonars may be disposed at different positions on the work vehicle 100. Providing such a great number of obstacle sensors 130 can reduce blind spots in monitoring obstacles around the work vehicle 100.

The steering wheel sensor 152 measures the angle of rotation of the steering wheel of the work vehicle 100. The angle-of-turn sensor 154 measures the angle of turn of the front wheels 104F, which are the steered wheels. Measurement values by the steering wheel sensor 152 and the angle-of-turn sensor 154 are used for steering control by the controller 180.

The axle sensor 156 measures the rotational speed, i.e., the number of revolutions per unit time, of an axle that is connected to a wheel 104. The axle sensor 156 may be a sensor including a magnetoresistive element (MR), a Hall generator, or an electromagnetic pickup, for example. The axle sensor 156 outputs a numerical value indicating the number of revolutions per minute (unit: rpm) of the axle, for example. The axle sensor 156 is used to measure the speed of the work vehicle 100.

The drive device 240 includes various types of devices required to cause the work vehicle 100 to travel and to drive the implement 300; for example, the prime mover 102, the transmission 103, the steering device 106, the linkage device 108 and the like described above. The prime mover 102 may include an internal combustion engine such as, for example, a diesel engine. The drive device 240 may include an electric motor for traction instead of, or in addition to, the internal combustion engine.

The buzzer 220 is an audio output device to present an alarm sound to alert the user of an abnormality. For example, the buzzer 220 may present an alarm sound when an obstacle is detected during self-driving. The buzzer 220 is controlled by the controller 180.

The storage device 170 includes one or more storage mediums such as a flash memory or a magnetic disc. The storage device 170 stores various data that is generated by the GNSS unit 110, the cameras 120, the obstacle sensors 130, the LiDAR sensor 140, the sensors 150, and the controller 180. The data that is stored by the storage device 170 includes map data on the environment where the work vehicle 100 travels (environment map) and data on a global path for self-driving (target path). The environment map includes information on a plurality of fields where the work vehicle 100 performs agricultural work and roads in the surroundings of the fields. The environment map and the target path may be generated by a processing device (i.e., a processor) in the management device 600. It should be noted that the controller 180 according to the present example embodiment may have a function of generating or editing an environment map and a target path. The controller 180 can edit the environment map and the target path, acquired from the management device 160, in accordance with the environment where the work vehicle 100 travels.

The storage device 170 also stores data on a work plan received by the communication device 190 from the management device 600. The work plan includes information on a plurality of tasks of agricultural work to be performed by the work vehicle 100 over a plurality of working days. The work plan may be, for example, data on a work schedule including information on the time when the work vehicle 100 is scheduled to perform each task of agricultural work on each of the working days. The storage device 170 also stores a computer program(s) to cause each of the ECUs in the controller 180 to perform various operations described below. Such a computer program(s) may be provided to the work vehicle 100 via a storage medium (e.g., a semiconductor memory, an optical disc, etc.) or through telecommunication lines (e.g., the Internet). Such a computer program(s) may be marketed as commercial software.

The controller 180 includes the plurality of ECUs. The plurality of ECUs may include, for example, the ECU 181 for speed control, the ECU 182 for steering control, the ECU 183 for implement control, the ECU 184 for self-driving control, the ECU 185 for path generation, and the ECU 186 for map generation.

The ECU 181 controls the prime mover 102, the transmission 103 and brakes included in the drive device 240, thus controlling the speed of the work vehicle 100.

The ECU 182 controls the hydraulic device or the electric motor included in the steering device 106 based on a measurement value of the steering wheel sensor 152, thus controlling the steering of the work vehicle 100.

In order to cause the implement 300 to perform a desired operation, the ECU 183 controls the operation of the three-point link, the PTO shaft and the like that are included in the linkage device 108. Also, the ECU 183 generates a signal to control the operation of the implement 300, and transmits this signal from the communication device 190 to the implement 300.

Based on data output from the GNSS unit 110, the cameras 120, the obstacle sensors 130, the LiDAR sensor 140 and the sensors 150, the ECU 184 performs computation and control to achieve self-driving. For example, the ECU 184 specifies the position of the work vehicle 100 based on the data output from at least one of the GNSS unit 110, the cameras 120 and the LiDAR sensor 140. Inside the field, the ECU 184 may determine the position of the work vehicle 100 based only on the data output from the GNSS unit 110. The ECU 184 may estimate or correct the position of the work vehicle 100 based on the data acquired by the cameras 120 or the LiDAR sensor 140. Use of the data acquired by the cameras 120 or the LiDAR sensor 140 allows the accuracy of the positioning to be further improved. Outside the field, the ECU 184 estimates the position of the work vehicle 100 by use of the data output from the LiDAR sensor 140 or the cameras 120. For example, the ECU 184 may estimate the position of the work vehicle 100 by matching the data output from the LiDAR sensor 140 or the cameras 120 against the environment map. During self-driving, the ECU 184 performs computation necessary for the work vehicle 100 to travel along a target path or a local path, based on the estimated position of the work vehicle 100. The ECU 184 sends the ECU 181 a command to change the speed, and sends the ECU 182 a command to change the steering angle. In response to the command to change the speed, the ECU 181 controls the prime mover 102, the transmission 103 or the brakes to change the speed of the work vehicle 100. In response to the command to change the steering angle, the ECU 182 controls the steering device 106 to change the steering angle.

The ECU 184 also performs control related to the remotely-operated traveling of the work vehicle 100. In the remote operation mode, the ECU 184 controls the ECUs 181, 182, and 183 in response to a signal that is received by the communication device 190 from the remote device 400. As a result, operations such as speed control and steering control of the work vehicle 100, raising and lowering of the implement 300, and switching on/off of the implement 300 can be carried out in response to the user's remote operation.

While the work vehicle 100 is traveling along the target path, the ECU 185 consecutively generates a local path along which the work vehicle 100 can avoid an obstacle. During travel of the work vehicle 100, the ECU 185 recognizes an obstacle existing in the surroundings of the work vehicle 100 based on the data output from the cameras 120, the obstacle sensors 130 and the LiDAR sensor 140. The ECU 185 generates a local path such that the work vehicle 100 avoids the recognized obstacle.

The ECU 185 may have a function of performing global path planning instead of the management device 160. In that case, the ECU 185 may determine a destination of the work vehicle 100 based on the work schedule stored in the storage device 170 and determine a target path from the start position of the work vehicle 100 to the destination. The ECU 185 can generate, for example, a path by which the work vehicle 100 can arrive at the destination within the shortest time period, as the target path, based on the environment map including the information on the roads stored in the storage device 170. Alternatively, the ECU 185 may generate, as a target path, a path including a particular type(s) of road (e.g., agricultural roads, roads along particular objects such as waterways, and roads on which satellite signals can be satisfactorily received from a GNSS satellite) with higher priority, based on attribute information of roads included in an environment map.

The ECU 186 generates or edits a map of the environment where the work vehicle 100 travels. In the present example embodiment, an environment map generated by an external device such as the management device 600 is transmitted to the work vehicle 100 and recorded in the storage device 170. Instead, the ECU 186 can generate or edit an environment map. Hereinafter, an operation in a case where the ECU 186 generates an environment map will be described. An environment map may be generated based on sensor data output from the LiDAR sensor 140. For generating an environment map, the ECU 186 consecutively generates three-dimensional point cloud data based on the sensor data output from the LiDAR sensor 140 while the work vehicle 100 is traveling. The ECU 186 can generate an environment map by connecting the point cloud data consecutively generated by use of an algorithm such as, for example, SLAM. The environment map generated in this manner is a highly accurate three-dimensional map, and may be used for localization performed by the ECU 184. Based on this three-dimensional map, a two-dimensional map usable for the global path planning may be generated. In this specification, the three-dimensional map that is used for the localization and the two-dimensional map that is used for the global path planning will be both referred to as an "environment map". The ECU 186 can further edit the map by adding, to the map, various types of attribute information on objects (e.g., waterways, rivers, grasses, and trees), the type of a road (e.g., whether or not the road is an agricultural road), the state of the road surface, how easily the road is passable, or the like that is recognized based on the data output from the camera 120 or the LiDAR sensor 140.

Through the actions of these ECUs, the controller 180 realizes self-traveling and remote-operated traveling. During self-traveling, the controller 180 controls the drive device 240 based on the measured or estimated position of the work vehicle 100 and on the generated path. As a result, the controller 180 can cause the work vehicle 100 to travel along the target path. During remotely-operated traveling, the controller 180 controls travel of the work vehicle 100 based on a signal (also referred to as a "maneuver command") transmitted from the remote device 400. In other words, the controller 180 controls the drive device 240 in response to the user's operation using the remote device 400. As a result, the controller 180 can cause the work vehicle 100 to travel in accordance with the user's command.

The plurality of ECUs included in the controller 180 can communicate with each other in accordance with a vehicle bus standard such as, for example, a CAN (Controller Area Network). Instead of the CAN, faster communication methods such as Automotive Ethernet (registered trademark) may be used. Although the ECUs 181 to 186 are illustrated as individual blocks in FIG. 3, the function of each of the ECU 181 to 186 may be implemented by a plurality of ECUs. Alternatively, an onboard computer that integrates the functions of at least some of the ECUs 181 to 186 may be provided. The controller 180 may include ECUs other than the ECUs 181 to 186, and any number of ECUs may be provided in accordance with functionality. Each ECU includes a processing circuit including one or more processors.

The communication device 190 is a device including a circuit communicating with the implement 300, the remote device 400, and the management device 600. The communication device 190 transmits sensing data output from the sensor 250, or transmission data such as image data based on the sensing data, to the remote device 400. The communication device 190 includes circuitry to perform exchanges of signals complying with an ISOBUS standard such as ISO-BUS-TIM, for example, between itself and the communication device 390 of the implement 300. This allows the implement 300 to perform a desired operation, or allows information to be obtained from the implement 300. The communication device 190 may further include an antenna and a communication circuit to exchange signals via the network 80 with communication devices of the remote device 400 and the management device 600. The network 80 may include a 3G, 4G, 5G, or any other cellular mobile communications network and the Internet, for example. The communication device 190 may have the function of communicating with a mobile terminal that is used by a supervisor who is situated near the work vehicle 100. With such a mobile terminal, communication may be performed based on any arbitrary wireless communication standard, e.g., Wi-Fi (registered trademark), 3G, 4G, 5G or any other cellular mobile communication standard, or Bluetooth (registered trademark).

The operational terminal 200 is a terminal for the user to perform a operation related to the travel of the work vehicle 100 and the operation of the implement 300, and may also be referred to as a virtual terminal (VT). The operational terminal 200 may include a display device such as a touch screen panel, and/or one or more buttons. The display device may be a display such as a liquid crystal display or an organic light-emitting diode (OLED) display, for example. By operating the operational terminal 200, the user can perform various operations, such as, for example, switching ON/OFF the self-driving mode, switching ON/OFF the remote operation mode, recording or editing an environment map, setting a target path, and switching ON/OFF the implement 300. At least a portion of these manipulations may also be realized by manipulating the operation switches 210. The operational terminal 200 may be configured so as to be detachable from the work vehicle 100. A user who is at a remote place from the work vehicle 100 may operate the detached operational terminal 200 to control the operation of the work vehicle 100. Instead of the operational terminal 200, the user may operate a computer on which necessary application software is installed, for example, the remote device 400, to control the operation of the work vehicle 100.

Figure 5:
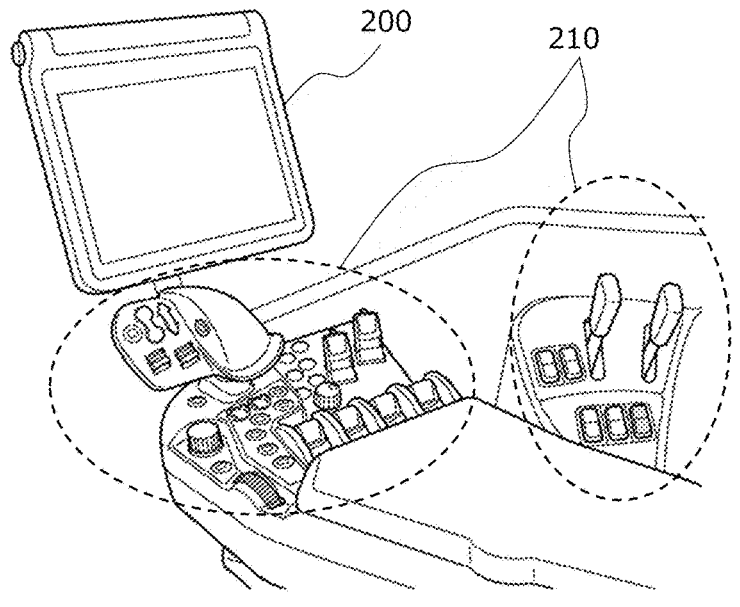
FIG. 5 is a view showing an example of operational terminal and an example of operation switches disposed in a cabin.

FIG. 5 is a diagram showing an example of the operational terminal 200 and an example of the operation switches 210 both provided in the cabin 105. In the cabin 105, the operation switches 210, including a plurality of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to switch between four-wheel drive and two-wheel drive, a switch to remove the linkage of the left and right brakes, a switch to raise or lower the implement 300, and the like. In the case where the work vehicle 100 only performs unmanned driving and lacks human driving functionality, the work vehicle 100 does not need to include the operation switches 210.

At least a portion of the operations that can be carried out by the operation terminal 200 or the operation switches 210 may also be carried out by remote operations using the remote device 400. Any of the operations may be carried out by the user performing a predetermined operation on a screen displayed on the display of the remote device 400.

The drive device 340 in the implement 300 shown in FIG. 3 performs operations necessary for the implement 300 to perform predetermined work. The drive device 340 includes a device suitable for uses of the implement 300, for example, a hydraulic device, an electric motor, a pump or the like. The controller 380 controls the operation of the drive device 340. In response to a signal that is transmitted from the work vehicle 100 via the communication device 390, the controller 380 causes the drive device 340 to perform various operations. Moreover, a signal that is in accordance with the state of the implement 300 may be transmitted from the communication device 390 to the work vehicle 100.

Figure 6:
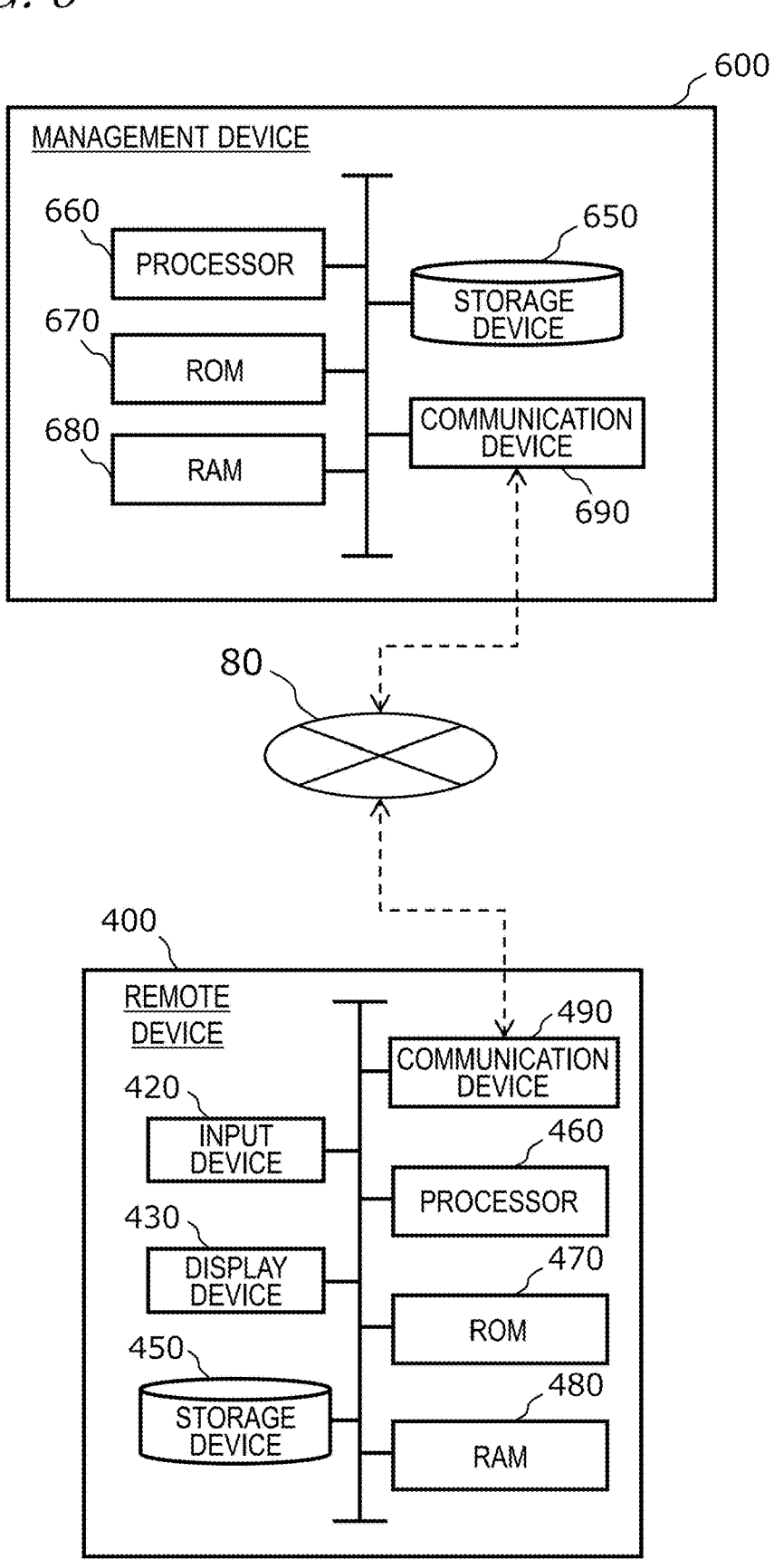
FIG. 6 is a block diagram illustrating hardware configurations of a management device and a remote device.

Now, a configuration of the management device 600 and the remote device 400 will be described with reference to FIG. 6. FIG. 6 is a block diagram showing an example of schematic hardware configuration of the management device 600 and the remote device 400.

The management device 600 includes a storage device 650, a processor 660, a ROM (Read Only Memory) 670, a RAM (Random Access Memory) 680, and a communication device 690. These component elements are communicably connected to each other via a bus. The management device 600 may function as a cloud server to manage the schedule of the agricultural work to be performed by the work vehicle 100 in a field and support agriculture by use of the data managed by the management device 600 itself. The user can input information necessary to create a work plan by use of the remote device 400 and upload the information to the management device 600 via the network 80. The management device 600 can create a schedule of agricultural work, that is, a work plan based on the information. The management device 600 can further generate or edit an environment map and perform global path planning for the work vehicle 100. The environment map may be distributed from a computer external to the management device 600.

The communication device 690 is a communication module to communicate with the work vehicle 100 and the remote device 400 via the network 80. The communication device 690 can perform wired communication in compliance with communication standards such as, for example, IEEE1394 (registered trademark) or Ethernet (registered trademark). The communication device 690 may perform wireless communication in compliance with Bluetooth (registered trademark) or Wi-Fi, or cellular mobile communication based on 3G, 4G, 5G or any other cellular mobile communication standard.

The processor 660 may be, for example, an integrated circuit including a central processing unit (CPU). The processor 660 may be realized by a microprocessor or a microcontroller. Alternatively, the processor 660 may be realized by an FPGA (Field Programmable Gate Array), a GPU (Graphics Processing Unit), an ASIC (Application Specific Integrated Circuit), an ASSP (Application Specific Standard Product), or a combination of two or more selected from these circuits. The processor 660 consecutively executes a computer program, describing commands to execute at least one process, stored in the ROM 670 and thus realizes a desired process.

The ROM 670 is, for example, a writable memory (e.g., PROM), a rewritable memory (e.g., flash memory) or a memory which can only be read from but cannot be written to. The ROM 670 stores a program to control operations of the processor 660. The ROM 670 does not need to be a single storage medium, and may be an assembly of a plurality of storage mediums. A portion of the assembly of the plurality of storage memories may be a detachable memory.

The RAM 680 provides a work area in which the control program stored in the ROM 670 is once developed at the time of boot. The RAM 680 does not need to be a single storage medium, and may be an assembly of a plurality of storage mediums.

The storage device 650 mainly acts as a storage for a database. The storage device 650 may be, for example, a magnetic storage device or a semiconductor storage device. An example of the magnetic storage device is a hard disc drive (HDD). An example of the semiconductor storage device is a solid state drive (SSD). The storage device 650 may be a device independent from the management device 600. For example, the storage device 650 may be a storage device connected to the management device 600 via the network 80, for example, a cloud storage.

The remote device 400 shown in FIG. 6 includes an input device 420, a display device (display) 430, a storage device 450, a processor 460, a ROM 470, a RAM 480, and a communication device 490. These component elements are communicably connected with each other via a bus. The input device 420 is a device to convert an instruction from the user into data and input the data to a computer. The input device 420 may be, for example, a keyboard, a mouse or a touch panel. The display device 430 may be, for example, a liquid crystal display or an organic EL display. The processor 460, the ROM 470, the RAM 480, the storage device 450 and the communication device 490 are substantially the same as the corresponding component elements described above regarding the example of the hardware configuration of the management device 600, and will not be described in repetition.

In the example of FIG. 6, the remote device 400 includes a computer including a display and an input device as shown in FIG. 1A. As illustrated in FIG. 1B, the remote device 400 may be a computer connected to the remote control device 500 and the display 430 in the remote monitoring center.

Now, an operation of the work vehicle 100, the remote device 400 and the management device 600 will be described.

First, an example operation of self-traveling of the work vehicle 100 will be described. The work vehicle 100 according to the present example embodiment can automatically travel both inside and outside a field. Inside the field, the work vehicle 100 drives the implement 300 to perform predetermined agricultural work while traveling along a preset target path. When detecting an obstacle by the obstacle sensors 130 thereof while traveling inside the field, the work vehicle 100 halts traveling and performs operations of presenting an alarm sound from the buzzer 220, transmitting an alert signal to the remote device 400 and the like. Inside the field, the positioning of the work vehicle 100 is performed based mainly on data output from the GNSS unit 110. Meanwhile, outside the field, the work vehicle 100 automatically travels along a target path set for an agricultural road or a general road outside the field. While traveling outside the field, the work vehicle 100 performs local path planning based on data acquired by the cameras 120 or the LiDAR 140. When an obstacle is detected outside the field, the work vehicle 100 avoids the obstacle or halts at the point. Outside the field, the position of the work vehicle 100 is estimated based on data output from the LiDAR sensor 140 or the cameras 120 in addition to positioning data output from the GNSS unit 110.

Hereinafter, an operation of the work vehicle 100 performing self-traveling inside the field will be described. An operation of the work vehicle 100 performing self-traveling outside the field will be described later.

Figure 7:
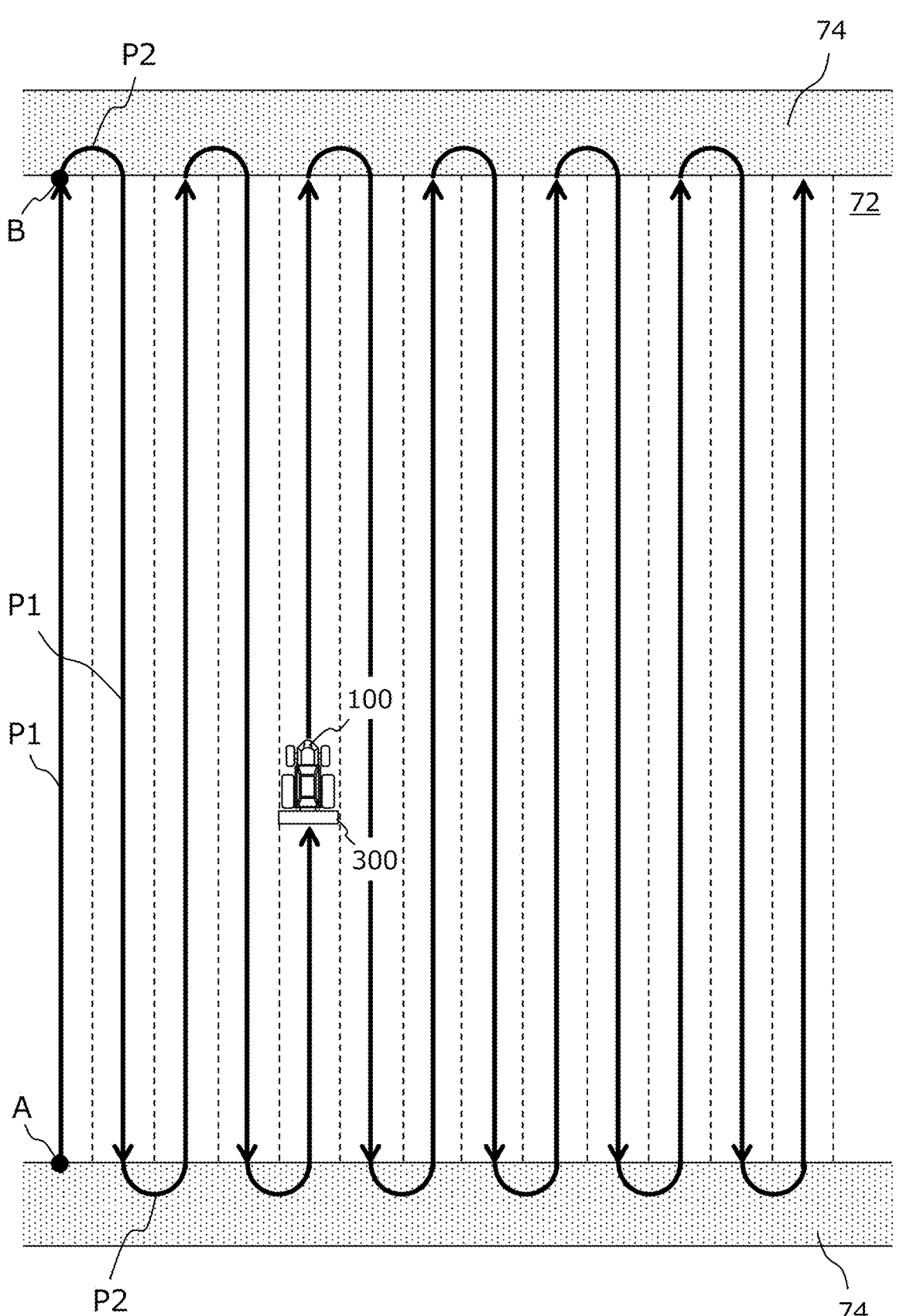
FIG. 7 is a diagram schematically showing an example of the work vehicle automatically traveling along a target path in a field.

FIG. 7 is a diagram schematically showing an example of the work vehicle 100 automatically traveling along a target path in a field. In this example, the field includes a work area 72, in which the work vehicle 100 performs work by using the implement 300, and headlands 74, which are located near an outer edge of the field. The user may specify which regions of the field on the map would correspond to the work area 72 and the headlands 74 in advance. The target path in this example includes a plurality of main paths P1 parallel to each other and a plurality of turning paths P2 interconnecting the plurality of main paths P1. The main paths P1 are located in the work area 72, whereas the turning paths P2 are located in the headlands 74. Although each of the main paths P1 in FIG. 7 is illustrated as a linear path, each main path P1 may also include a curved portion(s). The main paths P1 may, for example, be automatically generated by the user performing an operation of specifying two points (in FIG. 7, points A and B) at or near an end of a field while viewing a map of the field displayed on the operational terminal 200 or the remote device 400. In that case, the main paths P1 are set in parallel with the line segment connecting the points A and B specified by the user, and a target path in the field is generated by connecting the turning paths P2 to the main paths P1. Broken lines in FIG. 7 depict the working breadth of the implement 300. The working breadth is previously set and recorded in the storage device 170. The working breadth may be set and recorded by the user operating the operational terminal 200 or the remote device 400. Alternatively, the working breadth may be automatically recognized and recorded when the implement 300 is connected to the work vehicle 100. The interval between the plurality of main paths P1 may be set so as to be matched to the working breadth. The target path may be generated based on the operation made by the user, before self-driving is begun. The target path may be generated so as to cover the entire work area 72 in the field, for example. Along the target path shown in FIG. 7, the work vehicle 100 automatically travels while repeatedly reciprocating from a beginning point of work to an ending point of work. Note that the target path shown in FIG. 7 is merely an example, and the target path may be arbitrarily determined.

Now, an example control by the controller 180 during self-driving in a field will be described.

Figure 8:
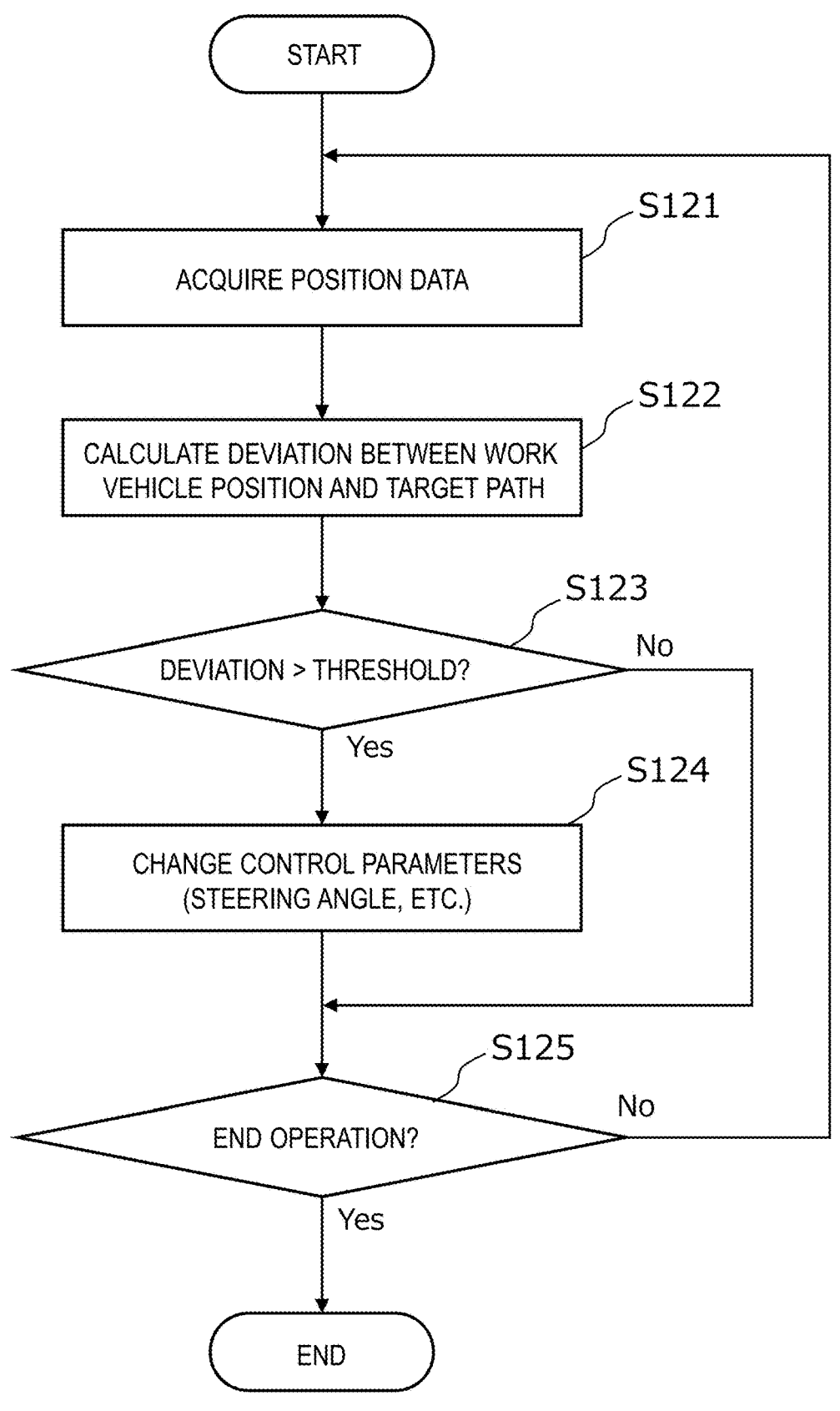
FIG. 8 is a flowchart showing an example operation of steering control during self-driving.

FIG. 8 is a flowchart showing an example operation of steering control to be performed by the controller 180 during self-driving. During travel of the work vehicle 100, the controller 180 is configured or programmed to perform automatic steering by performing the operation from steps S121 to S125 shown in FIG. 7. The speed of the work vehicle 100 will be maintained at a previously-set speed, for example. First, during travel of the work vehicle 100, the controller 180 obtains data representing the position of the work vehicle 100 that is generated by the GNSS unit 110

(step S121). Next, the controller 180 calculates a deviation between the position of the work vehicle 100 and the target path (step S122). The deviation represents the distance between the position of the work vehicle 100 and the target path at that moment. The controller 180 determines whether the calculated deviation in position exceeds the previously-set threshold or not (step S123). If the deviation exceeds the threshold, the controller 180 changes a control parameter of the steering device included in the drive device 240 so as to reduce the deviation, thus changing the steering angle (step S124). If the deviation does not exceed the threshold at step S123, the operation of step S124 is omitted. At the following step S125, the controller 180 determines whether a command to end the operation has been received or not. The command to end the operation may be given when the user has instructed that self-driving be suspended through remote operations, or when the work vehicle 100 has arrived at the destination, for example. If the command to end the operation has not been given, the control returns to step S121 and the controller 180 performs substantially the same operation based on a newly measured position of the work vehicle 100. The controller 180 repeats the operation from steps S121 to S125 until a command to end the operation is given. The aforementioned operation is executed by the ECUs 182 and 184 in the controller 180.

In the example shown in FIG. 8, the controller 180 controls the drive device 240 based only on the deviation between the position of the work vehicle 100 as identified by the GNSS unit 110 and the target path. Alternatively, a deviation in terms of directions may further be considered in the control. For example, when a directional deviation exceeds a previously-set threshold, where the directional deviation is an angle difference between the orientation of the work vehicle 100 as identified by the GNSS unit 110 and the direction of the target path, the controller 180 may change the control parameter of the steering device of the drive device 240 (e.g., steering angle) in accordance with the deviation.

Hereinafter, with reference to FIGS. 9A to 9D, an example of steering control by the controller 180 will be described more specifically.

Figure 9A:
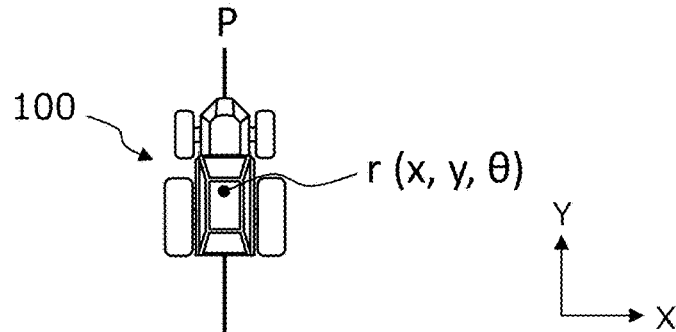
FIG. 9A is a diagram showing an example of the work vehicle traveling along a target path P.
Figure 9B:
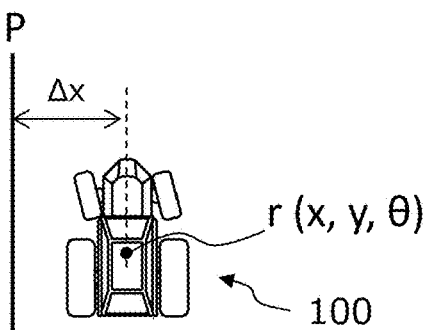
FIG. 9B is a diagram showing an example of the work vehicle at a position which is shifted rightward from the target path P.
Figure 9C:
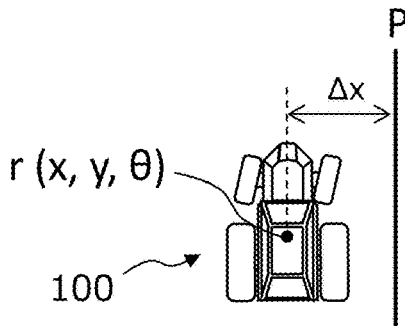
FIG. 9C is a diagram showing an example of the work vehicle at a position which is shifted leftward from the target path P.
Figure 9D:
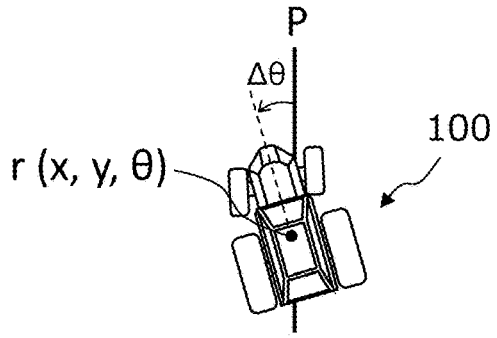
FIG. 9D is a diagram showing an example of the work vehicle oriented in an inclined direction with respect to the target path P.

FIG. 9A is a diagram showing an example of the work vehicle 100 traveling along a target path P. FIG. 9B is a diagram showing an example of the work vehicle 100 at a position which is shifted rightward from the target path P. FIG. 9C is a diagram showing an example of the work vehicle 100 at a position which is shifted leftward from the target path P. FIG. 9D is a diagram showing an example of the work vehicle 100 oriented in an inclined direction with respect to the target path P. In these figures, the pose, i.e., the position and orientation, of the work vehicle 100 as measured by the GNSS unit 110 is expressed as r(x, y, θ). Herein, (x, y) are coordinates representing the position of a reference point on the work vehicle 100 in an XY coordinate system, which is a two-dimensional coordinate system fixed to the globe. In the examples shown in FIGS. 9A to 9D, the reference point on the work vehicle 100 is at a position, on the cabin, where a GNSS antenna is disposed, but the reference point may be at any arbitrary position. θ is an angle representing the measured orientation of the work vehicle 100. Although the target path P is shown parallel to the Y axis in the examples illustrated in these figures, the target path P may not necessarily be parallel to the Y axis, in general.

As shown in FIG. 9A, in the case where the position and orientation of the work vehicle 100 are not deviated from the target path P, the controller 180 maintains the steering angle and speed of the work vehicle 100 without changing them.

As shown in FIG. 9B, when the position of the work vehicle 100 is shifted rightward from the target path P, the controller 180 changes the steering angle so that the traveling direction of the work vehicle 100 will be inclined leftward, thus bringing the work vehicle 100 closer to the target path P. Herein, not only the steering angle but also the speed may be changed. The magnitude of the steering angle may be adjusted in accordance with the magnitude of a positional deviation $\Delta x$, for example.

As shown in FIG. 9C, when the position of the work vehicle 100 is shifted leftward from the target path P, the controller 180 changes the steering angle so that the traveling direction of the work vehicle 100 will be inclined rightward, thus bringing the work vehicle 100 closer to the target path P. In this case, too, not only the steering angle but also the speed may be changed. The amount of change of the steering angle may be adjusted in accordance with the magnitude of the positional deviation $\Delta x$, for example.

As shown in FIG. 9D, in the case where the position of the work vehicle 100 is not considerably deviated from the target path P but its orientation is nonetheless different from the direction of the target path P, the controller 180 changes the steering angle so that the directional deviation $\Delta\theta$ will become smaller. In this case, too, not only the steering angle but also the speed may be changed. The magnitude of the steering angle may be adjusted in accordance with the magnitudes of the positional deviation $\Delta x$ and the directional deviation $\Delta\theta$, for example. For instance, the amount of change of the steering angle (which is in accordance with the directional deviation $\Delta\theta$) may be increased as the absolute value of the positional deviation $\Delta x$ decreases. When the positional deviation $\Delta x$ has a large absolute value, the steering angle will be changed greatly in order for the work vehicle 100 to return to the target path P, so that the directional deviation $\Delta\theta$ will inevitably have a large absolute value. Conversely, when the positional deviation $\Delta x$ has a small absolute value, the directional deviation $\Delta\theta$ needs to become closer to zero. Therefore, it may be advantageous to introduce a relatively large weight (i.e., control gain) for the directional deviation $\Delta\theta$ in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

It should be noted that when an obstacle is detected by one or more obstacle sensors 130 during travel, the controller 180 halts the work vehicle 100. At this point, the controller 180 may cause the buzzer 220 to present an alarm sound or may transmit an alert signal to the remote device 400. In the case where the obstacle is avoidable, the controller 180 may control the drive device 240 such that the obstacle is avoided.

The work vehicle 100 according to the present example embodiment can perform self-traveling outside a field as well as inside the field. Outside the field, the controller 180 is able to detect an object located at a relatively distant position from the work vehicle 100 (e.g., another vehicle, a pedestrian, etc.) based on data output from the cameras 120 or the LiDAR sensor 140. The controller 180 generates a local path such that the local path avoids the detected object, and performs speed control and steering control along the local path. In this manner, self-traveling on a road outside the field can be realized.

Figure 10:
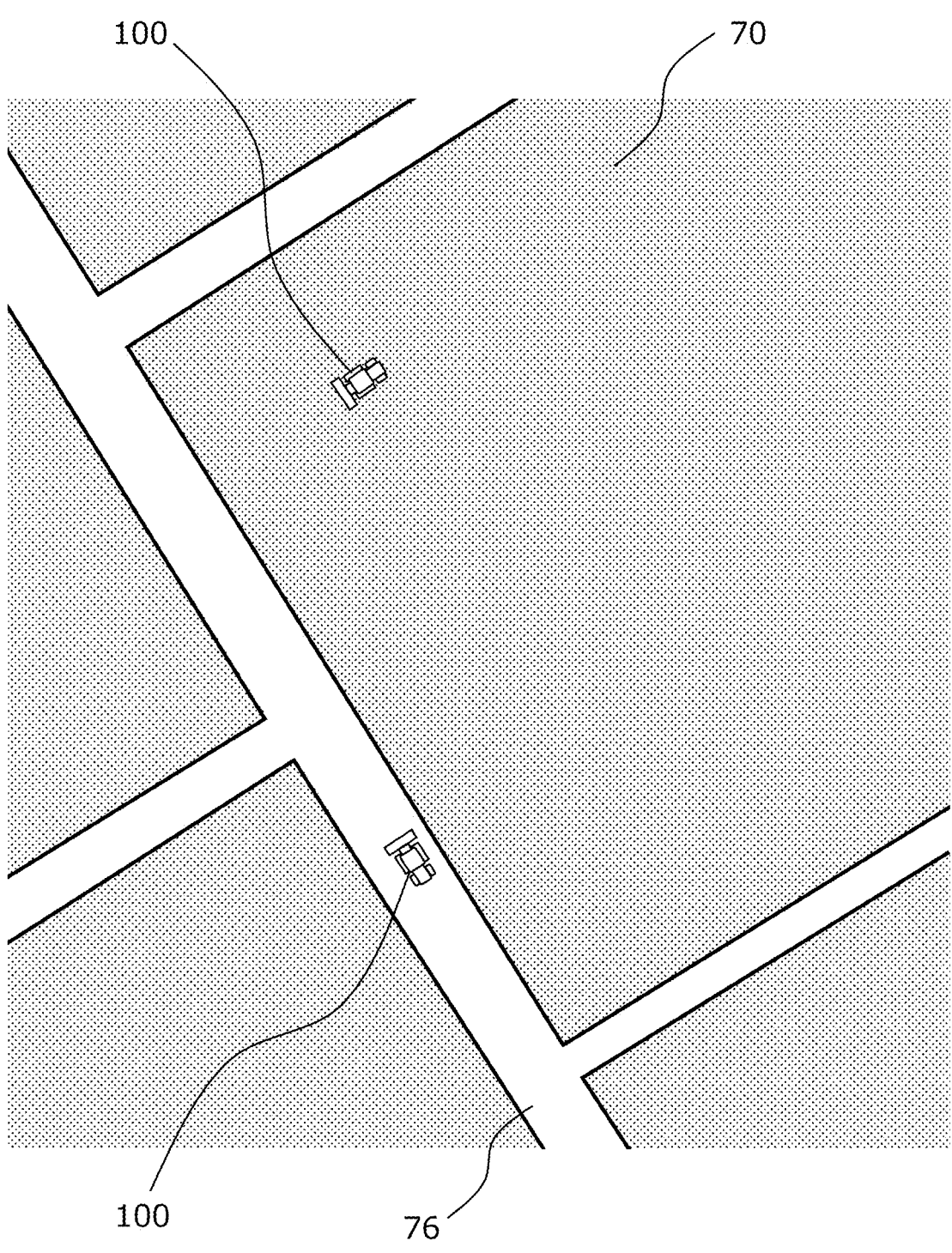
FIG. 10 is a diagram schematically showing an example of state where a plurality of the work vehicles are automatically traveling inside the field and on a road outside the field.

As described above, the work vehicle 100 according to the present example embodiment can automatically travel inside the field and outside the field in an unmanned manner. FIG. 10 is a diagram schematically showing an example of state where a plurality of the work vehicles 100 are performing self-traveling inside a field 70 and on a road 76 outside the field 70. In the storage device 170, an environment map of a region including a plurality of fields and roads around the fields, and a target path, are recorded. The environment map and the target path may be generated by the management device 600 or the ECU 185. In the case of traveling on a road, the work vehicle 100 travels along the target path while sensing the surroundings thereof by use of the sensors such as the cameras 120 and the LiDAR sensor 140, with the implement 300 being raised. During travel, the controller 180 consecutively generates a local path and causes the work vehicle 100 to travel along the local path. This allows the work vehicle 100 to perform self-traveling while avoiding obstacles. During travel, the target path may be changed in accordance with the state.

Next, operations related to remote maneuver of the work vehicle 100 will be described.

When the work vehicle 100 is performing self-traveling, the user can remotely monitor and maneuver the work vehicle 100 using the remote device 400. When the work vehicle 100 is performing self-traveling, the controller 180 transmits an image (e.g., moving images) captured by at least one camera 120 mounted on the work vehicle 100 to the remote device 400 through the communication device 190. The remote device 400 causes the display 430 to display the image. The user can check a state of surroundings of the work vehicle 100 and start remotely-operated traveling if necessary while viewing the displayed image.

Figure 11A:
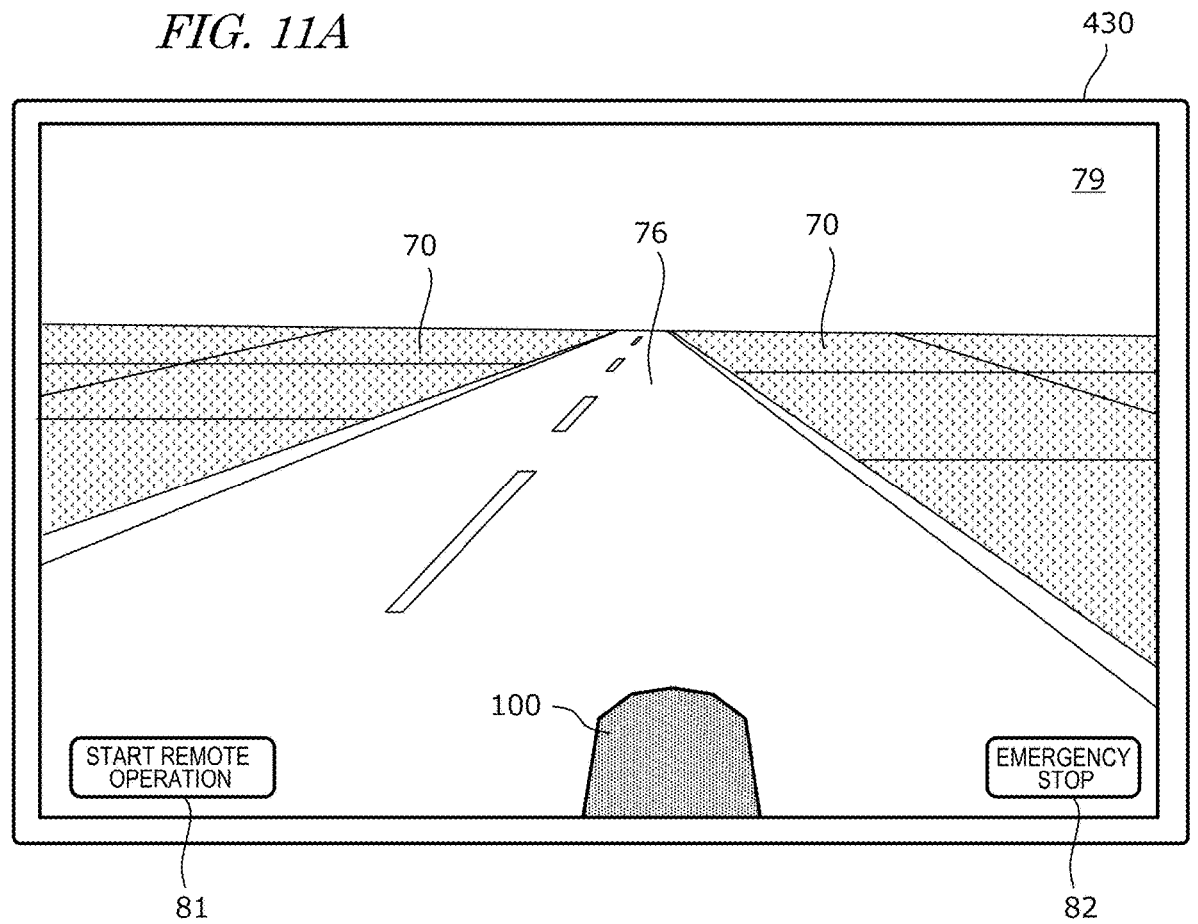
FIG. 11A is a diagram showing an example of a display screen in a self-traveling mode.

FIG. 11A is a diagram showing an example of an image displayed on the display 430 of the remote device 400. The image shown in FIG. 11A shows a field 70, a road 76, a sky 79, and a front portion of the work vehicle 100. The image is captured by the camera 120 that shoots an area in front of the work vehicle 100. In addition to the camera 120 that shoots an area in front of the work vehicle 100, an image captured by a camera 120 that shoots an area to the rear, right, or left of the camera 120 may be displayed on the display 430, for example. The display 430 displays moving images having a frame rate of, for example, at least 3 fps (typically, 30 fps or 60 fps, etc.). It should be noted that a plurality of images captured by a plurality of cameras 120 may be displayed on a plurality of displays. For example, as shown in FIG. 1B, a plurality of videos may be displayed on a plurality of displays 430 in the remote monitoring center. In that case, a user (i.e., an operator) who is a monitor can check details of a state of surroundings of the work vehicle 100 while viewing a plurality of videos displayed on a plurality of displays 430. In addition to images captured by the cameras 120, a map of a region including the work vehicle 100 may be displayed on a display.

In the example shown in FIG. 11A, the displayed image includes a button (remote maneuver start button) 81 for instructing to start remote maneuver, and a button (emergency stop button) 82 for causing the work vehicle 100 to stop immediately. The user can cause transition from the self-traveling mode to the remote operation mode by touching or clicking the remote maneuver start button 81. The user can also immediately stop the work vehicle 100 by touching or clicking the emergency stop button 82.

Figure 11B:
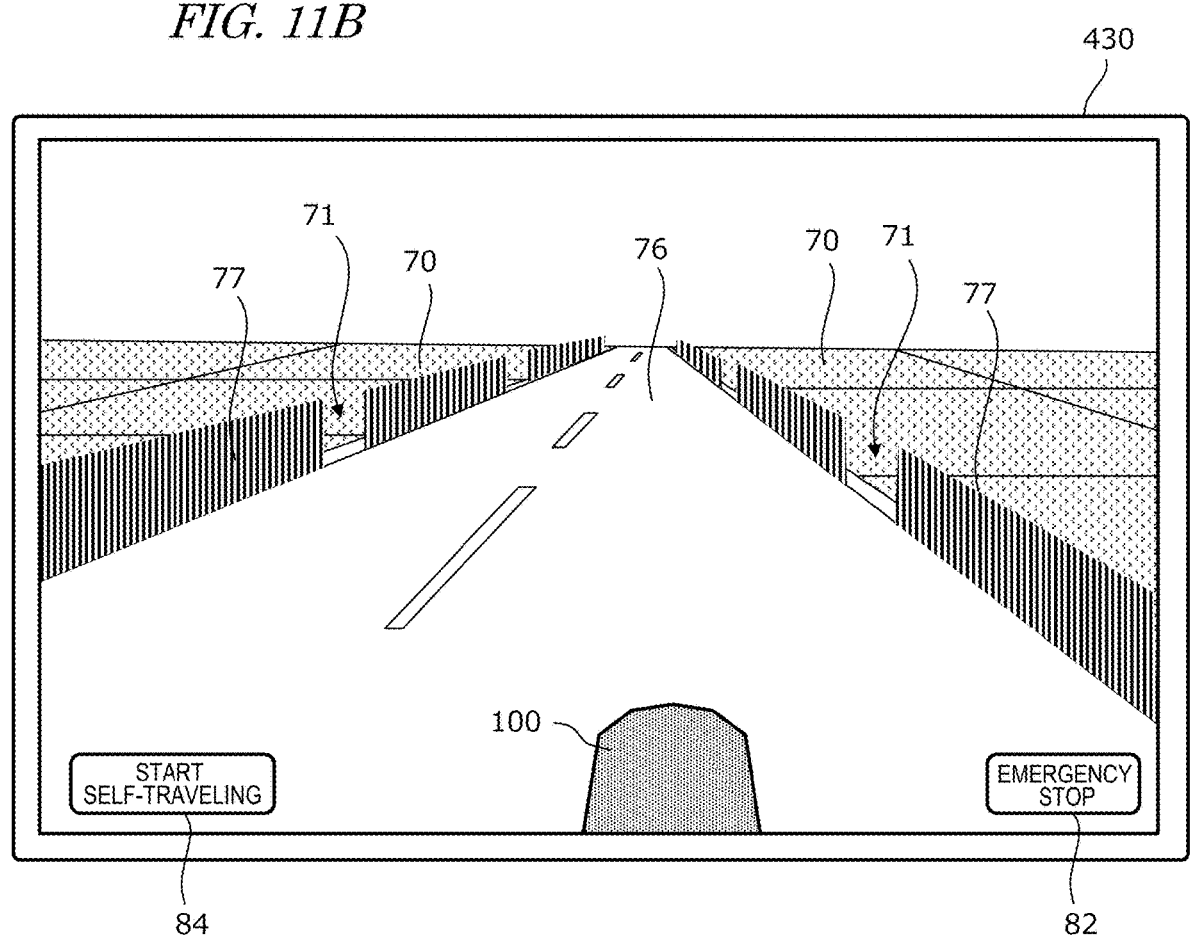
FIG. 11B is a diagram showing an example of a display screen in a remote operation mode.

FIG. 11B is a diagram showing an example of a display screen after the remote maneuver start button 81 is pressed. When the remote maneuver start button 81 is pressed, remote maneuver is enabled. For example, in the example of FIG. 1B, the operator can remotely maneuver the work vehicle 100 using the remote control device 500. The controller 180 causes the work vehicle 100 to perform an instructed operation in response to the user's operation. The user can cause transition from the remote operation mode to the self-traveling mode by touching or clicking the self-traveling start button 84 on the screen shown in FIG. 11B.

In this example, when the remote maneuver start button 81 shown in FIG. 11A is pressed, as shown in FIG. 11B barriers 77 indicating an area in which the remotely-operated traveling of the work vehicle 100 is not currently permitted are displayed. The barriers 77 shown in FIG. 11B are displayed in portions of boundaries between a road 76 and fields 70 that exclude entrances/exits 71 of the fields 70. Areas in which remotely-operated traveling is permitted and positions at which barriers 77 are displayed are previously determined. The remote operation of causing the work vehicle 100 to enter a barrier 77 is disabled.

Figure 11C:
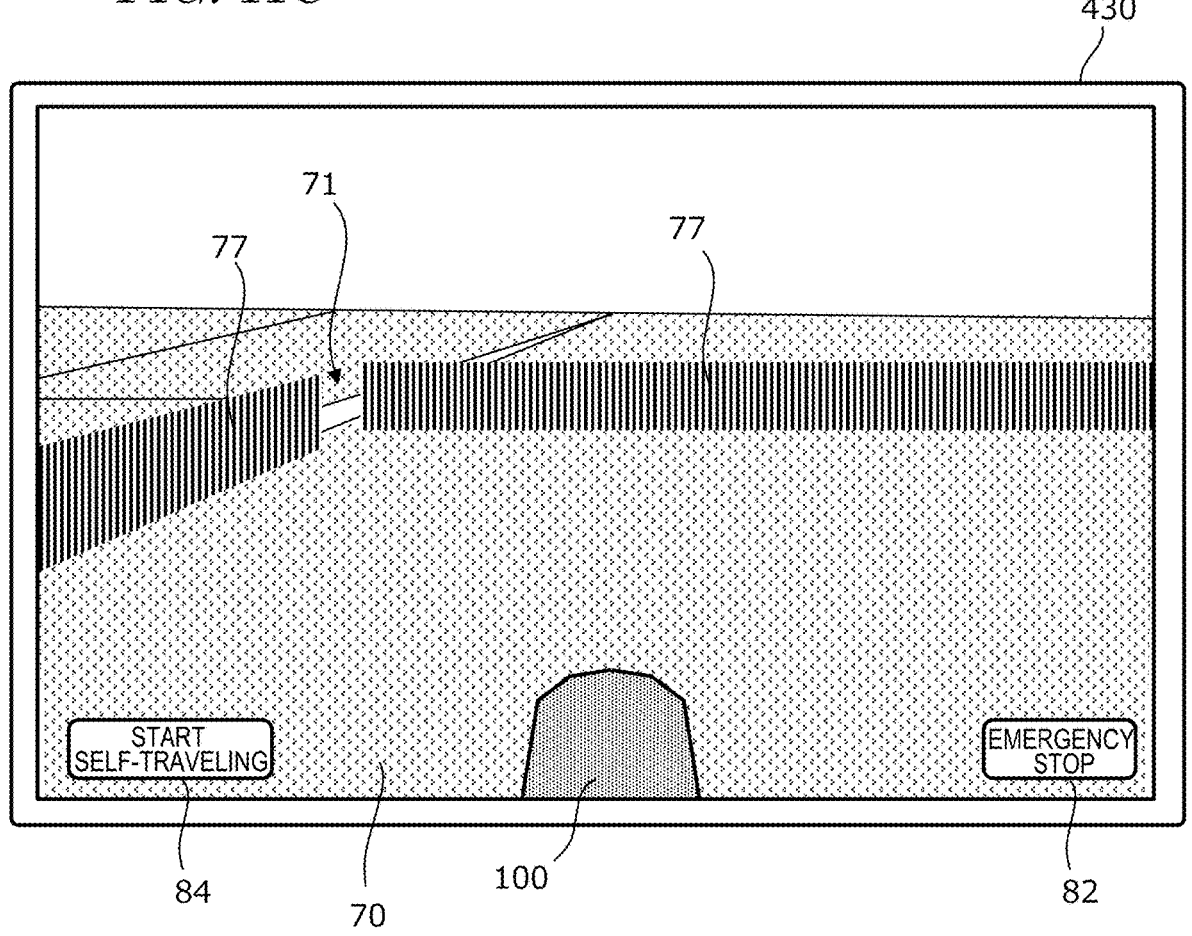
FIG. 11C is a diagram showing another example of a display screen in a remote operation mode.

FIG. 11C is a diagram showing an example of a display screen in the remote operation mode with the work vehicle 100 located in a field 70. In this example, barriers 77 are displayed in portions of the outer periphery of the field 70 that exclude entrances/exits 71. As a result, the remote operation of causing the work vehicle 100 to exit a field 70 without through any entrance/exit 71 is disabled.

It should be noted that no area in which the remote maneuver of the work vehicle 100 is forbidden may be set. In that case, no barriers 77 are displayed on the monitoring screen, and the work vehicle 100 can be remotely maneuvered no matter where the work vehicle 100 is located as long as the work vehicle 100 is in the range where the work vehicle 100 can receive remote maneuver commands.

In the above example, an image (hereinafter also referred to as a "camera image") captured by the camera 120 mounted on the work vehicle 100 is displayed on the display 430 of the remote device 400. In addition to the camera image, images based on point cloud data obtained by the LiDAR sensor 140 and other sensing data may be displayed on the display 430, for example. An image based on the point cloud data indicates the distribution of objects located around the work vehicle 100, and therefore, may be used for monitoring as with camera images. The operator can recognize a state of surroundings of the work vehicle 100 based on a camera image or an image based on the point cloud data. In the following description, images based on image data generated by the camera 120 and point cloud data generated by the LiDAR sensor 140 may be hereinafter referred to as "visualized images". Moving images or a video obtained from such visualized images may be referred to as "time-series images".

In the above remote maneuver system, as the number of work vehicles connected to the network increases, more work vehicles simultaneously use radio waves having the same frequency or neighboring frequencies in wireless communication, so that a failure such as interference or crosstalk of radio waves is likely to occur. As a result, communication between the communication device and the remote device may be unstable, or the communication rate may decrease. Due to the widespread use of e-agriculture, the number of work vehicles and remote devices connected to the network is expected to increase more and more in future, more likely leading to a failure such as interference or crosstalk of radio waves. It is expected that the communication rate between the communication device and the remote device decreases more frequently. The decrease in the communication rate may lead to an increase in processing load in the communication device.

A remote maneuver system that is capable of performing low-delay and large-capacity data communication using a new communication technology such as the fifth-generation mobile communication system (5G) is becoming a reality. However, for example, if a sensor such as a LiDAR or camera processes a large amount of data due to an increase in the resolution of images, the sensor outputs an increased amount of data. As a result, a greater load is imposed on the communication device, which processes sensing data output from the sensor. Therefore, it is desirable that an increase in the load of processing performed by the communication device should be reduced.

As an example, remote maneuver will be described. A video showing a state of an environment around the work vehicle 100 based on sensing data output from the sensor is displayed on at least one display 430 installed in the remote monitoring center shown in FIG. 1B. If the communication rate from the communication device 190 to the remote device 400 decreases, the video may continuously or temporarily deteriorate (or be disturbed), so that the user's remote maneuver using the remote control device 500 is likely to be hindered.

In the present example embodiment, the sensor 250 is configured to change the data amount of sensing data output to the communication device 190, depending on the communication rate from the communication device 190 to the remote device 400. Specifically, the sensor 250 outputs a smaller data amount of sensing data when the communication rate is lower than a threshold than when the communication rate is higher than or equal to the threshold. While the communication rate is higher than or equal to the threshold, the sensor 250 outputs a maximum amount of data that can be output, for example. When the communication rate is lower than the threshold, the sensor 250 outputs data whose amount is about ½ or about ⅓ of the maximum amount, for example.

In the agricultural machine or sensing system according to the present example embodiment, the data amount of sensing data output from the sensor 250 is adaptively changed, depending on the communication rate of the communication device, whereby the processing load of the communication device can be reduced. Furthermore, data communication between the communication device and the remote device that depends on communication congestion can be achieved.

Figure 12:
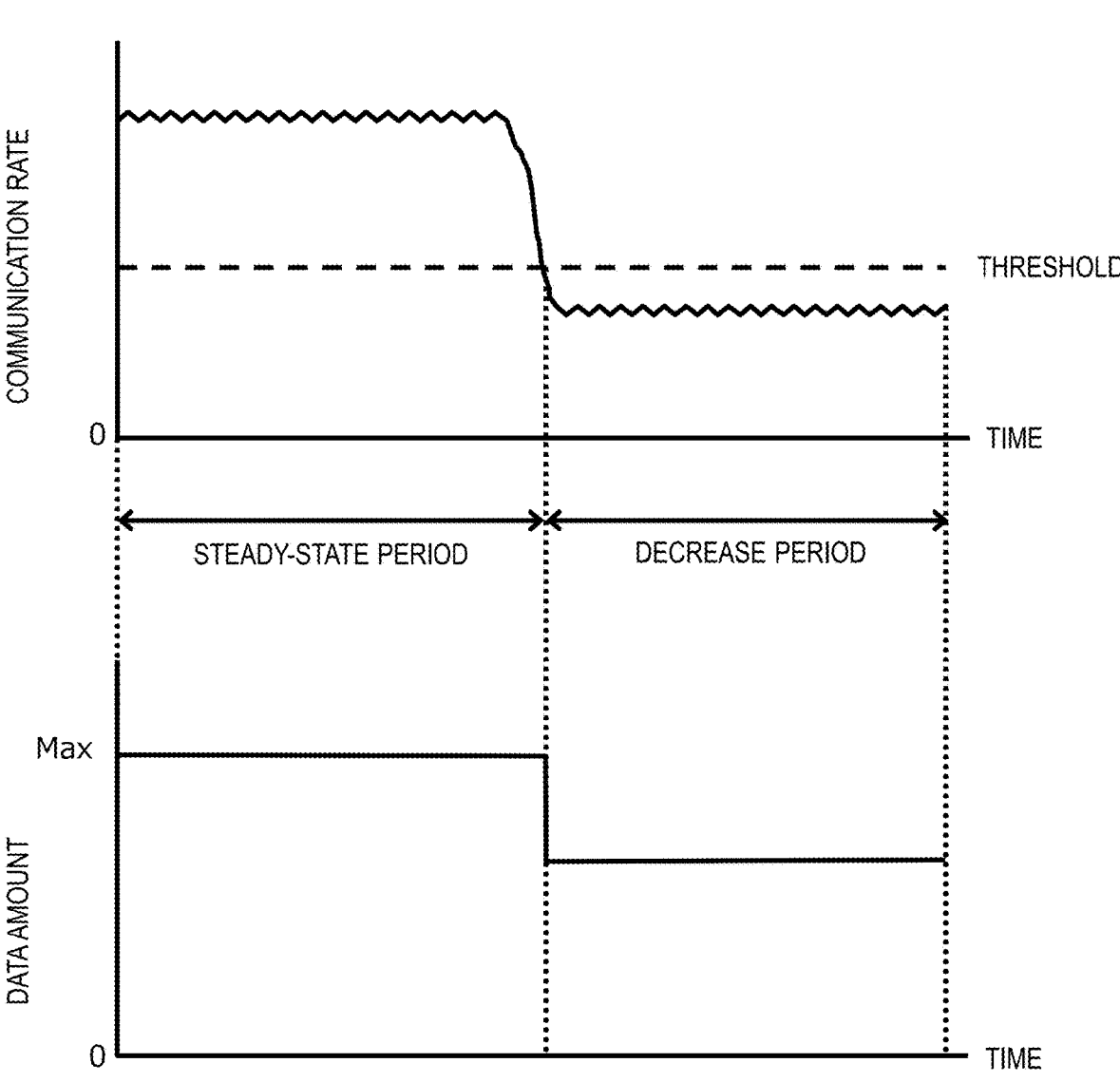
FIG. 12 is a graph illustrating a change in the communication rate of a communication device, and a change in the data amount of sensing data output from a sensor that depends on the change in the communication rate.
Figure 13:
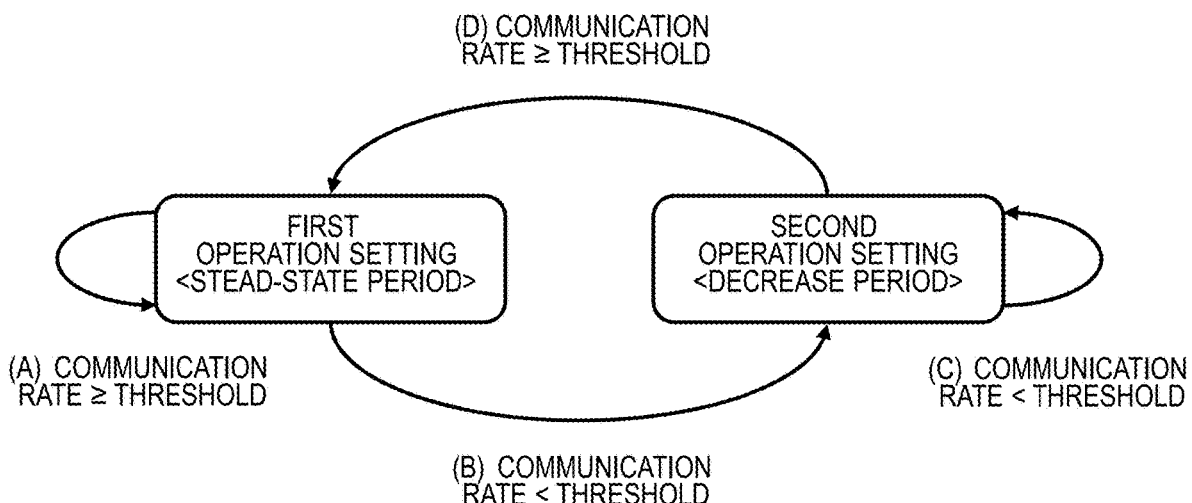
FIG. 13 is a diagram for describing how a state of operation of a sensor transitions, depending on the communication rate of a communication device.

FIG. 12 is a graph illustrating a change in the communication rate of the communication device 190, and a change in the data amount of sensing data output from the sensor that depends on the change in the communication rate. The upper graph of FIG. 12 shows a change over time in the communication rate. The lower graph of FIG. 12 shows a change over time in the data amount of the sensing data. The horizontal axis represents time, and the vertical axis represents the communication rate (upper graph) and the data amount (lower graph). FIG. 13 is a diagram for describing how a state of operation of the sensor 250 transitions, depending on the communication rate of the communication device 190.

In the present example embodiment, the period of time during which the communication rate of the communication device 190 is higher than or equal to a threshold is referred to as a "steady-state period", and the period of time during which the communication rate of the communication device 190 is lower than the threshold is referred to as a "decrease period", whereby these periods are distinguished from each other. The threshold may, for example, be determined as appropriate, depending on the environment in which the sensing system is used. The sensor 250 is configured to output sensing data in accordance with a first operation setting during steady-state periods, and output sensing data in accordance with a second operation setting during decrease periods.

As shown in FIG. 13, it is assumed that the sensor 250 is outputting sensing data in accordance with the first operation setting during a steady-state period during which the communication rate of the communication device 190 is higher than or equal to the threshold. While the communication rate of the communication device 190 is higher than or equal to the threshold, the sensor 250 repeatedly outputs sensing data in accordance with the first operation setting (condition A). When the communication rate of the communication device 190 becomes lower than the threshold with certain timing, the sensor 250 outputs sensing data in accordance with the second operation setting (condition B). While the communication rate of the communication device 190 is lower than the threshold, the sensor 250 repeatedly outputs sensing data in accordance with the second operation setting (condition C). When the communication rate of the communication device 190 returns to be higher than or equal to the threshold with certain timing, the sensor 250 outputs sensing data in accordance with the first operation setting. The first and second operation settings are described in detail below.

Firstly, an operation of the sensor 250 in a first example will be described. In this example, the sensor 250 includes a camera 120 equipped with RGB sensors. The camera 120 is capable of obtaining color images. When the communication rate of the communication device 190 is lower than the threshold, the camera 120 reduces at least one of resolution, color information amount, and image size during capturing, compared to when the communication rate is higher than or equal to the threshold. These pieces of information are, for example, set in a register in a processor included in the sensor 250. For example, the processor included in the sensor 250 may communicate with a processor included in the communication device 190 to receive, from the processor of the communication device 190, a signal (e.g., 1 bit) indicating whether or not the communication rate is higher than or equal to the threshold. As a result, the sensor 250 can determine whether or not the communication rate is lower than the threshold. The controller 180 may also receive, from the processor of the communication device 190, a signal indicating whether or not the communication rate is higher than or equal to the threshold. The controller 180 may, for example, change a setting of the register in the processor included in the sensor 250 in response to assertion of the signal. The setting of the register before the change corresponds to the first operation setting, and the setting of the register after the change corresponds to the second operation setting. In other words, the controller 180 changes the setting of the register from the first operation setting to the second operation setting in response to assertion of the signal.

To reduce resolution includes, for example, to reduce the resolution in the vertical direction of an image to about ½ or about ¼ of the vertical maximum resolution, or to reduce the resolution in each of the horizontal and vertical directions of an image to about ½ or about ¼ of the respective maximum resolution. To reduce color information amount means, for example, in the case in which the output format is the RGB format, to output an RG image, a GB image, or an RB images of RGB pixel values, or one of RGB pixel values. Alternatively, to reduce color information amount means, for example, in the case in which the output format is the YCbCr format, to reduce color difference information by chroma sampling to change the maximum 4:4:4 format into the 4:4:2, 4:2:2, 4:2:0, or 4:1:1 format. In this example, the first operation setting is the 4:4:4 format, and the second operation setting is the 4:4:2, 4:2:2, 4:2:0, or 4:1:1 format.

Figure 14:
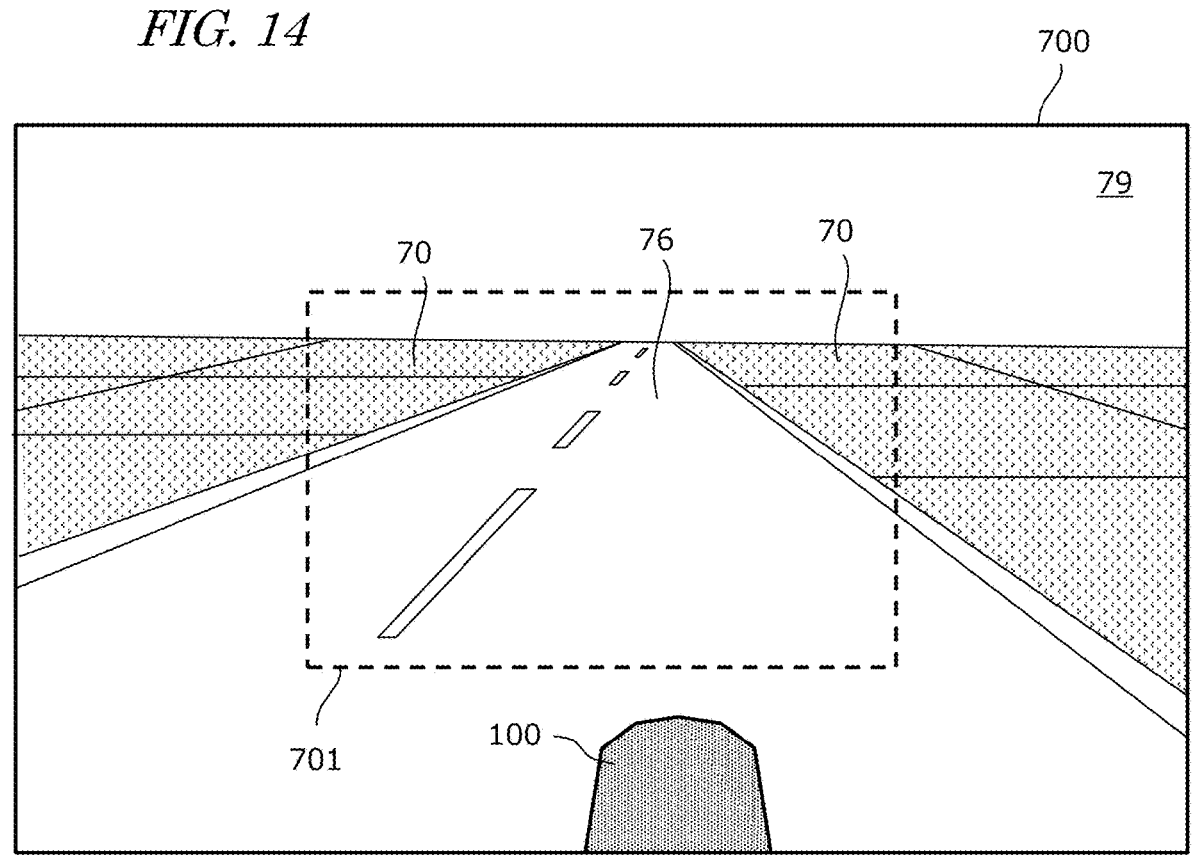
FIG. 14 is a diagram for describing a reduction in image size with resolution maintained.

FIG. 14 is a diagram for describing a reduction in image size with resolution maintained. In FIG. 14, a rectangular region surrounded by a solid line indicates a full-size image 700, and a rectangular region surrounded by a dashed line indicates a reduced-size image 701 whose size is ¼ of the full size (the size is reduced by a factor of two in each of the horizontal and vertical directions). It should be noted that the position of the reduced-size image 701 in the full-size image 700 shown in FIG. 14 is merely for illustrative purposes and is not particularly limited. When the communication rate is higher than or equal to the threshold, the camera 120 outputs full-size image data. Meanwhile, when the communication rate of the communication device 190 is lower than the threshold, the camera 120 trims away a predetermined region from the full-size image 700 to output data of an image having the same resolution as that of the full-size image and a size that is, for example, ¼ of that of the full-size image. In this example, the first operation setting is the full size, and the second operation setting is the ¼ size. It should be noted that the reduction ratio is not limited to ¼ and is not particularly limited.

The camera 120 may be a stereo camera. In this example, when the communication rate of the communication device 190 is lower than the threshold, the parallax of the camera 120 may be reduced. If the amount of parallax is adjusted so as to be relatively smaller than that which is obtained when the communication rate is higher than or equal to the threshold, the data amount of an image can be reduced, although stereo perception caused by parallax is moderate.

In the above example, a single threshold is provided, and the data amount of sensing data output from the sensor 250 is changed, depending on the magnitude relationship between the communication rate and the threshold. The present disclosure is not limited to this. At least two thresholds may be provided, and the data amount of sensing data output from the sensor 250 may be changed stepwise, depending on the magnitude relationship between the communication rate and the thresholds.

Next, an operation of the sensor 250 according to a second example will be described. In this example, the sensor 250 includes a LiDAR sensor 140. The LiDAR sensor 140 reduces at least one of the amount of point cloud data output per unit time and the angular range of sensing when the communication rate of the communication device 190 is lower than the threshold, compared to when the communication rate is higher than or equal to the threshold.

The sensor 250 can efficiently reduce point cloud data obtained by sensing, by applying a filtering process thereto, for example. The sensor 250 may, for example, extract and reduce data points in a region having a low point density, reduce data points in the horizontal and vertical directions equally, or reduce data points having a reflection intensity lower than a threshold. This allows a reduction in the amount of point cloud data output per unit time.

The LiDAR sensor 140 may have different angular ranges of sensing or resolutions in the horizontal direction and/or the vertical direction during the different periods, i.e., the steady-state period and the decrease period. The resolution means the number of laser beams that are emitted from the LiDAR sensor 140 and are included in the angular range of sensing.

Figure 15A:
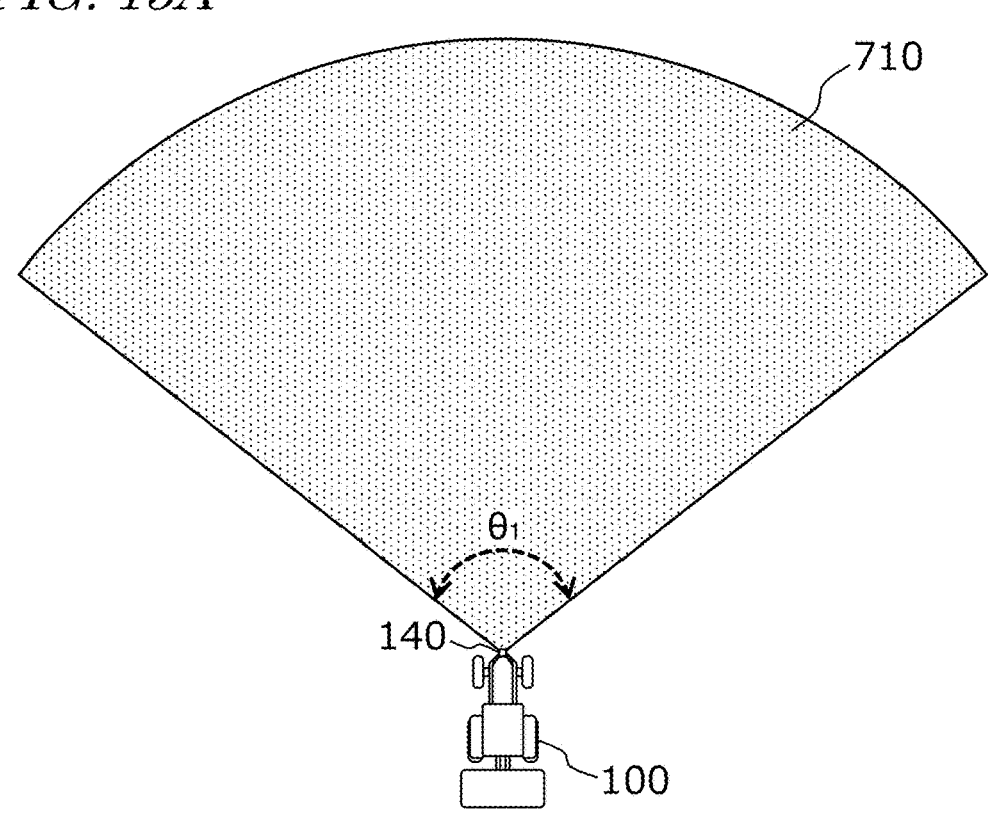
FIG. 15A is a diagram schematically showing a sensing region delimited by a first angular range $\theta_1$ of sensing in the horizontal direction.
Figure 15B:
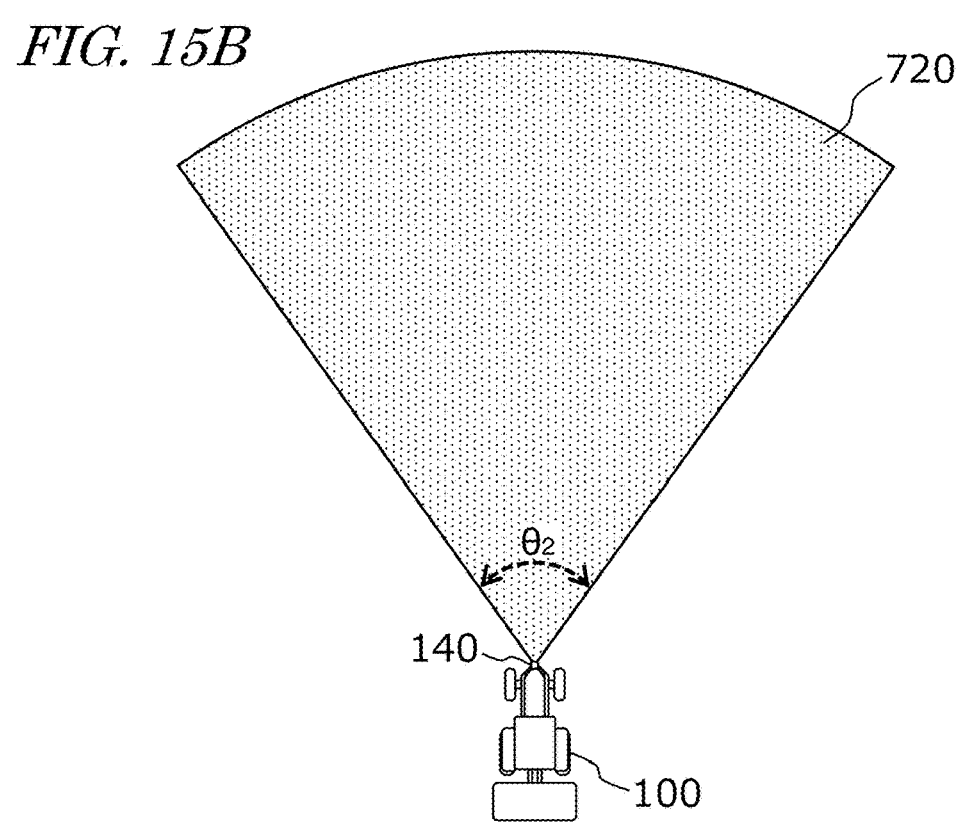
FIG. 15B is a diagram schematically showing a sensing region delimited by a second angular range $\theta_2$ of sensing in the horizontal direction.
Figures 16A, 16B:
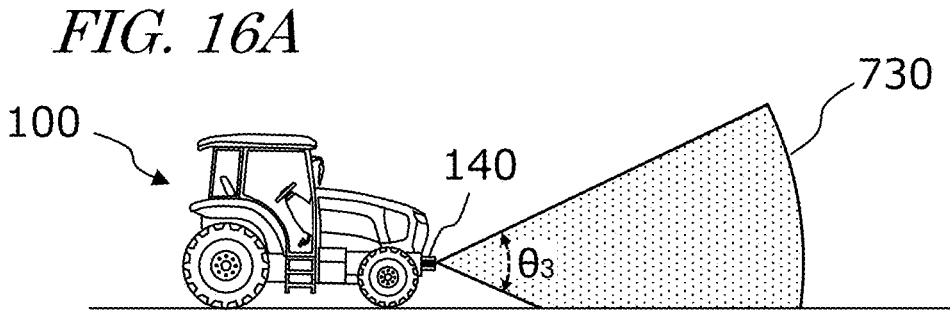
FIG. 16A is a diagram schematically showing a sensing region delimited by a third angular range $\theta_3$ of sensing in the vertical direction.
FIG. 16B is a diagram schematically showing a sensing region delimited by a fourth angular range $\theta_4$ of sensing in the vertical direction.

FIG. 15A is a diagram schematically showing a sensing region 710 delimited by a first angular range $\theta_1$ of sensing in the horizontal direction. FIG. 15B is a diagram schematically showing a sensing region 720 delimited by a second angular range $\theta_2$ of sensing in the horizontal direction. FIG. 16A is a diagram schematically showing a sensing region 730 delimited by a third angular range $\theta_3$ of sensing in the vertical direction. FIG. 16B is a diagram schematically showing a sensing region 740 delimited by a fourth angular range $\theta_4$ of sensing in the vertical direction.

The LiDAR sensor 140 scans a surrounding environment in the first angular range $\theta_1$ in the horizontal direction during steady-state periods as shown in FIG. 15A, and a surrounding environment in the second angular range $\theta_2$ in the horizontal direction during decrease periods as shown in FIG. 15B. The second angular range $\theta_2$ is smaller than the first angular range $\theta_1$. If the angular range of sensing is reduced in the horizontal direction so that the horizontal resolution is reduced, the number of data points obtained is reduced. As in the horizontal direction, the LiDAR sensor 140 may scan a surrounding environment in the third angular range $\theta_3$ in the vertical direction during steady-state periods as shown in FIG. 16A, and a surrounding environment in the fourth angular range $\theta_4$ in the vertical direction during decrease periods as shown in FIG. 16B. The fourth angular range $\theta_4$ is smaller than the third angular range $\theta_3$. By thus reducing the angular ranges of sensing in the horizontal direction and/or the vertical direction during decrease periods, the amount of point cloud data obtained by the LiDAR sensor 140 per unit time can be reduced. Therefore, the amount of point cloud data output by the LiDAR sensor 140 can be reduced compared to steady-state periods.

Figure 17A:
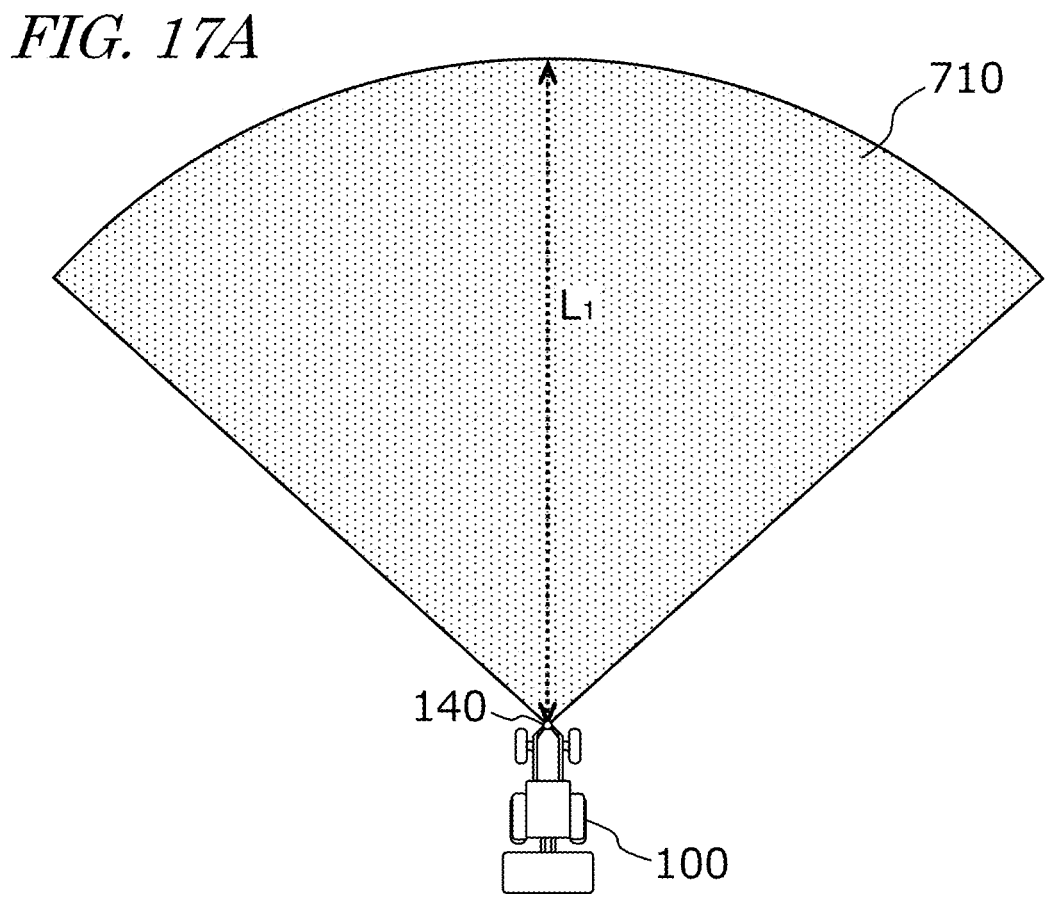
FIG. 17A is a diagram schematically showing a sensing region of a LiDAR sensor whose maximum sensing distance is a first distance $L_1$.
Figure 17B:
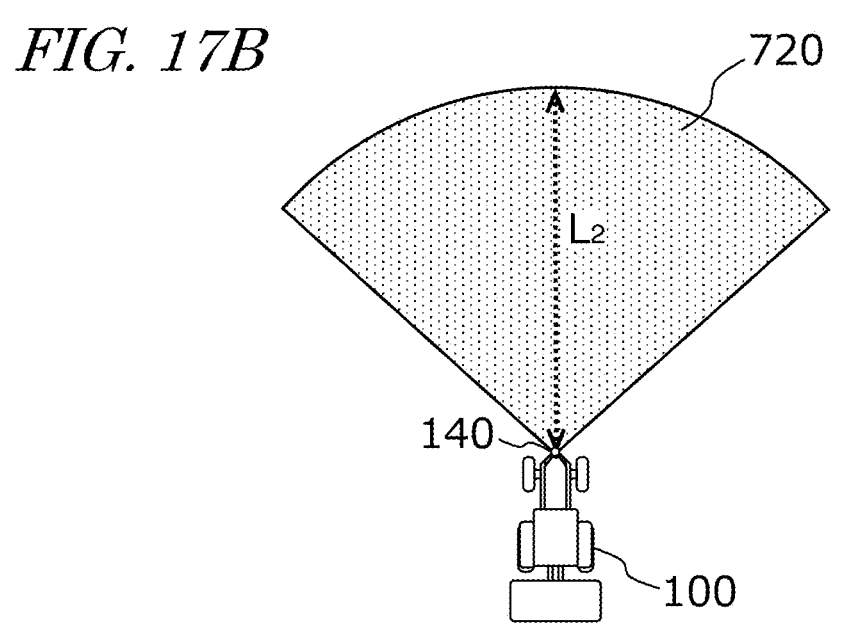
FIG. 17B is a diagram schematically showing a sensing region of a LiDAR sensor whose maximum sensing distance is a second distance $L_2$.

FIG. 17A is a diagram schematically showing a sensing region 710 of the LiDAR sensor 140 whose maximum sensing distance is a first distance $L_1$. FIG. 17B is a diagram schematically showing a sensing region 720 of the LiDAR sensor 140 whose maximum sensing distance is a second distance $L_2$.

The LiDAR sensor 140 may have different maximum sensing distances from the LiDAR sensor 140, instead of or in addition to having different angular ranges of sensing, during the different periods, i.e., the steady-state period and the decrease period. By adjusting the output of laser, the maximum sensing distance may be adjusted. The LiDAR sensor 140 scans the sensing region 710 whose maximum sensing distance is the first distance $L_1$, shown in FIG. 17A, during steady-state periods, and the sensing region 720 whose maximum sensing distance is the second distance $L_2$, shown in FIG. 17B, during decrease periods. The second distance $L_2$ is shorter than the first distance $L_1$. During decrease periods, the amount of point cloud data obtained by the LiDAR sensor 140 per unit time can be reduced by reducing the maximum sensing distance. Therefore, the amount of point cloud data output by the LiDAR sensor 140 can be reduced compared to steady-state periods. Furthermore, during decrease periods, the amount of point cloud data can be efficiently reduced by reducing the angular range of sensing and the maximum sensing distance.

Next, an operation of the sensor 250 according to a third example will be described. In this example, the sensor 250 includes an obstacle sensor 130. The obstacle sensor 130 may output a smaller data amount of sensing data when no obstacle is detected than when an obstacle is detected. In the case in which the obstacle sensor 130 includes a laser scanner, the laser scanner may reduce the amount of obtained point cloud data by, for example, applying the above filtering process during the time when an obstacle is detected. The detection of an obstacle may be performed based on sensing data output from the obstacle sensor 130. For example, the controller 180 may have the function of detecting an obstacle, or the remote device 400 may have the function of detecting an obstacle.

The communication device 190 may be configured to reduce the data amount of sensing data corresponding to a region in which there are few changes in a video, based on time-series images (or a video) obtained by visualizing an environment around the work vehicle 100 from sensing data output from the sensor 250, before transmitting the sensing data to the remote device 400.

Refer back to FIG. 11A. In the video of an environment around the work vehicle 100, for example, the sky 79 included in the background is one of regions in which there are few changes between successive frames of the frames included in the time-series images. For example, the controller 180 may have the function of detecting a region in which there are few changes in a video. In the present example embodiment, the communication device 190 performs a preprocessing to reduce the data amount of sensing data corresponding to the sky 79, which is a region in which there are few changes in a video, before transmitting the sensing data to the remote device 400. By this preprocessing, the communication device 190 can efficiently compress sensing data to reduce the data amount of a video stream.

The communication device 190 may include an encoder, and the remote device 400 may include a decoder. The encoder of the communication device 190 may encode sensing data output from the sensor 250 to generate streaming data. For example, the streaming data may be transmitted to the remote device 400, or may be transmitted to the management device 600 and stored into the storage device 650. The streaming data stored in the storage device 650 may be used in applications other than remote maneuver such as observation of growth conditions of crop or plant diseases and pests, which does not need to be carried out in real time. The decoder of the remote device 400 receives and decodes the streaming data to generate a video of an environment around the work vehicle 100. In the video, deteriorations or disturbances are reduced. The user in the remote monitoring center can monitor the self-traveling of the work vehicle 100, and remotely maneuver the work vehicle 100 using the remote control device 500, while viewing the video displayed on the display 430.

In the agricultural machine or sensing system according to the present example embodiment, the data amount of sensing data output from a sensor is adaptively changed, depending on the communication rate of a communication device, and therefore, the amount of communication data can be reduced when the communication rate decreases. Furthermore, the communication device 190 applies a data compression process to sensing data that is output from a sensor and whose data amount is reduced, whereby the effect of reducing the amount of communication data can be further enhanced. It should be noted that the data compression process in the communication device 190 is not essential.

An agricultural machine 100 according to an example embodiment of the present disclosure includes a vehicle body 101, a sensor 250 to sense an environment around the vehicle body 101 to output sensing data, and a communication device 190 to transmit the sensing data output from the sensor 250 to a remote device 400. The sensor 250 changes the data amount of the sensing data output to the communication device 190, depending on the communication rate from the communication device 190 to the remote device 400. In the agricultural machine, the amount of data that is transmitted between the communication device 190 and the remote device 400 can be reduced when the communication rate therebetween decreases.

The sensor 250 may output a smaller data amount of sensing data when the communication rate is lower than a threshold than when the communication rate is higher than or equal to the threshold. With this configuration, the data amount of the sensing data can be adaptively changed, depending on the magnitude relationship between the communication rate and a threshold.

The sensor 250 may include a camera 120. When the communication rate is lower than the threshold, the camera 120 may reduce at least one of resolution, color information amount, parallax, or image size during capturing, compared to when the communication rate is higher than or equal to the threshold. With this configuration, the amount of data output from the camera can be adaptively changed, depending on the communication rate.

The sensor 250 may include a LiDAR sensor 140. When the communication rate is lower than the threshold, the LiDAR sensor 140 may reduce at least one of the amount of point cloud data output per unit time and the angular range of sensing, compared to when the communication rate is higher than or equal to the threshold. With this configuration, the amount of data output from the LiDAR sensor can be adaptively changed, depending on the communication rate.

The sensor 250 may include an obstacle sensor 130 that detects an obstacle existing in an environment around the vehicle body 101. The obstacle sensor 130 outputs a smaller data amount of sensing data when no obstacle is detected than when an obstacle is detected. With this configuration, the amount of data output from the obstacle sensor can be adaptively changed, depending on the communication rate.

Based on time-series images that are generated based on sensing data to visualize an environment around the vehicle body 101, the communication device 190 may reduce the data amount of sensing data corresponding to a region in which there are few changes in the time-series images before transmitting the sensing data to the remote device 400. With this configuration, the data amount of sensing data corresponding to a region in which there are few changes in a video is reduced by a preprocessing, which allows efficient compression of the sensing data in the communication device, whereby the data amount of a video stream can be reduced.

The controller 180 may control travel of the vehicle body 101 based on a signal transmitted from the remote device 400. With this configuration, agricultural machines can be remotely maneuvered from a distant place.

A sensing system according to an example embodiment of the present disclosure includes a sensor 250 that senses an environment around an agricultural machine to output sensing data, and a communication device 190 that transmits the sensing data output from the sensor 250 to a remote device 400. The sensor 250 changes the data amount of the sensing data output to the communication device 190, depending on the communication rate from the communication device 190 to the remote device 400.

A sensing method according to an example embodiment of the present disclosure includes obtaining sensing data from a sensor 250 that senses an environment around an agricultural machine to output the sensing data, transmitting the sensing data from a communication device 190 to a remote device 400, and changing the data amount of the sensing data, depending on the communication rate from the communication device 190 to the remote device 400.

In the above remote maneuver system, the communication device 190 of the work vehicle 100 outputs transmission data based on sensing data output from the sensor 250 such as the camera 120 or the LiDAR sensor 140, to the remote device 400 that transmits a maneuver command to the work vehicle 100. The transmission data may be the sensing data as it is, or visualization data such as an image generated by the controller 180 based on the sensing data. Data communication from the communication device 190 to the remote device 400 may, for example, be performed through a mobile communication network such as 3G, LTE, 4G, or 5G. The remote device 400 causes a display 430 to display time-series images (i.e., a video) based on transmission data sequentially transmitted from the communication device 190. As a result, the display 430 displays a video indicating a state of an environment around the work vehicle 100. The operator can perform remote monitoring and remote maneuver while viewing the video displayed on the display 430.

In order to implement the above remote monitoring and remote maneuver, it is important that data communication from the communication device 190 to the remote device 400 is stable. However, in some environments in which the work vehicle 100 travels, data communication from the communication device 190 to the remote device 400 may be unstable, and therefore, the communication rate (i.e., the amount of data communicated per unit time) may decrease. For example, if three are many other mobile bodies or communication devices that perform communication using the same wireless communication base station around the work vehicle 100, a failure such as interference or crosstalk of radio waves is likely to occur. As a result, communication between the communication device 190 and the remote device 400 may be unstable, or the communication rate may decrease. Due to the widespread use of e-agriculture, the number of work vehicles and remote devices connected to the network is expected to increase more and more in future, more likely leading to a failure such as interference or crosstalk of radio waves. It is therefore expected that the communication rate decreases more frequently. In addition, when the work vehicle 100 is traveling in an area in which it is difficult to receive radio waves for communication, the communication rate decreases. When the communication rate from the communication device 190 to the remote device 400 decreases, the video displayed on the display 430 of the remote device 400 may be disturbed continuously or temporarily, resulting in a difficulty in remote maneuver.

With the above in mind, in the present example embodiment, when the communication rate from the communication device 190 to the remote device 400 decreases, the controller 180 causes at least one of the drive device 240 and the sensor 250 of the work vehicle 100 to perform a compensation operation for reducing the influence of a deterioration in images displayed on the display 430 on remote maneuver. The compensation operation may include at least one of operations (a) to (d) below, for example.

(a) Reducing the moving speed of the work vehicle 100 to a speed lower than that which is specified by a maneuver command transmitted from the remote device 400.

(b) Reducing the steering angle by which the work vehicle 100 is to change direction to a steering angle smaller than that which is specified by a maneuver command.

(c) Reducing the data amount of sensing data corresponding to a region in which there are few changes over time in visualization data (e.g., time-series image data) generated based on the sensing data, before the communication device 190 transmits transmission data to a remote device.

(d) Reducing the data amount of sensing data output by a sensor that senses an environment around the work vehicle 100 in a direction different from the traveling direction thereof, to a data amount smaller than the data amount of sensing data output by a sensor that senses an environment around the work vehicle 100 in the traveling direction thereof.

The compensation operation is not limited to the above operations (a) to (d), and may be other operations of assisting in remote maneuver. The compensation operation may, for example, be an operation of reducing changes or deteriorations in displayed images, or an operation of reducing the data amount of sensing data corresponding to a region that is relatively less important in displayed images.

The control of causing the drive device 240 or the sensor 250 to perform the above compensation operation may be carried out by the ECU 184 of the controller 180. By the above compensation operation, when the communication rate from the communication device 190 to the remote device 400 decreases, some data that has a relatively small influence on remote maneuver can be reduced, or changes in displayed images generated based on the transmission data can be reduced. As a result, the influence of a reduction in the communication rate on remote maneuver can be reduced.

The controller 180 may perform the above control in the self-traveling mode and the remote maneuver mode either continuously or only when the work vehicle 100 is traveling in a particular area. For example, the controller 180 may cause the drive device 240 or the sensor 250 of the work vehicle 100 to perform the compensation operation only when the work vehicle 100 is traveling on an agricultural road or field and a decrease in the communication rate is detected. It may, for example, be determined whether or not the work vehicle 100 is traveling on an agricultural road or field, by checking the position of the work vehicle 100 identified by positioning using the GNSS unit 110, or self-position estimation using the camera 120 and/or the LiDAR sensor 140, with an environment map including information about the positions of agricultural roads and fields. Alternatively, an image recognition process using the camera 120 can be used to determine whether or not the work vehicle 100 is traveling on an agricultural road or field.

In order to perform the above control, the controller 180 monitors the communication rate (i.e., a bit rate) of data transmitted from the communication device 190 to the remote device 400. A decrease in the communication rate may be detected based on comparison between the communication rate and a threshold. For example, if the communication rate is lower than a preset threshold, the controller 180 may cause the work vehicle 100 or the sensor 250 to perform the compensation operation.

The compensation operation is not limited to a single compensation operation. A plurality of compensation operations may be performed. Compensation operations may be performed stepwise, depending on the level of a decrease in the communication rate. For example, the controller 180 may cause the drive device 240 and/or the sensor 250 to perform a first compensation operation when the communication rate is lower than a first threshold, and a second compensation operation different from the first compensation operation when the communication rate is lower than a second threshold lower than the first threshold. In other words, the controller 180 may control and cause at least one of the drive device 240 and the sensor 250 to perform different compensation operations stepwise, depending on the level of a decrease in the communication rate, based on comparison between the communication rate and a plurality of thresholds. Such control allows more flexible operations depending on the communication rate. As a result, the influence of deteriorations in displayed images due to a decrease in the communication rate on remote maneuver can be effectively reduced.

A more specific example of the above control performed by the controller 180 will be described below.

Figure 18:
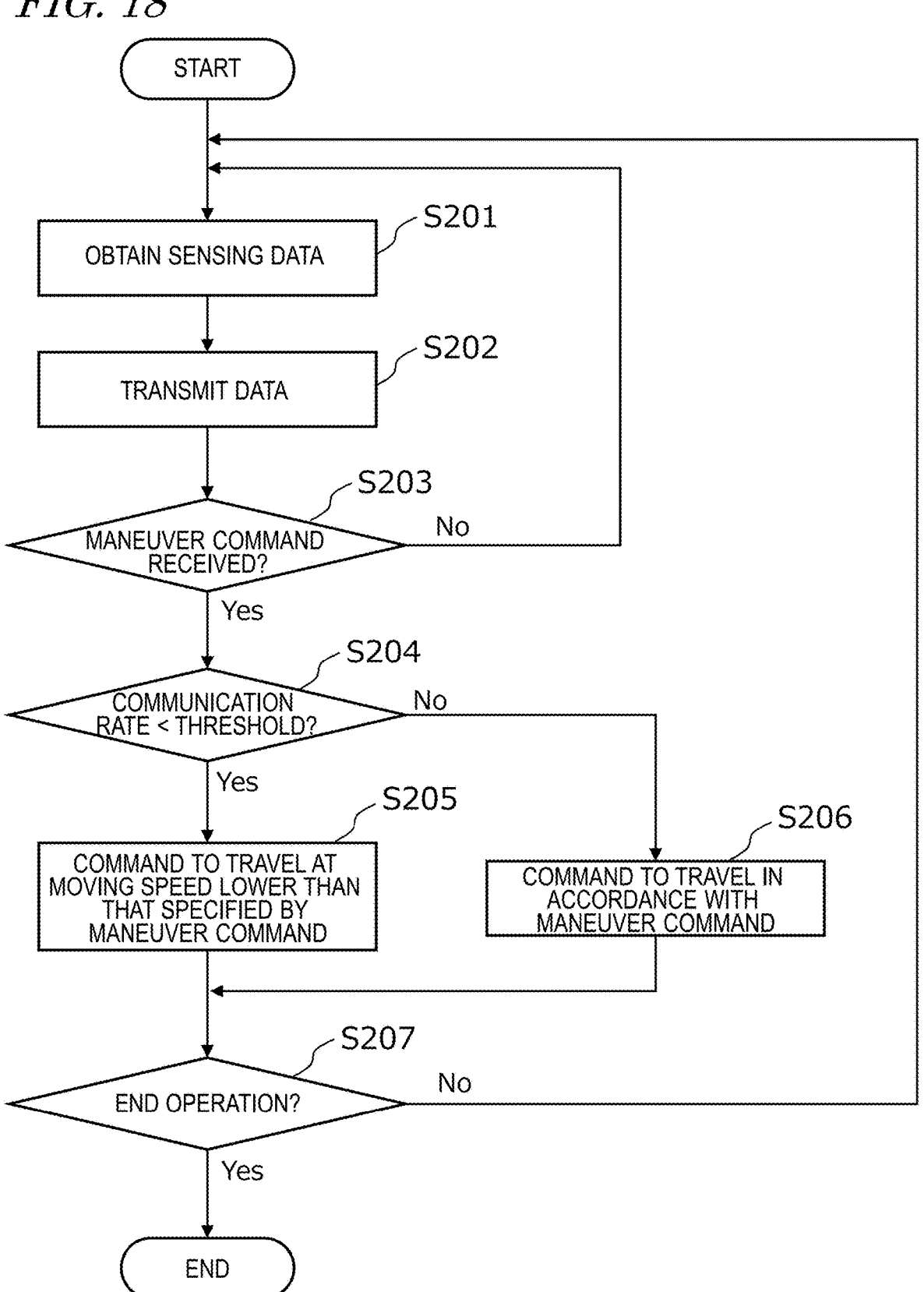
FIG. 18 is a flowchart showing an example of a control operation depending on a communication rate.

FIG. 18 is a flowchart showing an example of a control operation depending on the communication rate. In the example of FIG. 18, the above compensation operation (a) is performed. The controller 180 is configured or programmed to perform operations of steps S201 to S207. The operation of each step will be described below.

In step S201, the controller 180 obtains sensing data output from the sensor 250. The sensing data may, for example, be image data output from the camera 120 and/or point cloud data output from the LiDAR sensor 140. The sensor 250 repeatedly generates and outputs sensing data at preset intervals. The generated sensing data may be sequentially stored into the storage device 170.

In step S202, the controller 180 instructs the communication device 190 to transmit transmission data based on sensing data to the remote device 400. The controller 180 may transmit sensing data, directly, as transmission data to the communication device 190. Alternatively, the controller 180 may cause the communication device 190 to transmit visualization data (e.g., time-series image data) newly generated based on sensing data, as transmission data.

In step S203, the controller 180 determines whether or not the communication device 190 has received a maneuver command from the remote device 400. If a maneuver command has been received, control goes to step S204. If a maneuver command has not been received, control goes back to step S201. The maneuver command may, for example, include a signal indicating command values of the traveling speed and/or the steering angle of the work vehicle 100. The steering angle is an angle at which a steered wheel (e.g., front wheels) is oriented with respect to a neutral direction (i.e., a direction in which the work vehicle 100 travels straight). The maneuver command may include a signal that specifies an operating state of the implement 300 in addition to a traveling state of the work vehicle 100.

In step S204, the controller 180 determines whether or not the communication rate from the communication device 190 to the remote device 400 is lower than a preset threshold. The controller 180 monitors the communication rate (i.e., a bit rate) of data transmitted from the communication device 190 to the remote device 400 during communication, and compares the communication rate with the threshold. For example, if the bit rate of transmission data transmitted immediately before is lower than the threshold, the controller 180 can determine that the communication rate has decreased. The value of the threshold may, for example, be 100 kbps, 500 kbps, 1 Mbps, or 5 Mbps. The threshold may, for example, be set to an appropriate value, depending on various conditions such as the resolution, frame rate, and color information amount of visualization data transmitted, and the type of an encoder. In an example, the threshold may be set to a value within the range of 50 kbps to 10 Mbps. In another example, the threshold may be set to a value within the range of 100 kbps to 5 Mbps. If the communication rate is lower than the threshold, control goes to step S205. If the communication rate is higher than or equal to the threshold, control goes to step S206.

In step S205, the controller 180 causes the drive device 240 of the work vehicle 100 to perform the above compensation operation (a). Specifically, the controller 180 controls the drive device 240 so as to cause the work vehicle 100 to travel at a speed lower than that which is specified by a maneuver command received from the remote device 400. For example, the controller 180 may perform speed control using a value obtained by multiplying the speed command value indicated by the maneuver command by a positive coefficient that is smaller than one, as a target speed. As a result, the work vehicle 100 travels at a speed lower than the speed command value.

Figure 19A:
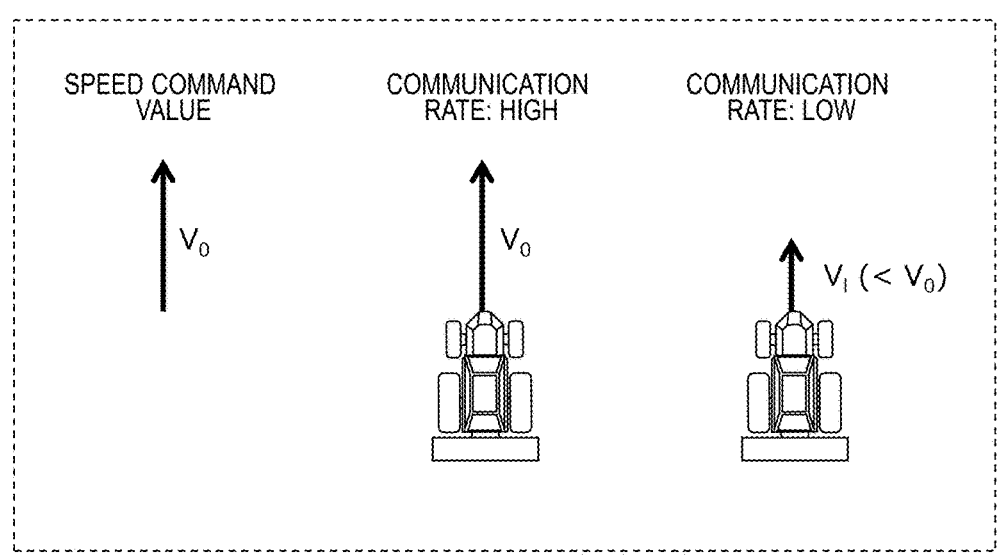
FIG. 19A is a diagram showing an example of a relationship between a speed command value and the actual speed of a work vehicle.

FIG. 19A is a diagram showing an example of a relationship between the speed command value and the actual speed of the work vehicle 100. In the example of FIG. 19A, if the communication rate is higher than or equal to the threshold (communication rate: high), the traveling speed of the work vehicle 100 is controlled such that the actual traveling speed is equal to a speed command value $V_0$. If the communication rate is lower than the threshold (communication rate: low), the traveling speed of the work vehicle 100 is controlled such that the actual traveling speed is equal to a value $V_1$ smaller than the speed command value $V_0$.

Figure 19B:
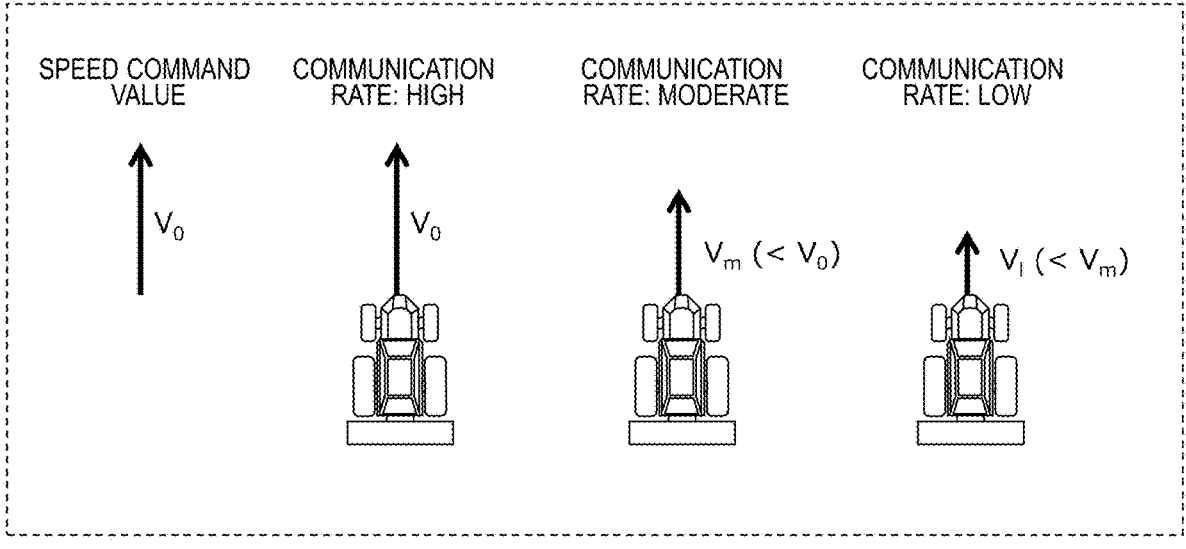
FIG. 19B is a diagram showing another example of a relationship between a speed command value and the actual speed of a work vehicle.

Instead of comparing the communication rate with a single threshold, the controller 180 may compare the communication rate with a plurality of thresholds, and reduce the traveling speed of the work vehicle 100 stepwise, depending on the level of a decrease in the communication rate. For example, as shown in FIG. 19B, if the communication rate is lower than a first threshold and is higher than or equal to a second threshold (communication rate: moderate), the actual speed of the work vehicle 100 may be reduced to $V_m$ lower than a speed command value $V_0$, and if the communication rate is lower than the second threshold (communication rate: low), the actual speed of the work vehicle 100 may be reduced to $V_1$ lower than $V_m$.

Instead of comparing the communication rate with a threshold(s), the controller 180 may determine a speed limit depending on the communication rate, based on data such as a predetermined table or function. In that case, the controller 180 performs control so as to reduce the speed limit of the work vehicle 100 with a decrease in the communication rate. As a result, the speed can be more finely controlled, depending on communication conditions.

By the compensation operation in step S205, the actual speed of the work vehicle 100 is reduced to a speed lower than that which is specified by a maneuver command. Therefore, motions in images displayed on the display 430 of the remote device 400 are reduced, resulting in easier remote monitoring and remote maneuver. In addition, in the case in which the communication device 190 compresses video data by, for example, in-frame prediction and inter-frame prediction and the like, and transmits the resultant video data, the amount of transmission data may be reduced due to a reduction in changes in video. As a result, deteriorations in displayed images due to communication delays can be reduced, which allows the operator to easily recognize a state of surroundings of the work vehicle 100 based on the displayed images.

In step S206, the controller 180 instructs the drive device 240 to cause the work vehicle 100 to travel in accordance with a maneuver command. Specifically, if the communication rate is higher than or equal to the threshold, the controller 180 causes the work vehicle 100 to travel at the speed specified by a maneuver command.

In step S207, the controller 180 determines whether or not a command to end the operation has been issued. The command to end the operation may, for example, be transmitted from the remote device 400 to the communication device 190 when the operator performs an operation of stopping the remote maneuver or self-traveling of the work vehicle 100. When the command to end the operation has been issued, the controller 180 stops the work vehicle 100, and ends the operation. When the command to end the operation has not been issued, control goes back to step S201. After that, the operations of steps S201 to S207 are repeatedly performed until the command to end the operation has been issued.

By the above operation, the operator can perform remote monitoring and remote maneuver of the work vehicle 100 while viewing a video displayed on the display 430 of the remote device 400. In the example of FIG. 18, the controller 180, when detecting a decrease in the communication rate, causes the work vehicle 100 to travel at a traveling speed lower than that which is specified by a maneuver command. As a result, the influence of deteriorations in displayed images due to a decrease in the communication rate on remote maneuver can be reduced.

Figure 20:
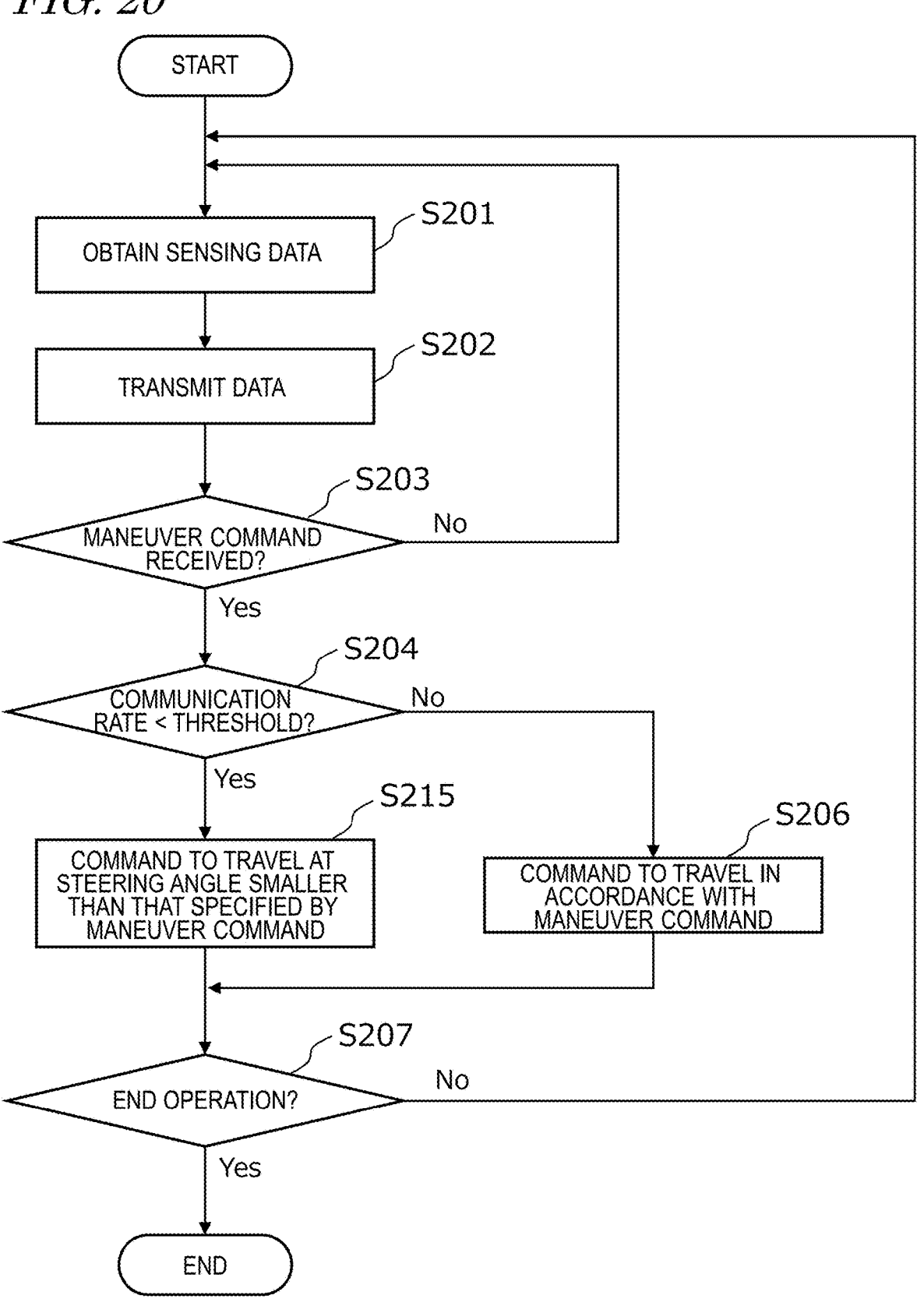
FIG. 20 is a flowchart showing another example of a control operation depending on a communication rate.

FIG. 20 is a flowchart showing another example of the control operation performed by the controller 180, depending on the communication rate. In the example of FIG. 20, the above compensation operation (b) is performed. The operation shown in FIG. 20 is the same as the operation shown in FIG. 18, except that step S205 is replaced with step S215. Differences from the example of FIG. 18 will be described below.

In step S215, the controller 180 causes the drive device 240 of the work vehicle 100 to perform the above compensation operation (b). Specifically, the controller 180 controls the drive device 240 so as to cause the work vehicle 100 to travel at a steering angle smaller than that which is specified by a maneuver command received from the remote device 400. For example, the controller 180 may perform steering control using a value obtained by multiplying the steering angle command value indicated by the maneuver command by a positive coefficient smaller than one, as a target steering angle. Alternatively, the controller 180 can perform the above control by reducing the gain of control to change the steering angle when a maneuver command to turn right or left is issued. The reduction in gain reduces changes in the steering angle, whereby changes in displayed images can be reduced.

Figure 21A:
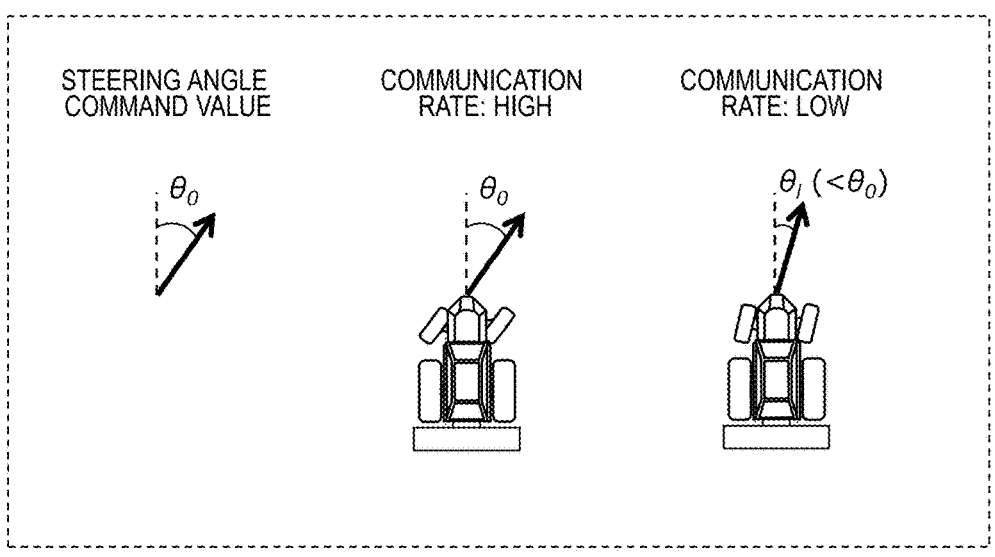
FIG. 21A is a diagram showing an example of a relationship between a steering angle command value and the actual steering angle of a work vehicle.

FIG. 21A is a diagram showing an example of a relationship between the steering angle command value and the actual steering angle of the work vehicle 100. In the example of FIG. 21A, if the communication rate is higher than or equal to the threshold (communication rate: high), the steering angle of the work vehicle 100 is controlled such that the actual steering angle is equal to a steering angle command value $\theta_0$. Meanwhile, if the communication rate is lower than the threshold (communication rate: low), the traveling speed of the work vehicle 100 is controlled such that the actual steering angle is equal to $\theta_1$ that is a value smaller than the steering angle command value $\theta_0$.

Figure 21B:
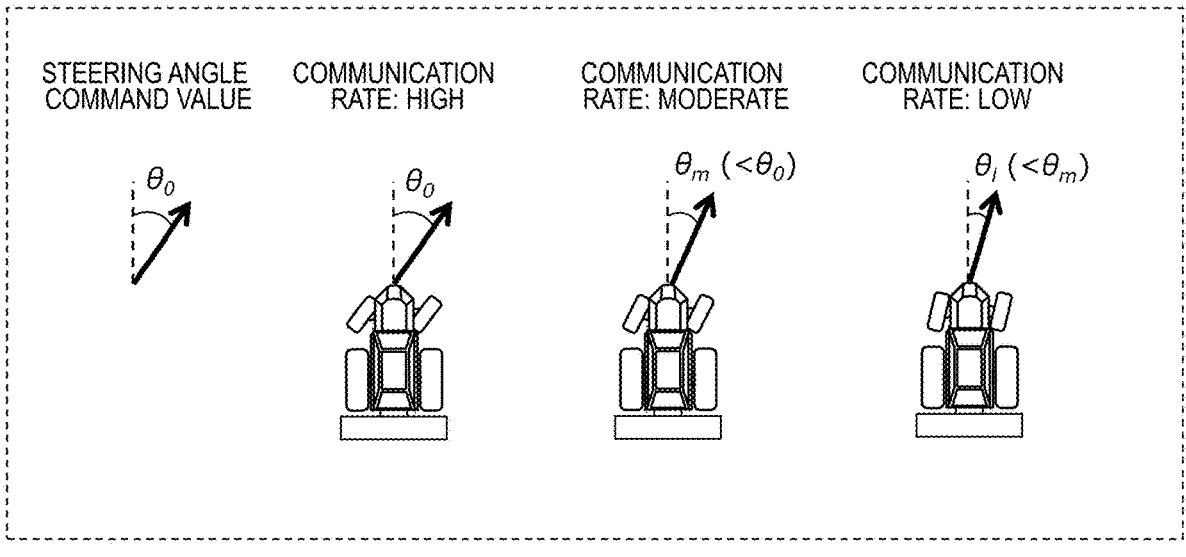
FIG. 21B is a diagram showing another example of a relationship between a steering angle command value and the actual steering angle of a work vehicle.

In this example, instead of comparing the communication rate with a single threshold, the controller 180 may also compare the communication rate with a plurality of thresholds and reduce the steering angle of the work vehicle 100 stepwise, depending on the level of a decrease in the communication rate. For example, as in the example shown in FIG. 21B, if the communication rate is lower than a first threshold and is higher than or equal to a second threshold (communication rate: moderate), the actual steering angle of the work vehicle 100 may be reduced to $\theta_m$ that is a value smaller than the steering angle command value $\theta_0$, and if the communication rate is lower than the second threshold (communication rate: low), the actual steering angle of the work vehicle 100 may be reduced to $\theta_1$ which is a value smaller than the angle of $\theta_m$.

In this case, instead of comparing the communication rate with a threshold(s), the controller 180 may also determine an upper limit value of the steering angle depending on the communication rate, based on data such as a previously prepared table or function. In that case, the controller 180 performs control such that the upper limit value of the steering angle of the work vehicle 100 decreases with a decrease in the communication rate. As a result, steering control can be more finely performed, depending on communication conditions.

As described above, the controller 180 may reduce the gain of steering control with a decrease in the communication rate. For example, the controller 180 may monotonically decrease the gain of steering control with a decrease in the communication rate. In that case, data indicating a table or function that specifies a relationship between the measurement value of the communication rate and the gain of steering control may be previously stored in the storage device 170. The controller 180 may determine the gain of steering control based on said data and the measurement value of the communication rate.

By the compensation operation in step S215, the actual steering angle of the work vehicle 100 is reduced to a steering angle smaller than that which is specified by a maneuver command. Therefore, changes in images displayed on the display 430 of the remote device 400 that occur when the work vehicle 100 changes direction is reduced, which facilitates remote monitoring. In addition, in the case in which the communication device 190 compresses video data by, for example, in-frame prediction and inter-frame prediction and the like and transmits the resultant video data, the amount of transmission data may be reduced due to a reduction in changes in video. As a result, deteriorations in displayed images due to communication delays can be reduced, which allows the operator to easily recognize a state of surroundings of the work vehicle 100 based on the displayed video.

In step S215 shown in FIG. 20, the controller 180 may perform the operation of step S205 shown in FIG. 18 together. Specifically, the controller 180 may reduce both of the traveling speed and steering angle of the work vehicle 100 to values that are smaller than command values specified by a maneuver command. By such a compensation operation, changes or deteriorations in displayed images that occur when the communication rate is low can be reduced, which further facilitates remote maneuver.

Figure 22:
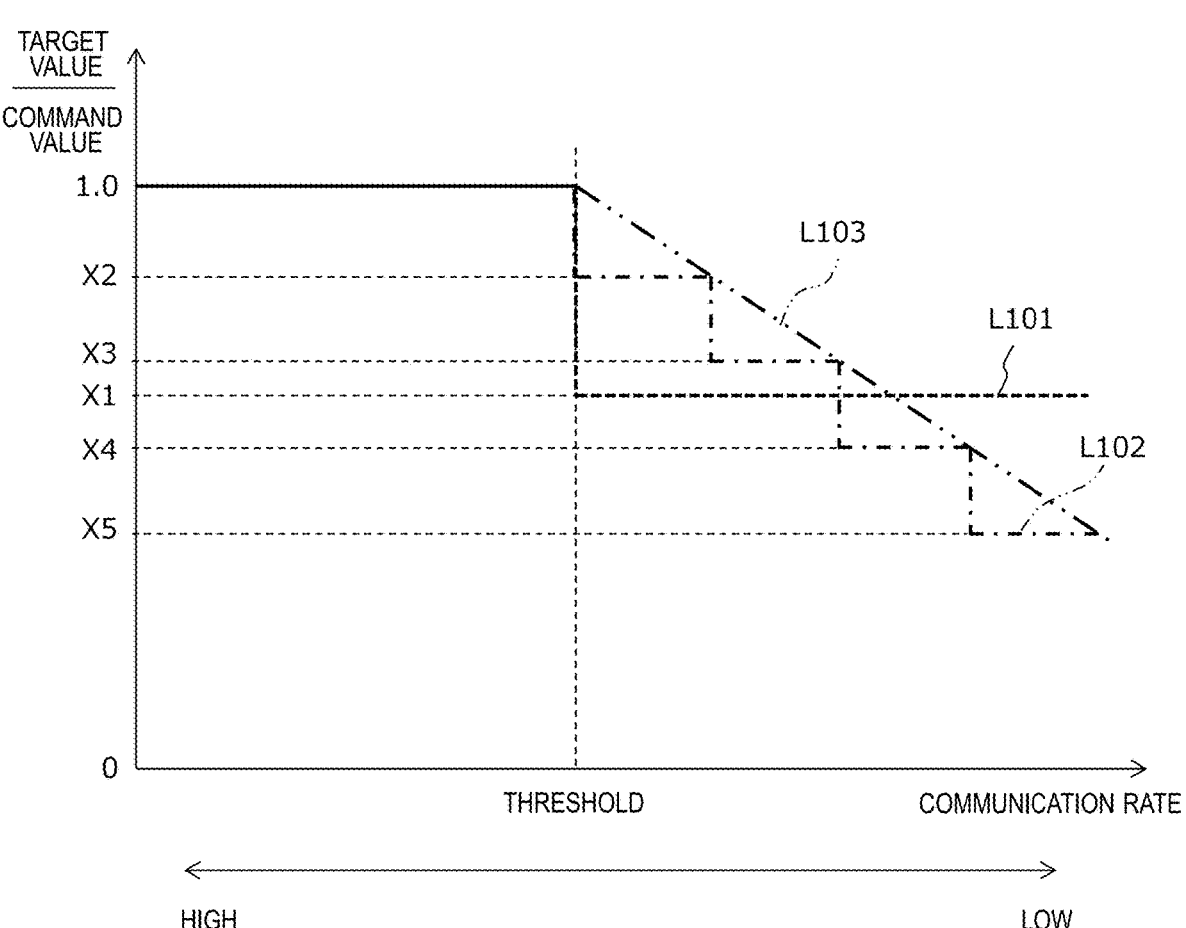
FIG. 22 is a diagram illustrating the ratio (target value/command value) of a target value to a maneuver command value (command value) for control during a compensation operation.

FIG. 22 is a diagram illustrating the ratio (target value/command value) of a target value that is set during control by the controller 180 to a maneuver command value (command value) that is set during the above compensation operation. The command value is the speed command value $V_0$, the steering angle command value $\theta_0$, or the like. The target value is $V_1$ or $V_m$ ($<V_0$) for speed, $\theta_1$ or $\theta_m$ ($<\theta_0$) for angle, or the like. FIG. 22 shows three ways to set the target value depending on the communication rate. The controller 180 can perform feedback control (e.g., PID control) that causes a control amount (e.g., the traveling speed or steering angle) to approach the target value. The controller 180, when detecting a decrease in the communication rate, reduces the target value in the control to a value smaller than the command value, whereby the above compensation operation can be carried out.

As shown in FIG. 22, if the communication rate is higher than or equal to a threshold (i.e., the communication rate is high), the controller 180 sets the target value in control to the same value as the command value. In this example, the target value/the command value is 1.0. If the communication rate is lower than the threshold (i.e., the communication rate is low), the controller 180 sets the target value in control to a value smaller than the command value. For example, if the communication rate is lower than the threshold, the controller 180 may fix the target value to a predetermined value that is lower than the command value as indicated by a line L101. In this case, the target value/the command value is X1. Alternatively, if the communication rate is lower than the threshold, the controller 180 may change the target value to values lower than the command value stepwise, depending on the communication rate, as shown by a line L102. In this case, the target value/the command value is one of X2 to X5, depending on the value of the communication rate. Alternatively, if the communication rate is lower than the threshold, the controller 180 may continuously change the target value to values lower than the command value, depending on the communication rate, as shown by a line L103. In this case, the target value/the command value continuously decreases with a decrease in the communication rate.

Thus, in the example of FIG. 22, if the communication rate is higher than or equal to the threshold (i.e., the communication rate is high), the controller 180 sets the target value to the same value as the command value. If the communication rate is lower than the threshold (i.e., the communication rate is low), the controller 180 sets the target value to a value lower than the command value. As a result, the motion of the work vehicle 100 can be reduced compared to when the target value is set to the same value as the command value, which can facilitate remote maneuver.

Figure 23:
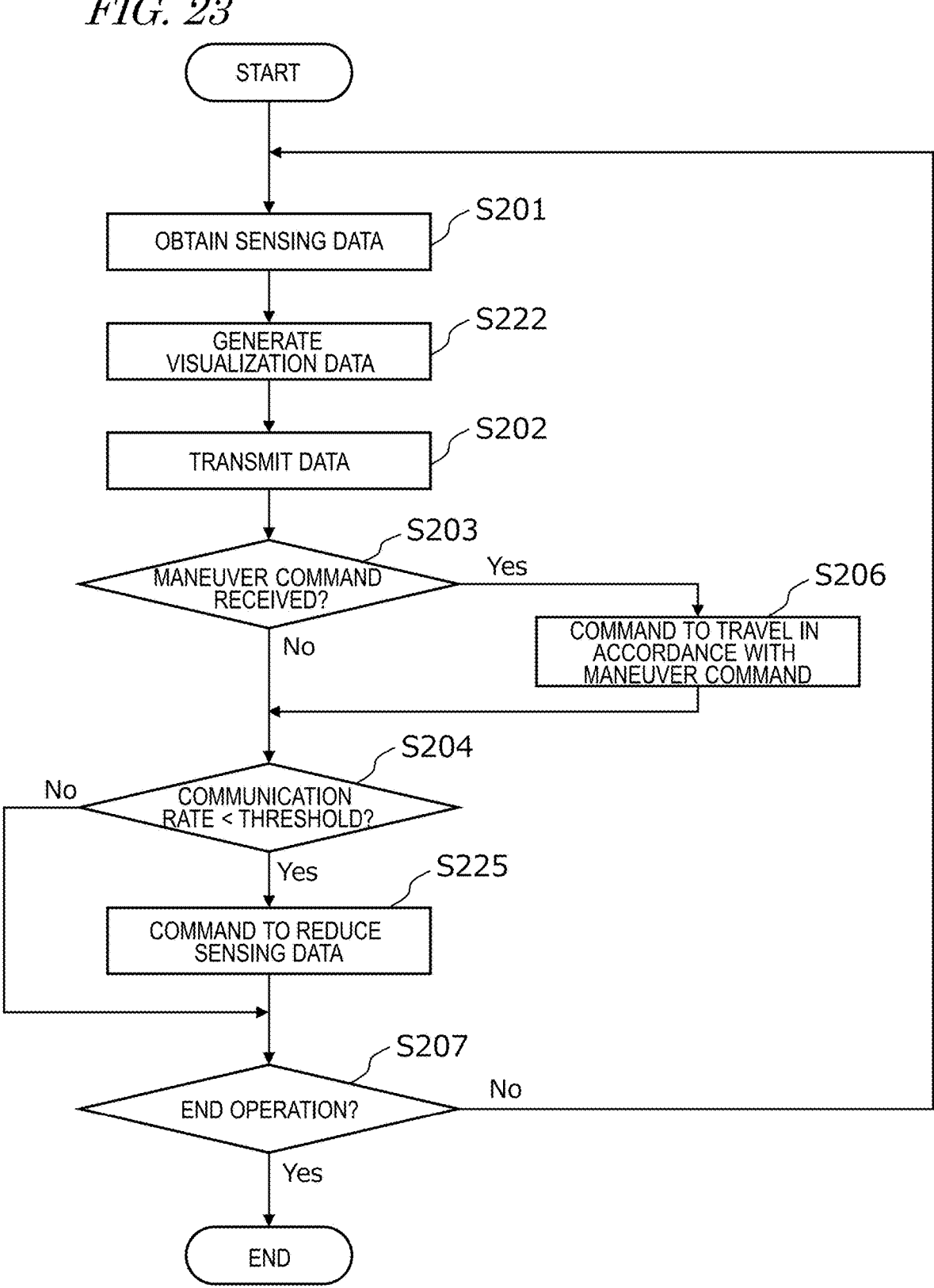
FIG. 23 is a flowchart showing still another example of a control operation depending on a communication rate.

FIG. 23 is a flowchart showing still another example of the control operation depending on the communication rate. In the example of FIG. 23, the above compensation operation (c) is performed. The operation shown in FIG. 23 is different from the operation shown in FIG. 18 in that step S222 is added between step S201 and step S202, and if the result of determination in step S203 is positive, control goes to step S206, and if the result of determination in step S203 is negative, control goes to step S204, and step S205 is replaced with step S225, and if the result of determination in step S204 is negative, control goes to step S207. Differences from the example of FIG. 18 will be described below.

In the example of FIG. 23, after step S201, the controller 180 generates visualization data indicating a state of surroundings of the work vehicle 100 based on sensing data (step S222). The visualization data may, for example, be image data based on data output from the camera 120 or the LiDAR sensor 140. The visualization data is not limited to data of a typical color image, and may, for example, be data of an image obtained by visualizing a position distribution or distance distribution of a point cloud for which distance measurement has been performed. The visualization data may be transmitted to the remote device 400 by the communication device 190 in the next step S202. It should be noted that the operation of step S222 may be performed between step S201 and step S202 in the examples shown in FIGS. 18 and 20. In that case, the visualization data generated in step S222 may be transmitted as transmission data to the remote device 400 in FIG. 18 or step S202 shown in FIG. 18.

In the example of FIG. 23, if in step S203 the controller 180 determines that a maneuver command has been received, control goes to step S206, in which the controller 180 controls the drive device 240 such that traveling is performed in accordance with the maneuver command.

If in step S203 the controller 180 determines that a maneuver command has been received, control goes to step S204, in which the controller 180 compares the communication rate with a threshold. If the communication rate is lower than the threshold, control goes to step S225. If the communication rate is higher than or equal to the threshold, control goes to step S207.

In step S225, the controller 180 instructs the sensor 250, such as the camera 120 or the LiDAR sensor 140, to reduce the data amount of output sensing data to a value smaller than a predetermined value. For example, the controller 180 instructs the sensor 250 to reduce the data amount of sensing data corresponding to a region in which there are few changes over time (i.e., motions) in the visualization data generated in step S222, to a value smaller than a predetermined value. More specifically, the controller 180 may reduce the resolution of sensing data corresponding to a region in which there are few changes in a video indicated by the visualization data. In the next and following sensing, the sensor 250 outputs sensing data in which the data amount of data corresponding to the region in which there are few changes is reduced. As a result, in the next and following step S202, visualization data based on sensing data whose data amount is reduced is transmitted.

Thus, in the example of FIG. 23, the sensor 250 is configured to be able to change the data amount of output sensing data, depending on a request from the controller 180. The sensor 250 outputs a smaller data amount of sensing data if the communication rate is lower than the threshold than if the communication rate is higher than or equal to the threshold. For example, while the communication rate is higher than or equal to the threshold, the sensor 250 may output a maximum amount of data that can be output, and when the communication rate becomes lower than the threshold, the sensor 250 may be controlled to output sensing data whose data amount is, for example, about ½ or about ⅓ of the maximum amount.

In a video indicating an environment around the work vehicle 100, for example, the sky 79 included in the background shown in FIG. 11A is one of regions in which there are few changes between successive frames in a group of frames constituting time-series images. The controller 180 may have a function of detecting a region in which there are few changes in a video, such as the sky 79. The controller 180 performs a preprocessing to reduce the data amount of sensing data corresponding to a region in which there are few changes in a video, such as the sky 79, before the communication device 190 transmits the sensing data to the remote device 400. By the preprocessing, the communication device 190 can efficiently compress sensing data to reduce the data amount of a video stream.

The communication device 190 may include an encoder, while the remote device 400 may include a decoder. The encoder of the communication device 190 may encode sensing data output from the sensor 250 to generate streaming data. For example, the streaming data may be transmitted to the remote device 400, or may be transmitted to the management device 600 and stored into the storage device 650. The streaming data stored in the storage device 650 may be utilized for purposes other than remote maneuver, such as observation of crop growth or plant diseases and pests, which does not need to be carried out in real time. The decoder of the remote device 400 receives and decodes the streaming data to generate a video of an environment around the work vehicle 100. This video has reduced deteriorations or disturbances. While viewing the video displayed on the display 430, the operator or user in the remote monitoring center can monitor the self-traveling of the work vehicle 100, or remotely maneuver the work vehicle 100 using the remote control device 500.

In the example of FIG. 23, the data amount of sensing data output from the sensor 250 can be adaptively changed, depending on the communication rate of the communication device 190. For example, when the communication rate decreases, the data amount of sensing data corresponding to a region in which there are few changes in displayed images can be reduced while the data amount of sensing data corresponding to a region in which there are many changes in displayed images is maintained. As a result, the amount of transmission data can be reduced while information about a region that is important in remote monitoring and remote maneuver is maintained. As a result, the influence of deteriorations in displayed images due to a decrease in the communication rate on remote maneuver can be reduced.

Figure 24:
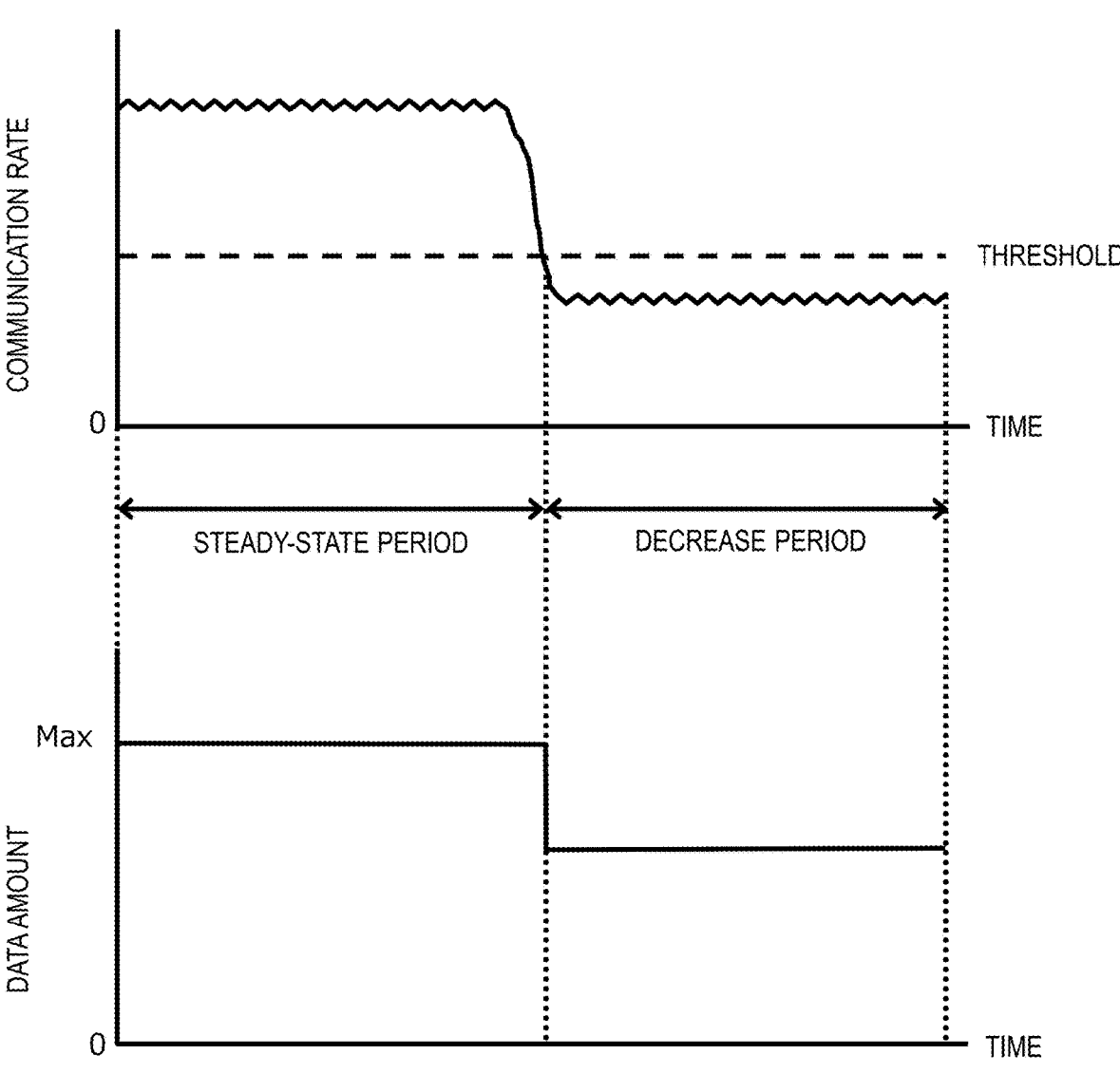
FIG. 24 is a diagram showing an example of a change over time in the communication rate of a communication device and a change over time in the data amount of sensing data.

FIG. 24 is a diagram showing an example of a change over time in the communication rate of the communication device 190 and a change over time in the data amount of sensing data output from the sensing data 250. The upper graph in FIG. 24 indicates an example of a change over time in the communication rate. The lower graph in FIG. 24 indicates a change over time in the data amount of output sensing data. The horizontal axis represents time. The vertical axis represents the communication rate in the upper graph, and the data amount in the lower graph.

The communication rate may vary depending on changes in an environment in which the work vehicle 100 is traveling. In the example shown in FIG. 24, a period of time during which the communication rate is sufficiently high and stable is referred to as a "steady-state period", and a period of time during which the communication rate is lower than a threshold is referred to as a "decrease period". The threshold may be determined as appropriate, depending on an environment in which the system is used. The sensor 250 is controlled so as to output sensing data in accordance with a first operation setting during steady-state periods, and sensing data in accordance with a second operation setting during decrease periods. During steady-state periods, the data amount of sensing data output from the sensor 250 is maintained at a preset upper limit value (max value). When the communication rate decreases from that state to be lower than the threshold, the controller 180 controls the sensor 250 such that the sensor 250 performs a compensation operation to stop outputting some data that is less important of sensing data, for example. As a result, the data amount of output sensing data is reduced, and the data amount of transmission data generated based on the sensing data is also reduced. As a result, deteriorations in a monitoring video generated by the remote device 400 can be reduced, resulting in a reduction in the influence on remote maneuver.

In the example shown in FIG. 23, instead of comparing the communication rate with a single threshold, the controller 180 may compare the communication rate with a plurality of thresholds, and change a reduction in the amount of sensing data, depending on the level of a decrease in the communication rate. Alternatively, instead of comparing the communication rate with a threshold(s), the controller 180 may determine a reduction in the amount of data, depending on the communication rate, based on data such as a previously prepared table or function. In that case, the controller 180 performs control such that the data amount of sensing data output from the sensor 250 decreases with a decrease in the communication rate. As a result, control can be more finely performed, depending on communication conditions.

The operation shown in FIG. 23 may be combined with one or both of the operations shown in FIGS. 18 and 20. Specifically, the controller 180, when detecting a decrease in the communication rate, instructs the sensor 250 to reduce the data amount of sensing data, and instructs the drive device 240 to reduce at least one of traveling speed and steering angle to a value lower than that which is specified by a maneuver command. By combining such a plurality of compensation operations, the effect of assisting in remote maneuver can be further enhanced.

Next, a specific example of an operation of the sensor 250 that includes a first sensor that senses a surrounding environment in the traveling direction of the work vehicle 100, and a second sensor that senses a surrounding environment in a direction different from the traveling direction of the work vehicle 100, will be described.

Figure 25A:
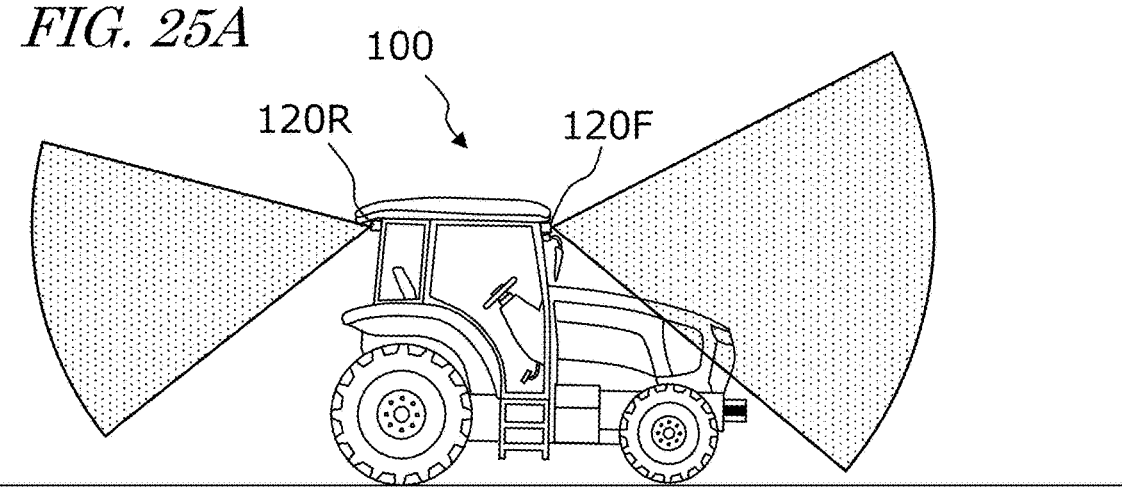
FIG. 25A is a diagram schematically showing how sensing is performed by a first camera that captures an image in the direction in which a work vehicle travels, and a second camera that captures an image in the direction opposite to the traveling direction.

FIG. 25A is a diagram schematically showing how sensing is performed by a first camera 120F that captures an image in the traveling direction of the work vehicle 100, and a second camera 120R that captures an image in the direction opposite to the traveling direction. In this example, the first camera 120F corresponds to the first sensor, and the second camera 120R corresponds to the second sensor. In such a configuration, the controller 180 can cause the second camera 120R to perform the above compensation operation (d). Specifically, the controller 180 can cause the second camera 120R to perform, as the compensation operation, an operation of reducing the data amount of image data output by the second camera 120R to a data amount smaller than that of image data output by the first camera 120F. For example, the controller 180 can reduce the data amount by causing the second camera 120R to reduce the resolution of an image output from the second camera 120R, reduce color information of the image, or output an image of a region that is a cut-out portion (e.g., a center portion) of the whole image. In the example of FIG. 25A, when the communication rate decreases, the controller 180 may also reduce the data amount of image data output from the first camera 120F. It should be noted that, in that case, the percentage of a reduction in the data amount of image data output from the first camera 120F may be smaller than the percentage of a reduction in the data amount of image data output from the second camera 120R.

Figure 25B:
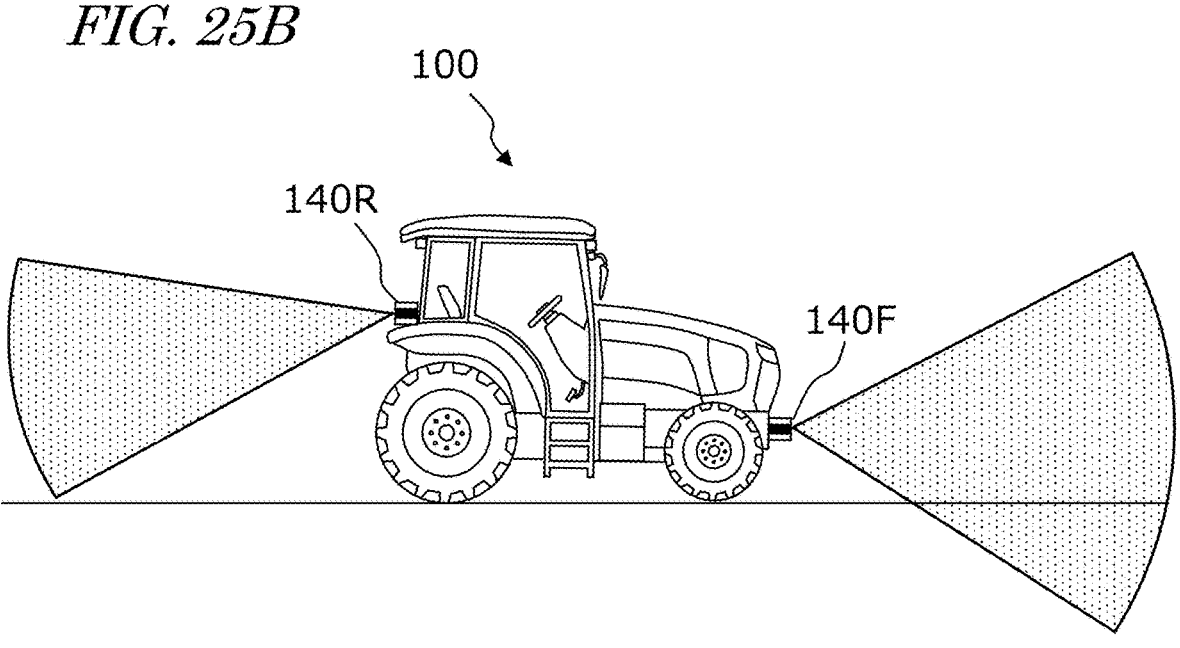
FIG. 25B is a diagram schematically showing how sensing is performed by a first LiDAR sensor that senses in the direction in which a work vehicle travels, and a second LiDAR sensor that senses in the direction opposite to the traveling direction.

FIG. 25B is a diagram showing a variation of FIG. 25A. In this example, the sensor 250 includes a first LiDAR sensor 140F that performs sensing in the traveling direction of the work vehicle 100, and a second LiDAR sensor 140R that performs sensing in the direction opposite to the traveling direction of the work vehicle 100. In the example of FIG. 25B, the first LiDAR sensor 140F corresponds to the first sensor, and the second LiDAR sensor 140R corresponds to the second sensor. In such a configuration, the controller 180 can also cause the second LiDAR sensor 140R to perform the above compensation operation (d). Specifically, the controller 180 can cause the second LiDAR sensor 140R to perform, as the compensation operation, an operation of reducing the data amount of point cloud data output by the second LiDAR sensor 140R, to a data amount that is smaller than that of point cloud data output by the first LiDAR sensor 140F. For example, the controller 180 can reduce the data amount by reducing the number of points in point cloud data output from the second LiDAR sensor 140R, or the range of scanning. In the example of FIG. 25B, the controller 180 may also reduce the data amount of point cloud data output from the first LiDAR sensor 140F when the communication rate decreases. It should be noted that, in that case, the percentage of a reduction in the data amount of point cloud data output from the first LiDAR sensor 140F may be smaller than the percentage of a reduction in the data amount of point cloud data output from the second LiDAR sensor 140R.

The operations of the controller 180 in the examples shown in FIGS. 25A and 25B are substantially the same as the operation shown in FIG. 23. In order to perform the compensation operation (d), the controller 180 instructs the sensor 250 to reduce the data amount of sensing data output by the second sensor in step S225. In the case in which the sensor 250 includes at least three sensors, the sensors other than the sensor that senses in the front direction may be caused to reduce the data amount of sensing data. As a result, the transmission data can be further reduced, and therefore, deteriorations in displayed images can be further reduced.

As described above, the remote maneuver system according to the present example embodiment includes the sensor 250 that senses an environment around the work vehicle 100 (i.e., an agricultural machine) to output sensing data, the communication device 190 that transmits transmission data based on the sensing data output from the sensor 250, to the remote device 400 that transmits a maneuver command to the work vehicle 100, and the controller 180 that causes at least one of the work vehicle 100 and the sensor 250 to perform a compensation operation for, when the communication rate from the communication device 190 to the remote device 400 decreases, reducing the influence of deteriorations in displayed images showing a state of surroundings of the work vehicle 100 based on the transmission data received by the remote device 400, on remote maneuver.

With the above configuration, the problem that there are difficulties in remote maneuver due to deteriorations in displayed images caused by a decrease in the communication rate can be solved.

The controller 180 may cause the work vehicle 100 to perform, as the compensation operation, an operation of reducing the moving speed of the work vehicle 100 to a speed lower than that which is specified by a maneuver command. As a result, changes in displayed images due to the movement of the work vehicle 100 can be reduced, which can facilitate remote maneuver.

The controller 180 may cause the work vehicle 100 to perform, as the compensation operation, an operation of reducing the steering angle by which the work vehicle 100 changes direction to a steering angle smaller than that which is specified by a maneuver command. As a result, changes in displayed images due to the direction changing of the work vehicle 100 can be reduced, which can facilitate remote maneuver.

The controller 180 may cause the sensor 250 to perform, as the compensation operation, an operation of generating visualization data that visualizes an environment around the work vehicle 100 based on sensing data, and reducing the data amount of sensing data corresponding to a region in which there are few changes over time in the visualization data before the communication device 190 transmits transmission data to the remote device 400. As a result, data of a region in which there are few changes, and that is therefore relatively less important, can be reduced, and therefore, deteriorations in displayed images due to a decrease in the communication rate can be reduced.

The sensor 250 may include a first sensor that senses a surrounding environment in the traveling direction of the work vehicle 100, and a second sensor that senses a surrounding environment in a direction different from the traveling direction of the work vehicle 100. The controller 180 may cause the second sensor to perform, as the compensation operation, an operation of reducing the data amount of sensing data output by the second sensor to a data amount smaller than that of sensing data output by the first sensor. As a result, the data amount of sensing data that indicates conditions in a direction different from the traveling direction, and therefore, is relatively less important, can be reduced, and therefore, deteriorations in displayed images due to a decrease in the communication rate can be reduced.

When the work vehicle 100 is traveling on an agricultural road or field, and the controller 180 detects a decrease in the communication rate, the controller 180 may cause at least one of the sensor 250 and the work vehicle 100 to perform the compensation operation. As a result, when the work vehicle 100 is traveling on an agricultural road or field, the controller 180 can assist in remote maneuver by the compensation operation.

When the communication rate is lower than a threshold, the controller 180 may cause at least one of the work vehicle 100 and the sensor 250 to perform the compensation operation. Alternatively, the controller 180 may cause at least one of the work vehicle 100 and the sensor 250 to perform the compensation operation based on data such as a table that specifies a correspondence relationship between the communication rate and the compensation operation.

The controller 180 may cause at least one of the work vehicle 100 and the sensor 250 to perform a first compensation operation when the communication rate is lower than a first threshold, and to perform a second compensation operation different from the first compensation operation when the communication rate is lower than a second threshold that is lower than the first threshold. As a result, appropriate compensation operations can be performed stepwise, depending on the level of a decrease in the communication rate.

The remote maneuver system may further include the remote device 400. Alternatively, the remote device 400 may be excluded from the remote maneuver system. The remote maneuver system may further include the display device 430 that displays images. Alternatively, the display device 430 may be excluded from the remote maneuver system.

In the present example embodiment, the work vehicle 100 includes the remote maneuver system according to any of the above example embodiments, and a travel device that is controlled by the controller 180.

A control method according to an example embodiment of the present disclosure may be used in a remote maneuver system for remotely maneuvering an agricultural machine. The control method includes obtaining sensing data generated by a sensor that senses an environment around an agricultural machine, transmitting transmission data based on the sensing data to a remote device that transmits a maneuver command to the agricultural machine, and at least one of the agricultural machine or the sensor to perform a compensation operation for, when a communication rate from a communication device to the remote device decreases, reducing an influence of a deterioration in a displayed image indicating a state of surroundings of the agricultural machine based on the transmission data, on the remote maneuver.

The configurations and operations of the above example embodiments are merely illustrative. The present disclosure is not limited to the above example embodiments. For example, the above various example embodiments may be combined, as appropriate, to provide other example embodiments.

In the above example embodiments, the agricultural machines preferably perform self-driving. Alternatively, the agricultural machines may not have the function of performing self-driving. The techniques according to the present disclosure can be applied to a wide range of agricultural machines that can be remotely maneuvered.

The system that controls self-traveling and/or remotely-operated traveling according to the above example embodiment can be mounted on an agricultural machine lacking such functions, as an add-on. Such a system may be manufactured and sold separately from agricultural machines. A computer program for use in such a system may also be manufactured and sold separately from agricultural machines. The computer program may be stored and provided in a non-transitory computer-readable storage medium, for example. The computer program may also be downloaded and provided via telecommunication lines (e.g., the Internet).

The techniques and example embodiments according to the present disclosure are applicable to control systems for agricultural machines that can perform self-traveling or can be operated by remote maneuver, such as tractors, harvesters, rice transplanters, vehicles for crop management, vegetable transplanters, mowers, seeders, spreaders, agricultural drones, or agricultural robots.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An agricultural machine comprising:
a vehicle body;
a sensor to sense an environment around the vehicle body to output sensing data; and
a communication device to transmit the sensing data output from the sensor to a remote device; wherein
the sensor is configured to change a data amount of the sensing data output to the communication device, depending on a communication rate from the communication device to the remote device; and
the sensor includes a camera configured to reduce parallax when the communication rate is lower than a threshold, compared to when the communication rate is higher than or equal to the threshold.

2. The agricultural machine of claim 1, wherein the sensor outputs a smaller data amount of sensing data when the communication rate is lower than the threshold than when the communication rate is higher than or equal to the threshold.

3. The agricultural machine of claim 1, wherein when the communication rate is lower than the threshold, the camera further reduces at least one of resolution, color information amount, or image size during capturing compared to when the communication rate is higher than or equal to the threshold.

4. The agricultural machine of claim 1, wherein
the sensor further includes an obstacle sensor to sense an obstacle existing in the environment around the vehicle body; and
the obstacle sensor outputs a smaller data amount of sensing data when the obstacle is not detected than when the obstacle is detected.

5. The agricultural machine of claim 1, wherein based on time-series images generated based on the sensing data to visualize the environment around the vehicle body, the communication device reduces the data amount of the sensing data corresponding to a region in which there are a predetermined number of changes in the time-series images before transmitting the sensing data to the remote device.

6. The agricultural machine of claim 1, further comprising:

a controller configured or programmed to control travel of the vehicle body based on a signal transmitted from the remote device.

7. A sensing system comprising:

a sensor to sense an environment around an agricultural machine to output sensing data; and a communication device to transmit the sensing data output from the sensor to a remote device; wherein the sensor is configured to change a data amount of the sensing data output to the communication device, depending on a communication rate from the communication device to the remote device; and the sensor includes at least one of a camera configured to reduce parallax when the communication rate is lower than a first threshold, compared to when the communication rate is higher than or equal to the first threshold, or a LIDAR sensor configured to reduce an angular range of sensing in a horizontal direction and a vertical direction when the communication rate is lower than a second threshold, compared to when the communication rate is higher than or equal to the second threshold.

8. An agricultural machine comprising:

a vehicle body;

a sensor to sense an environment around the vehicle body to output sensing data; and a communication device to transmit the sensing data output from the sensor to a remote device; wherein the sensor changes a data amount of the sensing data output to the communication device, depending on a communication rate from the communication device to the remote device; and the sensor includes a LIDAR sensor configured to reduce an angular range of sensing in a horizontal direction and a vertical direction when the communication rate is lower than a threshold, compared to when the communication rate is higher than or equal to the threshold.

9. The agricultural machine of claim 8, wherein when the communication rate is lower than the threshold, the LiDAR sensor further reduces an amount of point cloud data output per unit time compared to when the communication rate is higher than or equal to the threshold.

* * * * *